(12) United States Patent
Iverson

(10) Patent No.: US 11,038,996 B2
(45) Date of Patent: Jun. 15, 2021

(54) EXTENSION BAR FOR CELL PHONE MOUNT

(71) Applicant: MACNEIL IP LLC, Bolingbrook, IL (US)

(72) Inventor: David S. Iverson, Oak Brook, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 0 days.

(21) Appl. No.: 16/791,121

(22) Filed: Feb. 14, 2020

(65) Prior Publication Data

US 2020/0186632 A1  Jun. 11, 2020

Related U.S. Application Data

(63) Continuation-in-part of application No. 16/573,063, filed on Sep. 17, 2019, now Pat. No. 10,576,905, which is a continuation-in-part of application No. 16/172,826, filed on Oct. 28, 2018, now Pat. No. 10,717,396.

(51) Int. Cl.
*H04M 1/00*  (2006.01)
*H04M 1/04*  (2006.01)

(52) U.S. Cl.
CPC .................................. *H04M 1/04* (2013.01)

(58) Field of Classification Search
CPC ...... H04M 1/04; H04M 1/0258; H04M 1/026; H04M 1/05; H04M 1/06; H04M 1/12; H04M 1/13; H04M 1/6041; H04M 1/6075
USPC ...................................................... 455/575.1
See application file for complete search history.

(56) References Cited

U.S. PATENT DOCUMENTS

| | | | |
|---|---|---|---|
| D247,548 S | 3/1978 | Crary | |
| D289,898 S | 5/1987 | Miller | |
| 4,854,468 A | 8/1989 | Dahlquist, II et al. | |
| D309,307 S | 7/1990 | Sigurdson | |
| 5,052,649 A | 10/1991 | Hunnicutt | |
| 5,088,673 A | 2/1992 | Chandler | |
| 5,102,086 A | 4/1992 | Thomason | |
| 5,135,195 A | 8/1992 | Dane | |
| 5,174,534 A | 12/1992 | Mitchell | |
| 5,180,088 A | 1/1993 | de Angeli | |

(Continued)

FOREIGN PATENT DOCUMENTS

CN  106427807  2/2017

OTHER PUBLICATIONS amazon.com, website, image of Belkin Car Cup Holder for Smartphones, downloaded on Jan. 17, 2019.

(Continued)

*Primary Examiner* — Huy C Ho
(74) *Attorney, Agent, or Firm* — Perkins IP Law Group LLC; Jefferson Perkins

(57) ABSTRACT

An extension bar for a mount for an electronic device includes an elongate first component. An upper end of the extension bar is adapted to be joined to an electronic device mounting bracket. A clamp is attached to a base of the mount. The base has a hollow interior. The clamp may clamp the first component to the base at any of a plurality of positions along an affixation range defined on the first component. In some of these positions, a lower end of the first component is inserted through an opening in top of the base to be disposed in the hollow base interior.

27 Claims, 46 Drawing Sheets

(56) References Cited

U.S. PATENT DOCUMENTS

| | | |
|---|---|---|
| D332,891 S | 2/1993 | Cumberland |
| 5,285,938 A | 2/1994 | Fauchald |
| 5,285,953 A | 2/1994 | Smith |
| D361,017 S | 8/1995 | Keven |
| D370,392 S | 6/1996 | Flanagan |
| D376,959 S | 12/1996 | Norris |
| D377,740 S | 2/1997 | Swanson |
| D380,650 S | 7/1997 | Norris |
| 5,651,523 A | 7/1997 | Bridges |
| 5,669,538 A | 9/1997 | Ward |
| 5,676,340 A | 10/1997 | Ruhnau |
| 5,745,565 A | 4/1998 | Wakefield |
| D397,915 S | 9/1998 | McNaughton |
| D400,763 S | 11/1998 | Taylor et al. |
| D402,666 S | 12/1998 | Golder |
| D407,408 S | 3/1999 | Hoff |
| 5,897,041 A | 4/1999 | Ney et al. |
| 6,019,325 A | 2/2000 | Dotson et al. |
| D422,182 S | 4/2000 | Miljanich |
| 6,062,518 A | 5/2000 | Etue |
| 6,099,062 A | 8/2000 | Siegel |
| 6,113,049 A | 9/2000 | Miljanich |
| 6,189,755 B1 | 2/2001 | Wakefield |
| D439,116 S | 3/2001 | White |
| 6,246,766 B1 | 6/2001 | Walsh |
| 6,253,982 B1 | 7/2001 | Gerardi |
| 6,267,340 B1 | 7/2001 | Wang |
| 6,315,153 B1 | 11/2001 | Osborn |
| D451,504 S | 12/2001 | Edwards |
| D452,236 S | 12/2001 | Kohli |
| 6,543,637 B1 | 4/2003 | Osborn |
| D475,044 S | 5/2003 | Kohli et al. |
| 6,827,318 B1 | 12/2004 | Hsu Li |
| D501,118 S | 1/2005 | Schrock |
| D513,938 S | 1/2006 | Griffin |
| D516,393 S | 3/2006 | Wickenhauser |
| 7,099,466 B2 | 8/2006 | Walsh |
| 7,099,467 B1 | 8/2006 | Rohrbach |
| 7,140,586 B2 | 11/2006 | Seil et al. |
| 7,194,087 B2 | 3/2007 | Luginbill et al. |
| 7,246,555 B2 | 7/2007 | Small et al. |
| D551,912 S | 10/2007 | Cooke |
| D558,769 S | 1/2008 | Krieger et al. |
| 7,597,301 B2 | 10/2009 | Seil |
| 7,668,309 B2 | 2/2010 | Wilcox |
| 7,708,247 B2 | 5/2010 | Lota |
| D625,715 S | 10/2010 | Adams, II |
| D643,252 S | 8/2011 | Seidl |
| 3,061,670 A1 | 11/2011 | White |
| D651,473 S | 1/2012 | Cribb |
| D655,282 S | 3/2012 | Richter |
| D654,119 S | 7/2012 | Lin |
| D687,437 S | 8/2013 | Hagenauer |
| D705,211 S | 5/2014 | Huang |
| D709,066 S | 7/2014 | Byun |
| 8,777,307 B2 | 7/2014 | Nelson et al. |
| D718,298 S | 11/2014 | Aspinall et al. |
| 8,922,354 B2 | 12/2014 | Nagara et al. |
| 9,079,545 B2 | 7/2015 | Dugan |
| 9,161,466 B2 | 10/2015 | Huang |
| 9,162,630 B2 * | 10/2015 | Pluta ............... B60R 11/02 |
| 9,254,793 B2 | 2/2016 | Won |
| D767,279 S | 9/2016 | Gummo |
| D771,614 S | 11/2016 | Chang |
| D777,720 S | 1/2017 | Russell |
| 9,573,532 B2 | 2/2017 | Riddiford et al. |
| 9,616,793 B2 | 4/2017 | Lliorca |
| D788,571 S | 6/2017 | Richter |
| 9,698,851 B2 | 7/2017 | Andrus |
| 9,758,248 B2 | 9/2017 | Procter et al. |
| D799,469 S | 10/2017 | Esses |
| 9,821,723 B2 | 11/2017 | Mannarino |
| D807,701 S | 1/2018 | Bo |
| D809,998 S | 2/2018 | Dabel et al. |
| 9,900,417 B1 | 2/2018 | Ruiz |
| D817,317 S * | 5/2018 | Lee ..................... D14/253 |
| D823,062 S | 6/2018 | Goodwin et al. |
| 9,987,993 B2 | 6/2018 | Thorimbert |
| D832,248 S * | 10/2018 | Sukphist ............ D14/253 |
| D833,369 S * | 11/2018 | Lan .................... D12/415 |
| D835,113 S | 12/2018 | Kim |
| 10,155,482 B2 | 12/2018 | Corso |
| D837,613 S | 1/2019 | Nichols |
| 10,183,604 B2 | 1/2019 | Krishnan |
| D845,962 S | 4/2019 | Yao et al. |
| D848,412 S | 5/2019 | Greve et al. |
| D848,443 S | 5/2019 | Yao et al. |
| 10,284,250 B2 | 5/2019 | Andrus |
| 10,308,155 B1 | 6/2019 | Cline |
| 10,315,585 B2 | 6/2019 | Minn et al. |
| D858,438 S | 9/2019 | Levy |
| D859,395 S | 9/2019 | Yao et al. |
| D867,346 S | 11/2019 | Hofstede |
| D867,999 S | 11/2019 | Li |
| D868,036 S | 11/2019 | Sohn et al. |
| D868,540 S | 12/2019 | Kemker |
| D868,619 S | 12/2019 | Fohr |
| D868,740 S | 12/2019 | Kang et al. |
| D869,328 S | 12/2019 | Nelson |
| D869,951 S | 12/2019 | Yi et al. |
| D870,040 S | 12/2019 | Wu |
| D870,094 S | 12/2019 | Ma et al. |
| D870,923 S | 12/2019 | Panagiotis et al. |
| D871,149 S | 12/2019 | Kaiser |
| D871,152 S | 12/2019 | Hudson |
| D872,380 S | 1/2020 | Liu |
| D872,511 S | 1/2020 | Parks |
| D872,537 S | 1/2020 | Guccione |
| D872,539 S | 1/2020 | Hewitt et al. |
| D872,725 S | 1/2020 | Lindof |
| D872,727 S | 1/2020 | Chung |
| 2002/0049081 A1 | 4/2002 | Heininger |
| 2002/0094078 A1 | 7/2002 | Edwards |
| 2014/0176062 A1 | 6/2014 | Jung |
| 2018/0001835 A1 | 1/2018 | Corso |

OTHER PUBLICATIONS amazon.com, website, image of Custom Accessories 23384 Heavy Cup Mount Magnetic Phone Holder, downloaded on Jan. 17, 2019.
amazon.com, website, image of Macally Adjustable Automobile Cup Holder Phone Mount, downloaded on Jan. 17, 2019.
amazon.com, website, image of Mediabridge Smartphone Cradle w/Extended Cup Holder Mount, downloaded on Jan. 17, 2019.
amazon.com, website, image of NNDA CO Universal Adjustable Gooseneck Cup Holder Cradle Car Mount for Phone, downloaded on Jan. 17, 2019.
amazon.com, website, image of Sunjoyco Car Cup Holder Mount for Phone Tablet, 2-in-1 Car Cradles Adjustable Gooseneck Holder, downloaded on Jan. 17, 2019.
amazon.com, website, image of Tackform Solutions Car Phone Holder Magnetic Mount, downloaded on Jan. 17, 2019.
amazon.com, website, image of TNP Cup Holder Phone Mount, Universal Car Cup Smartphone Cradle Clamp w/Flexible Neck, downloaded on Jan. 17, 2019.
amazon.com, website, image of USA Gear Cup Holder Suction Mount Surface Adapter, downloaded on Jan. 17, 2019.
crutchfield.com, website, image of Bracketron BT 16572 PhabGrip cup holder mount, downloaded on Jan. 17, 2019.
HDAccessory.com, website, image of Universal Smartphone Cup Holder Mount, downloaded on Jan. 17, 2019.
stacksocial.com, website, image of U-Grip Cup Holder Car Mount for Phones and Tablets, downloaded on Jan. 17, 2019.
walmart.com, website, image of Universal Adjustable Gooseneck Cup Holder Cradle Car Mount for Cell Phone, downloaded on Jan. 17, 2019.
rakuten.com, website, image of Smartphone 8" Long Car Cup Holder, IKross Phone Mount, downloaded on Jan. 17, 2019.
Macally Cell Phone Cup Holder for Car Mount, Amazon.com, Date First Available: Jun. 29, 2017, [online], [site visited Oct. 24, 2019].

(56) References Cited

OTHER PUBLICATIONS

<URL: https://www.amazon.com/Macally-Samsung-Motorola-Smartphones-MCUP/dp/B002JTWRN8> (Year: 2017).
Cellet PH600 Car Cup Holder Mount, Amazon.com, [online], [site visited Oct. 24, 2019]. <URL: https://www.amazon.com/dp/B006BIQBMQ/ref=psdc_2230642011_t4_B002JTWRN8> (Year: 2019).
10 Cup Holder Phone Mount Reviews for 2019, HotRate.com, by Joey Randall, Last Updated Jan. 25, 2019, [online], [site visited Oct. 24, 2019]. <URL: https://hotrate.com/electronics/cup-holder-phone-mount/> (Year: 2019).
Green Sprouts Dream Window Stacking Cups 6 Counts, BabyPallet.com, [online], [site visited Jan. 16, 2020], <URL: https://babypallet.com/product/green-sprouts-dream-window-stacking-cups-6-counts/> (Year: 2020).

\* cited by examiner

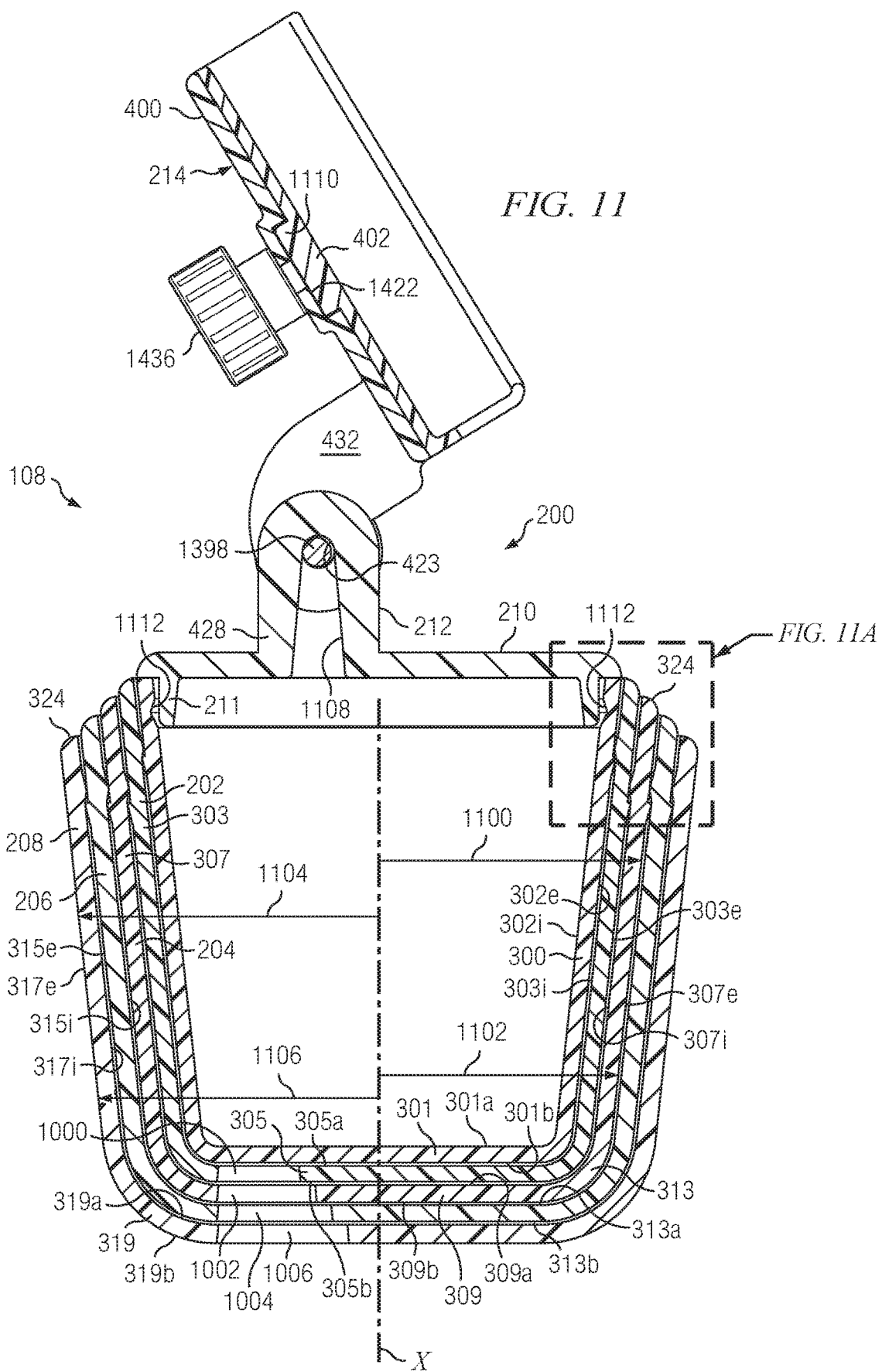

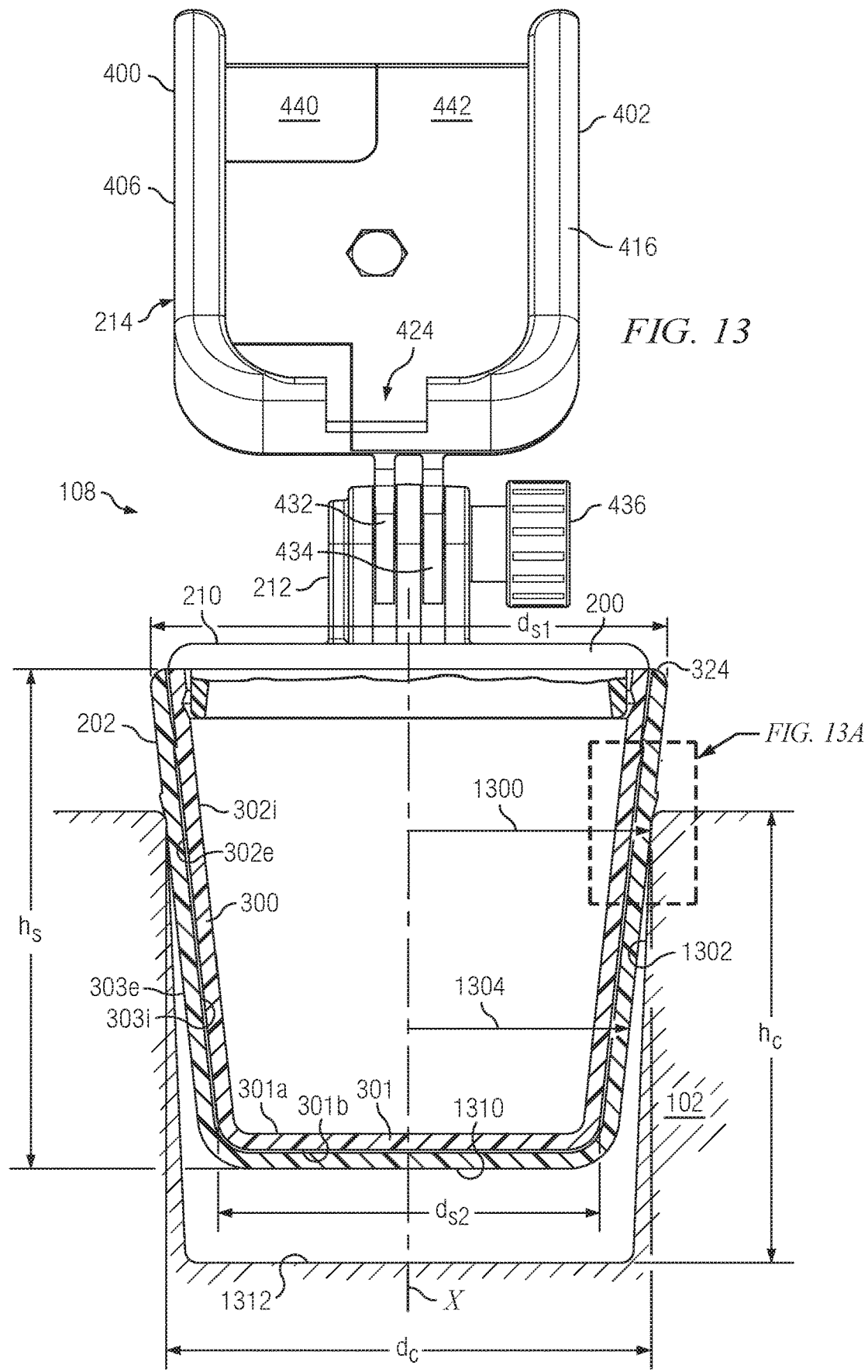

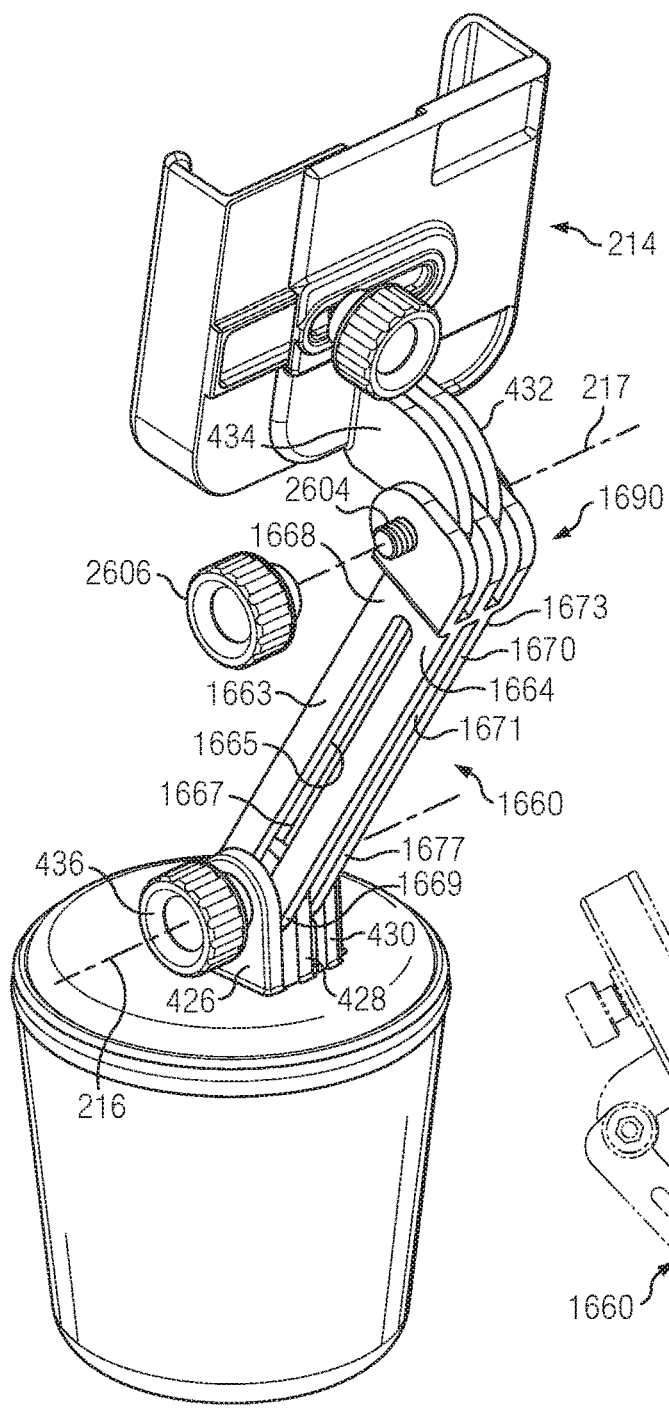
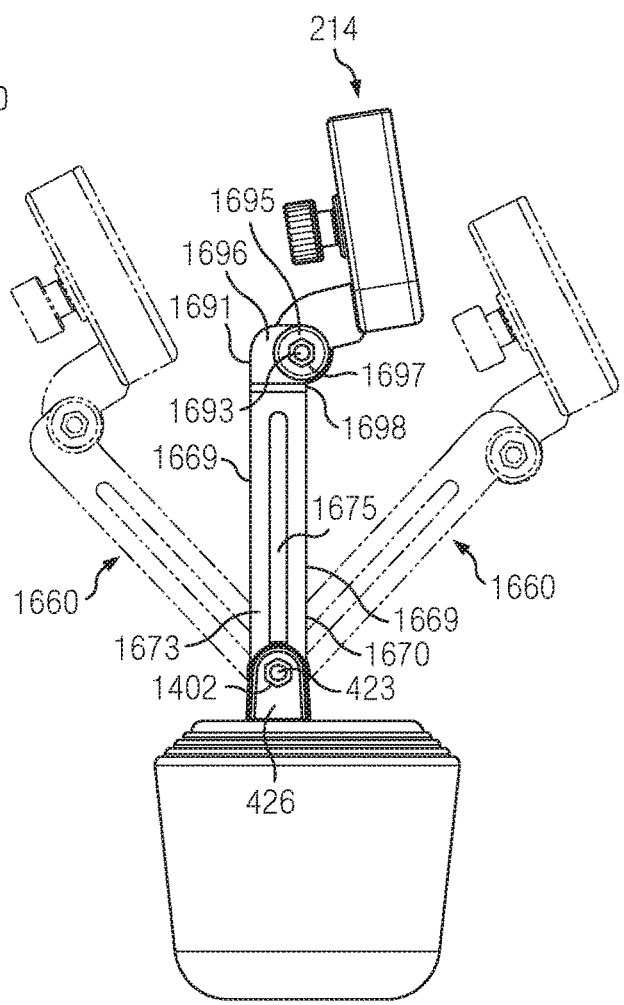
FIG. 26
FIG. 26A

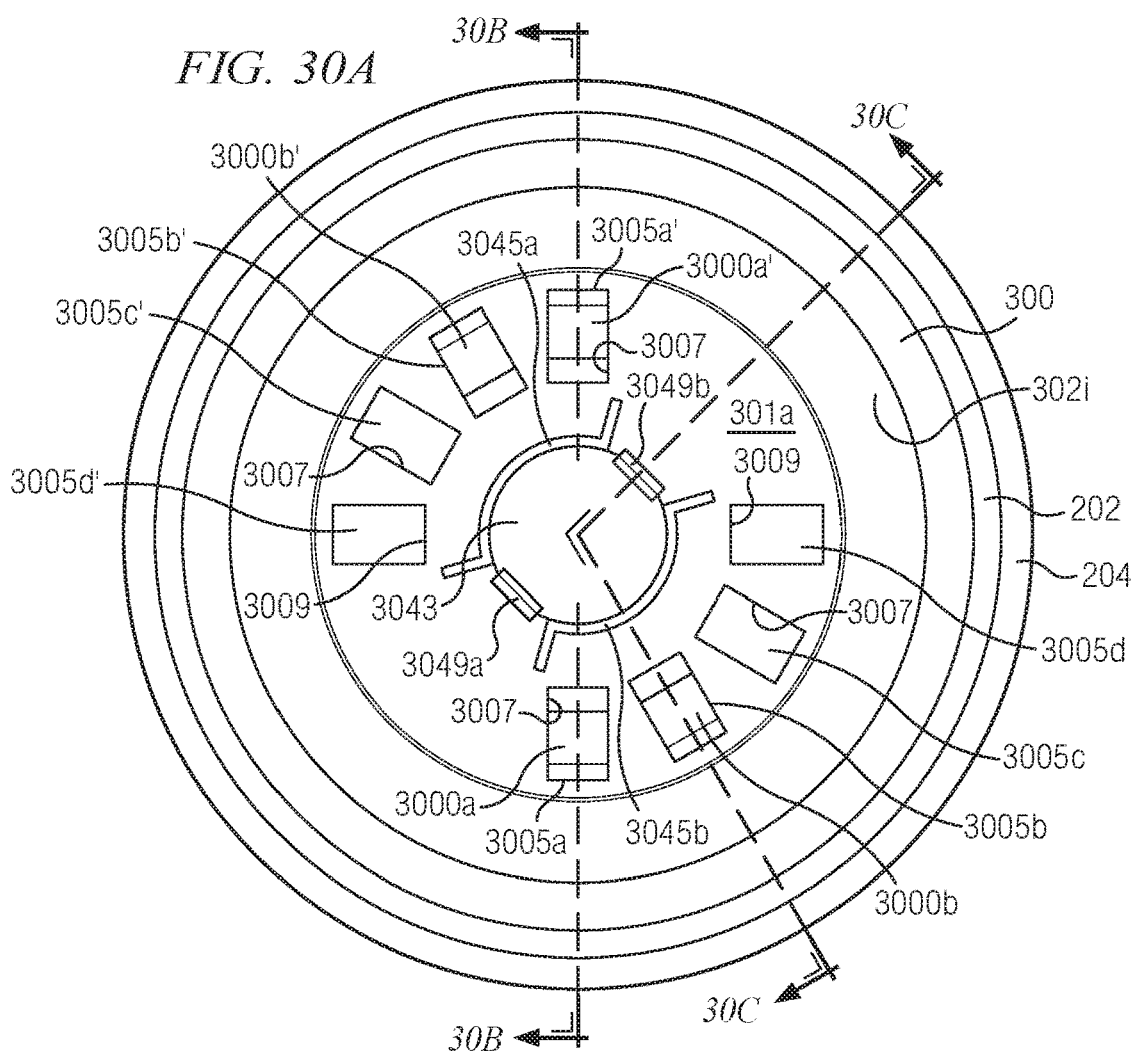
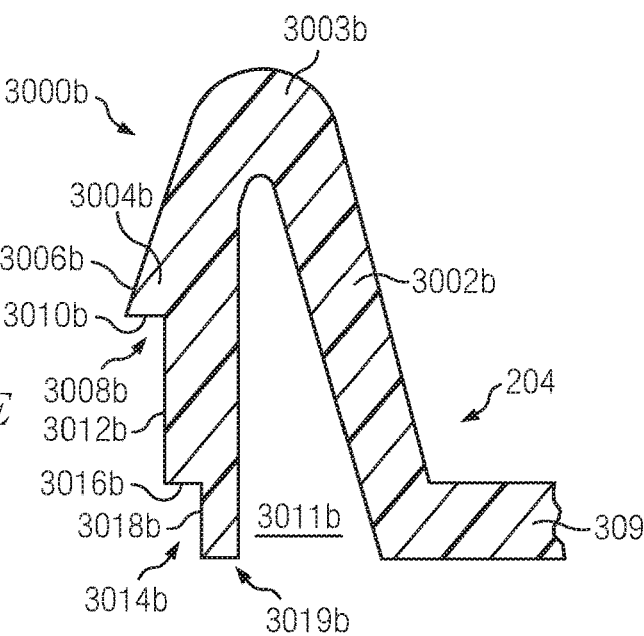

EXTENSION BAR FOR CELL PHONE MOUNT

RELATED APPLICATIONS

This application is a continuation-in-part of co-pending U.S. Nonprovisional patent application Ser. No. 16/573,063 filed Sep. 17, 2019 and assigned to the assignee hereof, which in turn is a continuation-in-part of co-pending U.S. Non-provisional application Ser. No. 16/172,826, filed Oct. 28, 2018 and assigned to the assignee hereof. The disclosure and drawings of the aforementioned applications are fully incorporated by reference herein.

BACKGROUND OF THE INVENTION

Within the last two decades, cellular telephones ("cell phones") have become ever more popular as their abilities have increased. In addition to being telephones, the now-common "smart phone" is a personal data assistant, a screen for photos and videos, an Internet browser, a text messenger, a music player, an email portal, a method of payment, a map, a direction finder, a scanner, a camera and many other things. Because of their expanded functions, it has become common for people to carry their cell phones all of the time. Since for many people much of their day is spent inside of a vehicle, cell phone mounts have been developed that attach the cell phone to various locations in the vehicle interior, such as to the windshield, to a heating/air conditioning vent or to a cup holder.

Vehicle cup holders are now almost universally provided in vehicles, but they do not come in a uniform size. Vehicle cup holders typically are cylindrical, frustoconical or nearly so, so as to accommodate a variety of sizes of cans, bottles and cups, but their radii from a central axis significantly differ from one make of vehicle to another. Some vehicle cup holders further have inwardly projecting fingers meant to grip the sides of a beverage container. A successful universal cup holder cell phone mount will have a means to adjust it to fit any of a range of cup holder sizes, but at the same time should be inexpensive to manufacture and should be easy for an end user to deploy. The cup holder cell phone mount also should have a means for holding cell phones of different widths and for adjusting the angle and height of the cell phone screen for optimum viewing, and once installed should resist coming loose as a result of vibration, vehicle acceleration or deceleration or a vehicle change in direction.

SUMMARY OF THE INVENTION

According to one aspect of the invention, a vehicle cup holder cell phone mount is provided to mount a cell phone to any of a plurality of vehicle cup holders in a wide range of radial and depth sizes. The mount includes a base with a base with a sidewall having a base outer surface. The base outer surface is generally formed as a surface of rotation around a vertical axis. The base outer surface is downwardly and inwardly tapered. A pier extends upward from the top of the base, and a cell phone mounting bracket is coupled to this pier.

The mount also includes a plurality of shells, including first and second shells, adapted to be selectively and sequentially assembled to the base in order to increase the radius of the assembly and best fit a selected one of the vehicle cup holders. A first outer surface of the first shell is formed as a surface of rotation around the axis, and is generally inwardly and downwardly tapered between a top end of the first outer surface and a bottom end of the first outer surface. A second outer surface, of the second shell, is also generally formed as a surface of rotation around the axis, and is downwardly and radially inwardly tapered between a top end of the second shell sidewall and a bottom end of the second shell sidewall.

Means are provided for releasably affixing the first shell to the base, and further means are provided to releasably affix the second shell to an assembly of the base and the first shell. These means for affixing may be any of several kinds, as will be described in more detail below. In any case, each means for releasably affixing is more than just a frictional engagement of a smooth outer surface of the base or inner shell with a smooth inner surface of the next outer shell. The apparatus is meant to be press-fit into a cup holder, and as such the force or torque necessary to remove the shells from each other or the base should be greater than or in a direction different than the force necessary to disengage the cell phone mount from the vehicle cup holder.

The plurality of shells are provided to the user in a range of increasing radial sizes. For example, a radius to the outer surface of the second shell sidewall will in general be greater than a radius to the outer surface of the first shell sidewall, and a radius to the outer surface of the first shell sidewall will in general be greater than a radius to the outer surface of the sidewall base. Because the sidewalls are downwardly and radially inwardly tapered rather than cylindrical, there may be some overlap.

To install the mount in a cup holder of a particular vehicle, the user ascertains the approximate radius or size of the vehicle cup holder. In some instances, the user will determine that he or she needs no shells at all, in which case none of the shells is assembled to the base and instead the base is directly press-fit into the vehicle cup holder. Otherwise, the user will select one of the shells as providing the best fit to the inner wall of the vehicle cup holder. This shell may be the first, second, third, fourth, etc. shell in a sequentially increasing range of sizes. The user affixes the first shell to the base. If the first shell is the same as the selected, best-fitting shell, the user puts the other shells aside and press-fits the resulting base assembly into the vehicle cup holder. If the first shell is not the same as the selected shell, the user releasably affixes the second shell to an assembly of the base and the first shell. The user builds up the assembly in this fashion until the last shell assembled to the base assembly is the same as the selected, best-fitting shell. The user then press-fits the base assembly into the vehicle cup holder.

The base and shells of the mount are provided so as to fit a large range of vehicle cup holders. The vehicle cup holders vary in depth and diameter. Therefore, the dimensions of the outer surfaces of the base and shells are chosen such that a bottom of the base or a bottom of any employed shell will be spaced from a bottom of the selected vehicle cup holder. The degree of taper of the base outer surface and each of the shell outer surfaces is chosen to be greater than the range of taper or pitch encountered in the given range of vehicle cup holders. This dimensioning and specification of taper insure a tight and enduring frictional and/or interference fit between the employed base/shell outer surface and the vehicle cup holder inner side wall.

In another aspect of the invention, apparatus for mounting a cell phone to a vehicle cup holder has a base formed around an axis. A first outer surface of the base is adapted to be press-fit into a vehicle cup holder that falls within a predetermined range of sizes. A mounting pier extends upwardly from a top of the base. A cell phone mounting bracket is rotatably affixed to the pier and has first and second jaws. The first jaw has a first u-shaped channel with a first upper segment. The second jaw has a second u-shaped channel with a second upper segment, disposed in parallel and spaced from the first upper segment. The second jaw is movable with the respect to the first jaw so that a width, taken perpendicularly to the axis, between the first upper segment and the second upper segment may be adjustable by a user so as to fit a width of the cell phone to be mounted. Means are provided to affix the second jaw relative to the first jaw in any of a plurality of positions.

The first u-shaped channel further has a first lower segment and the second u-shaped channel has a second lower segment. The first and second lower segments are aligned with each other and are disposed in a plane perpendicular to the base axis. The first and second lower segments are adapted to hold a lower end of the cell phone. In one embodiment, there is a space in between a first inner end of the first lower segment and a second inner end of the second inner segment, even when the second jaw is moved to the closest position that it can take relative to the first jaw. The first and second inner ends define an access hole or opening between them, for a cell phone power/communications cable such as a firewire cable. Such cables usually are plugged into a port in a bottom edge of the cell phone.

Several alternative structures can be used to releasably affix the first shell to the base, and to releasably affix the second, third, fourth, etc. shells to the assemblies interior to them. In one embodiment, the affixation means includes a circumferential rib radially outwardly extending from the base near an upper end of the base outer surface, and a radially inwardly extending circumferential rib formed on an inner surface of the first shell. The inner rib of the shell snaps over the outer rib on the base.

In a second affixation means, the sidewall of the base has at least two angularly spaced apart bumps near the lower end of the base outer surface. These bumps extend radially outwardly from the base outer surface. The first shell has at least two angularly spaced apart bumps formed on its sidewall. The inner surface of each shell bump is complementary in shape to the shape of a base bump, so that a shell bump will snap over a respective base bump. A greatest radius of the shell bump outer surface is chosen to be greater than a radius of the inner wall of a selected vehicle cup holder.

In a third affixation means, a plurality of angularly spaced-apart projections extend inwardly from the inner surface of the first shell. The base, which in this embodiment has a hollow interior, has a plurality of angularly spaced-apart projection-receiving openings formed in its outer surface. Each projection-receiving opening is configured to receive and hold a respective one of the projections when the first shell is affixed to the base in a bayonet fashion: the shell is positioned on the axis, is moved toward the base on the axis, and then is twisted around the axis relative to the base.

In a fourth affixation means, a plurality of angularly spaced-apart projections upwardly extend from the upper surface of the bottom wall of the first shell. The base has a hollow interior. A plurality of angularly spaced-apart projection-receiving openings are formed in the bottom wall of the base. Each of the projection-receiving openings is configured to receive and hold a projection therein, when the first shell is positioned on the axis, is axially moved toward the based, and is then twisted around the axis relative to the base.

In a fifth affixation means, a first retainer is formed on the bottom wall of the first shell. A first receiving hole is formed through the bottom wall of the base, which is hollow. The first receiving hole is vertically registered with the first retainer. The first retainer is adapted for insertion through the first receiving hole to capture and hold the bottom wall of the base.

In a related embodiment, plural retainers and receiving holes are provided, so as to be spaced an equal distance away from the axis. Each retainer has a base arm joined to the bottom wall of the first shell, and an attachment arm joined to the base arm by a spring hinge. A receiving hole receives the retainer when the retainer is in a compressed state, in which the base arm and the attachment arm are compressed toward each other. After insertion through the receiving hole, the attachment and base arms assume a resting state to affix the first shell to the base.

In a sixth affixation means, retainers are provided on the upper surface of the first shell as before. But these retainers each are a ratcheting arm with at least one tooth formed thereon. A bottom surface of each tooth captures the upper surface of the bottom wall of the base when the ratcheting arm is fully inserted through the respective base receiving hole.

In a seventh affixation means, the first shell is provided with a circular ratcheting post upstanding from the upper surface of its bottom wall. The bottom wall of the base is provided with a circular ratcheting post receiving aperture. The ratcheting post has plural, radially outwardly extending rings that are adapted to assume a compressed state, in which they are insertable through the aperture, and a resting state, in which the rings capture the base bottom wall.

In an eighth affixation means, the bottom wall of the first shell has a female component in which a central depression is formed therein. A male component is formed in the lower surface of the bottom wall of the base. An axial twisting of the shell with respect to the base will affix the male component to the female component.

In a further aspect of the invention, a mount for an electronic device includes a base and a mounting bracket for an electronic device, such as a cell phone. The base may be adapted to fit to a vehicle cup holder. The base has an opening formed in its top that has a predetermined width orthogonal to the vertical axis and a predetermined depth orthogonal to the width and the vertical axis. An extension bar is provided to connect the base to the mounting bracket. The extension bar has an elongate first component with an upper end and a lower end spaced apart by a length of the extension bar. The first component has a maximum width that is less than the width in the opening in the top, and a maximum depth that is less than the depth of the opening in the top.

A clamp is joined to the top of the base. This clamp may be clamped to the first component at any of a plurality of positions along an affixation range that occupies a portion of the length of the first component. The affixation range has an upper portion and a lower portion. When the clamp clamps to any position in the upper portion of the affixation range, the lower end of the first component is inserted through the opening in the top and is disposed within the hollow interior of the base.

The first component may have a slot with an upper end and a lower end. The affixation range may be defined by the upper and lower ends of the slot. A mounting pier may be formed to extend upwardly from the top of the base, and the clamp may be operable to clamp the first component, at any of the positions in the affixation range, to the mounting pier.

In one embodiment, the extension bar connects the mounting pier on the base to a cell phone mounting bracket.

This extension bar permits the cell phone to be positioned at various heights above the base. In embodiments, the extension bar is pivotally coupled to the pier, to the cell phone mounting bracket, or to both, permitting the cell phone to be transversely displaced from a base axis, either toward or farther away from the user than the position of the base. In one embodiment, an unused length of a first component of the extension bar is slid into an opening in the top of the base, so as to be housed in the hollow interior of the base. The user may choose to pull out only so much of the extension bar that he or she needs for comfortably viewing and using the cell phone.

In one embodiment, the mounting pier includes a first pier plate that upwardly extends from the top of the base, and a second pier plate that upwardly extends from the top of the base so as to be spaced from the first pier plate. A first opening is formed in the top of the base between the first pier plate and the second pier plate, so as to communicate to the hollow interior of the base. For a subset of the plurality clamping positions selectable by the user, a lower end of the first component of the extension bar is slid through the first opening in the top of the base so as to be disposed in the hollow interior of the base.

In one embodiment, the mounting pier further includes a third pier plate that is spaced from the second pier plate. A second opening is formed through the top of the base and communicates to the hollow base interior. The second opening is located between the second pier plate and the third pier plate. The extension bar further has a second component that is parallel to the first component and has a top end and a bottom free end. The second component of the extension bar is joined to the first component thereof only at their respective top ends, the bottom ends being free. In those positions in which the free bottom end of the first component is inserted through the first opening in the top of base, the free bottom end of the second component will be inserted through the second opening in the top of the base. The clamp will clamp the second extension bar component between the second and third pier plates.

In one embodiment, the first opening formed in the top of the base has a predetermined length that is greater than a width of the first component, the last of which is uniform along the length of a height adjustment slot formed in the first component. The difference between this length and this width permits an increased range of angular motion of the extension bar around a mounting pier clamping axis, even when the free bottom end of the first component has been inserted through the opening.

In a related embodiment, an extension bar is provided for a mount for an electronic device. A first bar component has an upper end and a lower end spaced from the upper end in a length direction. A first adjustment slot is formed in the first bar component and extends in the length direction throughout most of the length of the first bar component. The first adjustment slot has a length and an upper end disposed near the upper end of the first bar component. The extension bar further has a second bar component with an upper end and a lower end spaced from the upper end in the length direction. The second component has formed therein a second adjustment slot extending throughout most of the length of the second bar component. The second adjustment slot has a length and an upper end disposed near the upper end of the second bar component. The extension bar further has a cradle adapted to be joined to an electronic device mounting bracket. The upper ends of the first and second bar components are joined to the cradle and the first and second bar components are joined to each other only through the cradle. The first adjustment slot is in registry with the second adjustment slot, so that a shaft of a clamping screw or pin may be inserted through both slots anywhere along their lengths. The first and second bar components are uniformly spaced from each other except where they are joined together at the cradle.

In one embodiment, the cradle of the extension bar has a floor that joins together the upper ends of the first and second bar components. A plurality of cradle plates upwardly extend from the floor to be spaced apart from each other. The cradle plates are disposed on a mounting bracket clamping axis that is orthogonal to the length axis of the extension bar. In one embodiment, at least one of the cradle plates is displaced from the first bar component along the mounting bracket clamping axis. In a preferred embodiment, all but one of cradle plates is displaced in the same direction along the mounting bracket clamping axis from both first and second components of the extension bar, creating an offset that makes it easier to route a power or communications cable to the bottom of the electronic device.

In one embodiment, an elastomeric sleeve or band is provided for installation around the outer surface of the best-fitting shell. This sleeve or band has a relatively high coefficient of friction with the sidewall of the vehicle cup holder and may provide a more secure installation into a vehicle cup holder with irregular sides.

BRIEF DESCRIPTION OF THE DRAWINGS

Further aspects of the invention and their advantages can be discerned in the following detailed description as read in conjunction with the drawings of exemplary embodiments, in which like characters denote like parts and in which:

FIG. 11 is an axial sectional view of the mount as using four shells;

FIG. 13 is an axial sectional view showing how the cell phone mount assembly, as using a single shell, has been press-fit into a representative vehicle cup holder;

FIG. 26 is a perspective view of a one-piece extension bar as mounted between the cell phone mounting bracket and the cell phone mounting pier, used for adjusting the height of the vertical height and transverse displacement of the cell phone mounting bracket;

FIG. 26A is a side view of the assembly of FIG. 26 showing its capacity for adjustment in various angular positions;

FIG. 30A is a top view of the attachment means shown in FIG. 30;

FIG. 30E is a magnified sectional detail of a representative spring clip shown in FIG. 30D;

DETAILED DESCRIPTION

Figure 1:
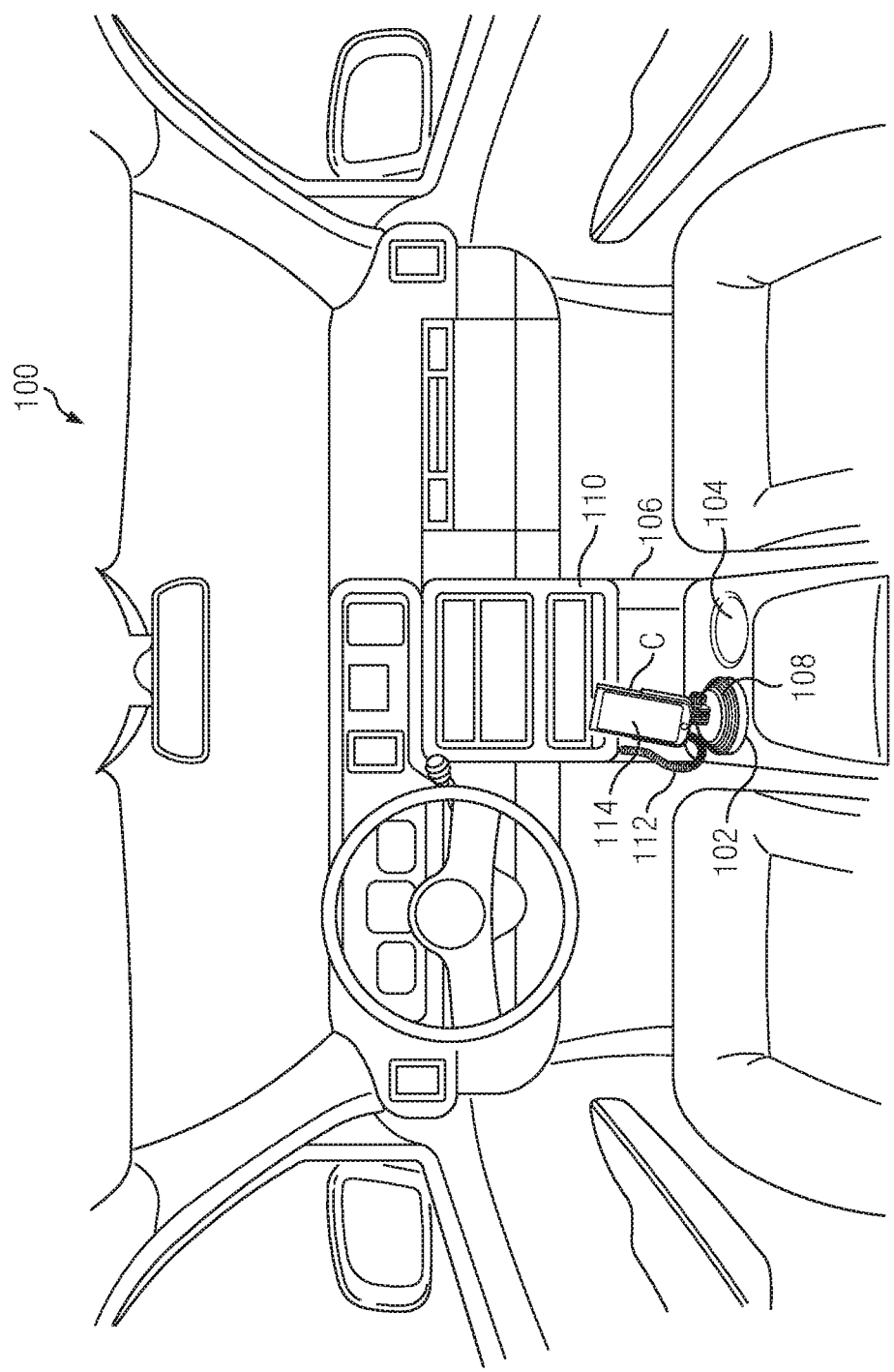
FIG. 1 is a perspective view of a vehicle interior, showing how the invention is deployed.

FIG. 1 shows a typical interior of a vehicle 100 in which two cup holders 102 and 104 are formed in a vehicle center console 106. A cell phone mount 108 according to the invention has been fitted into a driver's side cup holder 102 and a cell phone C is being held by a cell phone mounting bracket of mount 108, described in detail below. The cell phone C may be connected by a power/communications cable 112, such as a firewire cable, to a port in a dashboard 110 of the vehicle 100. The cell phone C has a screen 114, the angle and position of which may be adjusted by the user for optimum viewing. The mount 108 or variations thereof also could be used to hold other electronic devices, such as navigation devices or tablets.

While the cell phone mount 108 is shown press-fitted into the driver's side cup holder 102, it may be used in any other cup holder within the interior of vehicle 100, of which a passenger's side cup holder 104 is only one example. The mount 108 (or an additional copy thereof) could also be used to mount a cell phone to a cup holder in a second or third row of seats (not shown). The cell phone mounting apparatus according to the invention is not limited to use within an automobile but can be used within any type of land, water or air vehicle that is provided with drink cup holders, including SUVs, golf carts, boats and aircraft.

One embodiment of the cell phone mount 108 is shown in more detail in FIGS. 2-10. Mount 108 includes a base 200 and a plurality of hollow shells 202-208 that are provided with a means for releasably affixing at least a first shell to the base. In this illustrated embodiment, four such hollow shells 202, 204, 206 and 208 are provided in a range of different, sequentially increasing radial sizes so that a user may fit the apparatus to any of a plurality of vehicle drink cup holders in a range of radial sizes. For example, a user may releasably affix a first shell 202, the outer surface of which has the smallest radius from axis X, to the base 200 and then determine if that combination will allow the mount to be securely press fit to within the interior of the selected vehicle drink holder. If not, a user can affix a second shell 204 to the exterior of the first shell since the second shell has a larger radius than the first shell. If that combination does not allow the mount to be securely press-fit within the vehicle drink holder, the user may then affix a third shell 206 to the exterior of the second shell 204. The third shell 206 has a larger radius than that of the second shell 204. If that combination does not allow the mount to be securely press fit to the interior of the vehicle drink holder, then the largest shell 208 can be affixed to the exterior of the third shell 206. In other variations, either more or fewer shells may be provided. Alternatively, the user may use none of the shells 202-208, and instead press-fit the tapering sidewall of the base 200 to the sidewall of the selected vehicle cup holder.

Figure 2:
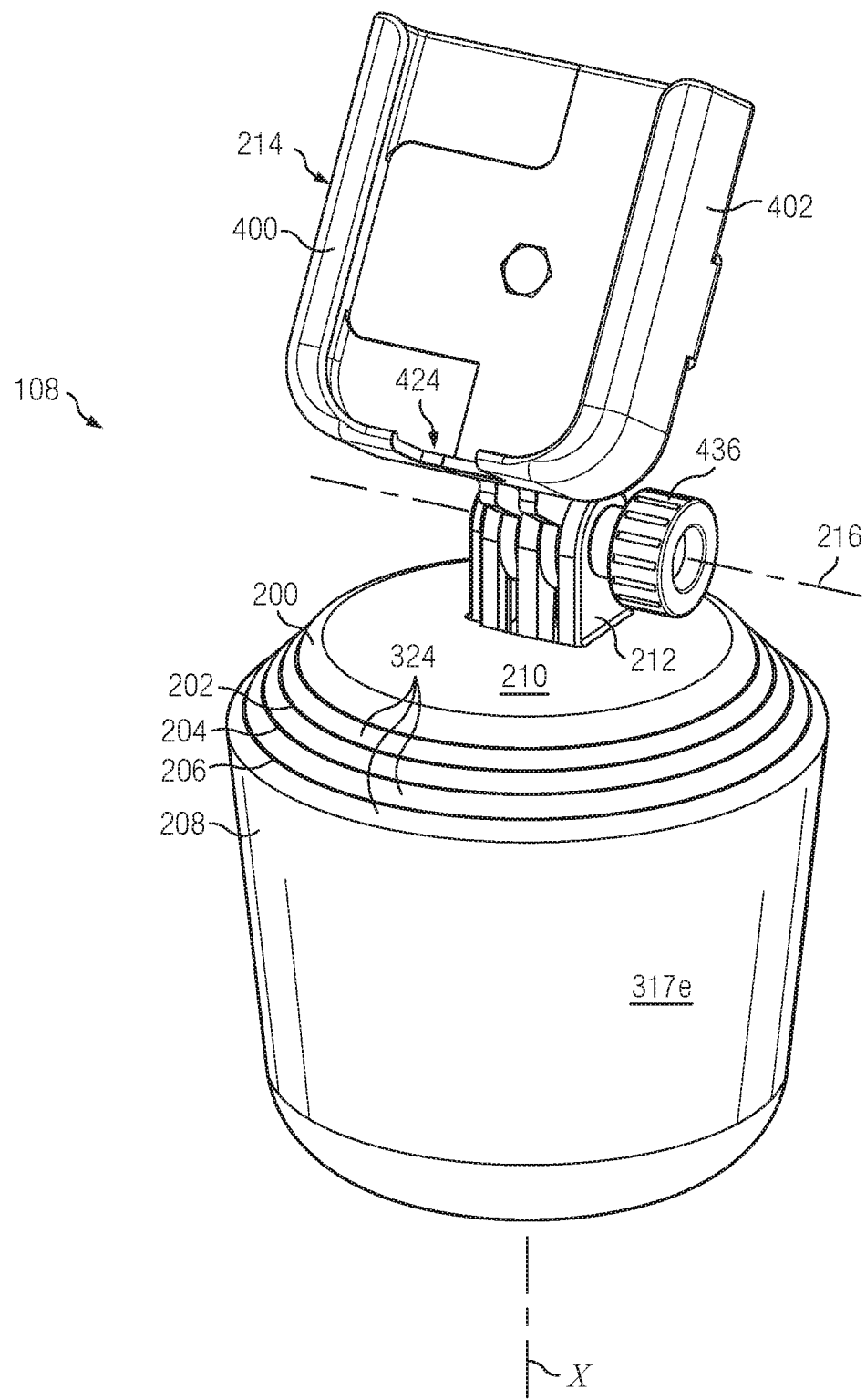
FIG. 2 is an isometric view of a cell phone mount as assembled with four shells.
Figure 11A:
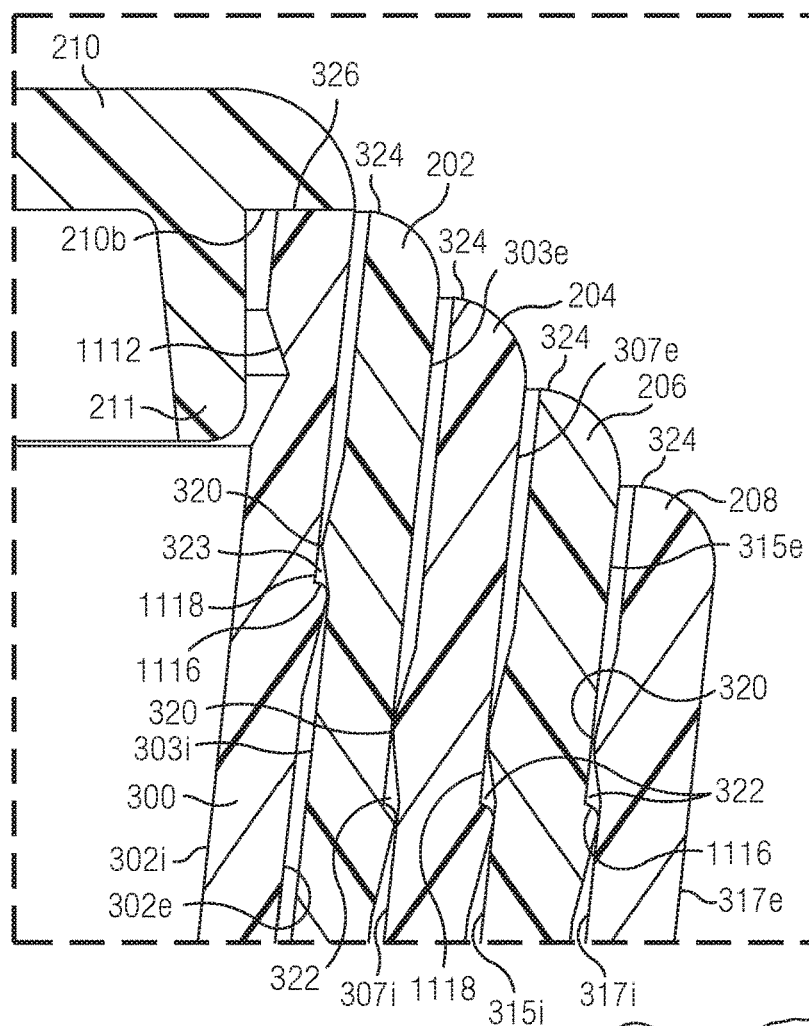
FIG. 11A is a detail of FIG. 11.

FIG. 2 shows a configuration of the cell phone mount 108 in which all of the shells 202-208 have been assembled to base 200. The base 200 has a top or lid 210 with a substantially flat horizontal upper surface, from which upwardly extends a cell phone mounting bracket pier 212. A cell phone mounting bracket 214 is rotatably affixed to the pier 212 around an axis 216, which is horizontal and perpendicular to axis X. In FIG. 11A, top 210 is also seen to have a substantially flat, horizontal bottom surface 210b, from which a circumferential flange 211 downwardly depends.

Figure 3:
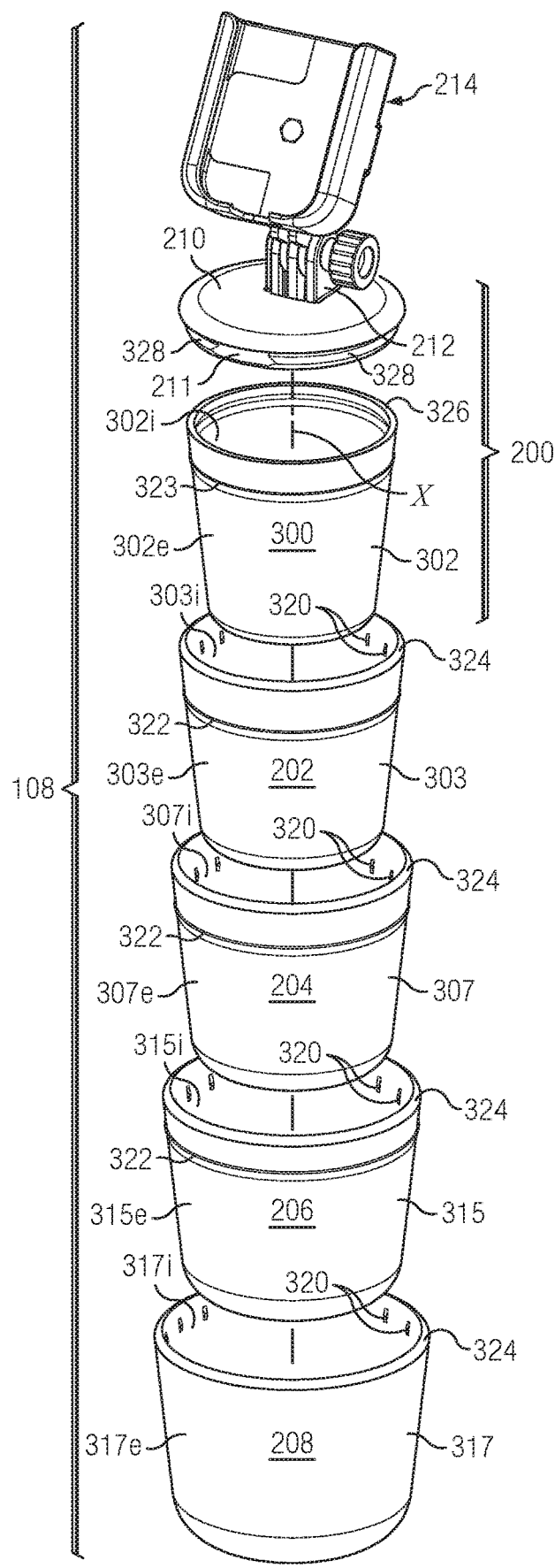
FIG. 3 is an exploded view showing how a mount base and a plurality of shells fit together.

As seen in FIG. 3, the base 200 includes a hollow inner cup 300, onto which the base top or lid 210 may be frictionally snapped for a very difficult but releasable attachment. Alternatively the base lid 210 may be glued, heat-bonded or ultrasonically welded so as to be permanently attached to inner cup 300.

Most of the parts of the mount 108 preferably are injection-molded from a tough, resilient plastic, such as ABS or polypropylene. As an aid to moldability, the various plastic components of mount 108 all have relatively thin walls of a roughly uniform thickness. Hence, inner cup 300 preferably is hollow. In other embodiments, the base 200 could be fabricated or machined as a single piece, or could have a hollow plastic external wall as shown but also a weight (see, e.g., FIGS. 30, 30A, 30B and 30C) affixed to or filling its interior.

In the embodiments illustrated in FIGS. 3 and 11, inner cup 300 of base 200 has a sidewall 302 with an inner surface 302i and an opposed outer surface 302e, wherein at least the outer surface 302e is preferably formed as a surface of rotation around vertical axis X. The inner surface 302i bounds a base interior. Cup sidewall outer surface 302e has a generally downward and radially inward taper between an upper and a lower end of the sidewall 302. The lower end may be joined to a base bottom wall 301, as by a suitable curved transition. The bottom wall 301 preferably is integrally molded with the base cup sidewall 302.

As seen in FIG. 11, the base bottom wall 301 has a top or inside surface 301a and a bottom or outside surface 301b. In the illustrated embodiment, sidewall 302 is a frustum of a cone, such that an axial section of it shows a straight wall, although in other embodiments the sidewall could be convex or concave and a part of or all of the interior may be solid. For some variations as to shape, see FIGS. 3A-3C and 18.

In this illustrated embodiment, the first shell 202 has a sidewall 303 with an inner surface 303i and an opposed outer surface 303e. In the embodiments illustrated in FIGS. 3 and 11, the inner surface 303i of first shell 202 may be removably affixed to the outer surface 302e of base inner cup 300. Each surface is preferably formed as a surface of rotation around axis X, each such surface having a generally downward and radially inward taper between an upper end and a lower end of the sidewall. Inner surface 303i of first shell sidewall 303 bounds a first shell interior. Shell 202 may include a bottom wall 305 (FIG. 11) integrally molded or otherwise formed with the shell sidewall 303. The bottom wall 305 has an upper or inside surface 305a and an outside or bottom surface 305b. In many embodiments, an inner surface 307i of the second shell sidewall 307 may be removably affixed to the outer surface 303e of the first shell sidewall 303.

In the embodiments illustrated in FIGS. 3 and 11, the second shell 204 has a sidewall 307 with an inner surface 307i and an opposed outer surface 307e. Each surface 307i, 307e is preferably formed as a surface of rotation around axis X, each having a generally downward and radially inward taper between an upper end and a lower end of the sidewall 307, thereby defining a second shell interior and a frustoconical shape. Shell 204 may include a bottom wall 309 integrally formed with the shell sidewall 307. The bottom wall 309 has an inside or top surface 309a and an outside or bottom surface 309b. An inner surface 315i of the third shell sidewall 315 may be releasably affixed to the outer surface 307e of the second shell sidewall 307.

In the illustrated embodiment, the third shell 206 has a sidewall 315 that has an inner surface 315i and an opposed outer surface 315e. Each surface 315i, 315e preferably is formed as a surface of rotation around axis X, each having a generally downward and radially inward taper between an upper end and a lower end of the sidewall 315, thereby defining a third shell interior and a frustoconical shape. Shell 206 may include a bottom wall 313 integrally formed with the sidewall 315. The bottom wall 313 has an inside surface 313a and an outside surface 313b. An inner surface 317i of the fourth shell 208 is removably affixable to the outer surface 315e of the third shell 206.

In the illustrated embodiment, the fourth shell 208 has a sidewall 317 that has an inner surface 317i and an opposed outer surface 317e. Each surface 317i, 317e is preferably formed as a surface of rotation around axis X, each having a generally downward and radially inward taper between an upper end and a lower end of the sidewall, thereby defining a fourth shell interior and a frustoconical shape. Shell 208 may include a bottom wall 319 integrally formed with the sidewall 317. The bottom wall 319 has an inside surface 319a and an outside surface 319b.

In the illustrated embodiment, outer surfaces 303e, 307e, 315e and 317e all have a similar pitch or degree of taper, which matches the degree of taper of base outer surface 302e. In the illustrated embodiment the inner surfaces 303i, 307i, 315i and 317i have a similar pitch or degree of taper and are substantially frustoconical. This matching of shape and pitch permits the shells 202-208 to be selectively assembled to the base 200 in "Russian doll" fashion, as the second and each subsequent shell will fit over or envelop the radially smaller shell inside of it.

The degree of taper of the outer surfaces 302e, 303e, 307e, 315e and 317e is chosen to be greater than the degree of taper or pitch of the vehicle cup holders into which they will be press-fit. The difference between cup holder pitch and shell pitch is seen, for example, in FIG. 13. The pitch of a typical original equipment manufacturer (OEM) vehicle cup holder is in the range of 0 to about 2½ degrees. Therefore, for the best press-fit or wedging effect, the degree of taper for surfaces 302e, 303e, 307e, 315e and 317e is chosen to be in the range of about 3 degrees to about 15 degrees, more preferably in the range of about 3 degrees to about 9 degrees, and most preferably about 6 degrees.

The outer surfaces 302e, 303e, 307e, 315e and 317e may take forms other than the frustoconical form shown. Instead of the taper being at a fixed angle throughout the length of the outer surface, the amount of taper can change from one location on any of these outer surfaces to the next. The degree of taper at a particular point on an outer surface may vary smoothly as a function of the height of the point from the top 200. A smooth, monotonic variance in taper will produce a surface that is convexly or concavely curved.

Figure 18:
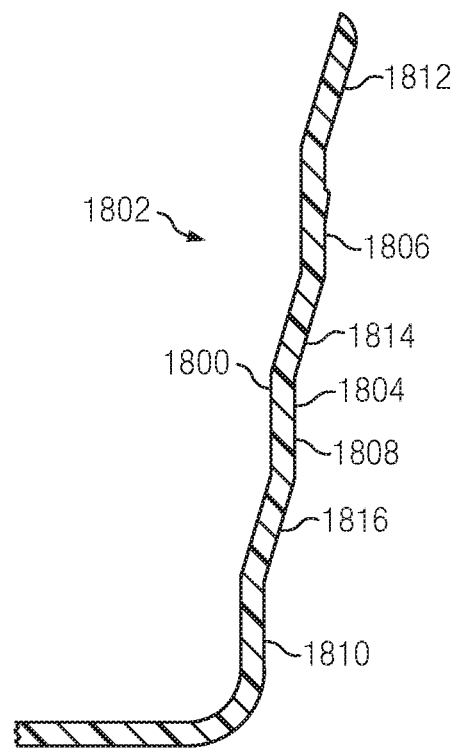
FIG. 18 is an axial sectional detail of an alternative base or shell surface, showing a stepped profile.

Alternatively, any or all of these outer surfaces may be stepped. One stepped embodiment is shown in FIG. 18. A side wall 1800 of a base or shell 1802 has an outer surface 1804 with multiple cylindrical segments 1806, 1808, 1810, smoothly joined by and spaced from each other by frustoconical segments 1812, 1814, 1816. The radius of each of the cylindrical surface segments 1806, 1808, 1810 is different from the others. The radii of the cylindrical surface segments 1806, 1808 and 1810 may be chosen so as to be optimally press-fit to the inner side walls of vehicle cup holders in particularly prevalent sizes. For example, cylindrical segment 1808 may have an outer diameter that is slightly greater than the inner diameter of a side wall of a cup holder known to exist in a popular vehicle model, or range of same.

Figure 3A:
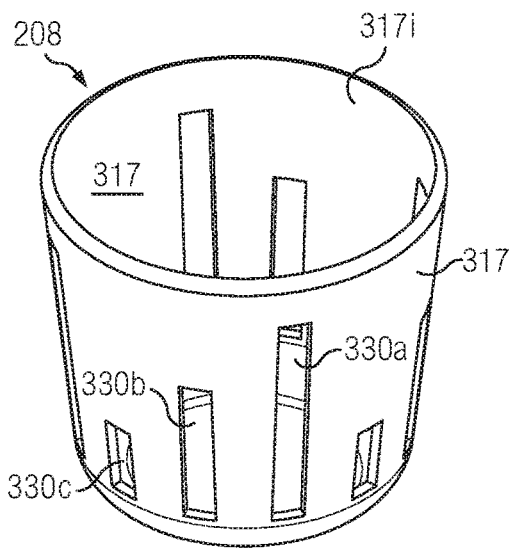
FIG. 3A is a perspective view showing a modified shell body without a continuous and solid shell sidewall.

Most of the illustrated embodiments show the sidewalls of the inner base inner cup 301 and the shells 202-208 being formed as continuous surfaces of rotation around a vertical axis. However, this does not need to be the case. In FIG. 3A, an embodiment is shown with a series of openings 330a, 330b, 330c, which fully extend between the inside and outside wall surfaces 317i and 317e and are angularly spaced apart about the shell sidewall 317. FIG. 3A shows a repeating pattern of openings that are each rectangular in shape, vary in height from tall to short, and have consistent spacing between openings. The openings are also shown to have consistent widths, even though the openings may have different shapes, widths, heights and be inconsistently spaced from one another. Although only shell 208 is shown in FIG. 3A, each of the remaining shells 206-202 and inner base inner cup 300 may also be formed with the same sidewall openings as described or only some shells and the base may be provided with sidewall openings. Other geometrically shaped openings and other patterns can be provided such that the openings on each shell differ in type, number and location from one shell to the other. In addition, the openings may be displaced from each other in an ordered or a random fashion. Where different openings are formed in different ones of the shells, the user may be able to distinguish between them based on the differences.

Figure 3B:
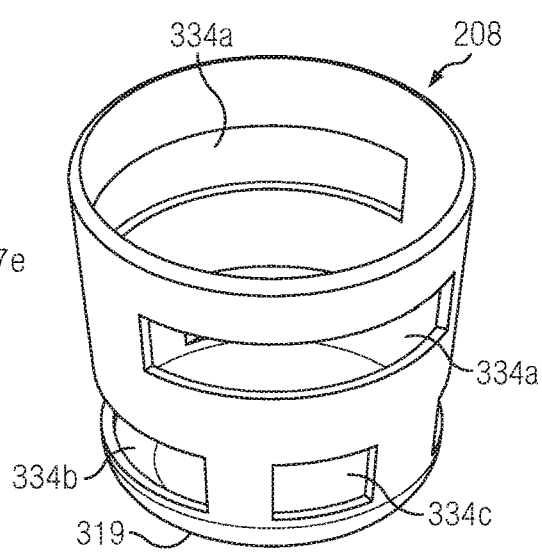
FIG. 3B is a perspective view showing a second modified shell body without a continuous and solid shell sidewall.

FIG. 3B shows a series of rectangular openings 334a, 334b, 334c that have their respective long sides of the opening oriented parallel to the shell bottom wall 319. In the case where a relatively continuous opening is encircling the shell and disposed parallel to a shell bottom wall 1310 or base inner cup bottom 301, it is important not to make the opening sizes or the number of openings so large or numerous that they will compromise the hoop strength of the shell and/or base inner cup. Otherwise, the shell or base inner cup may be subject to cracking or breaking when it is pushed downwardly into the vehicle drink holder. Additionally, the size, number and orientation of the openings should never compromise the ability of the shells to attach to each other or to the base inner cup.

In some situations, the provision of shell openings may favorably introduce flexibility to the sidewall of the shell and base inner cup, which in turn may promote a stronger frictional engagement against the internal wall of the vehicle drink holder.

Figure 3C:
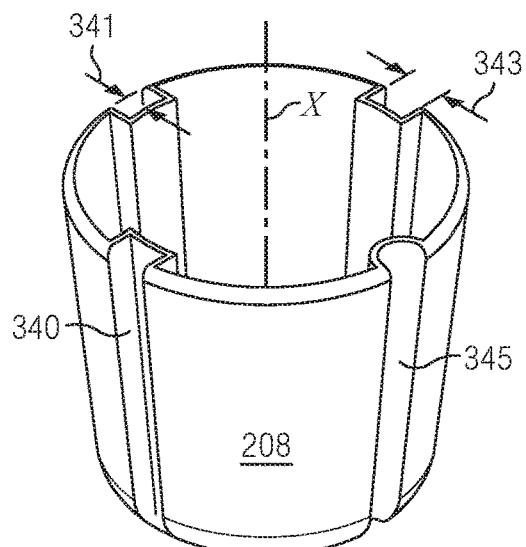
FIG. 3C is a perspective view showing a shell body sidewall adapted for use within a drink holder of a vehicle that has spring-biased, radially inwardly protruding segments.
Figure 3D:
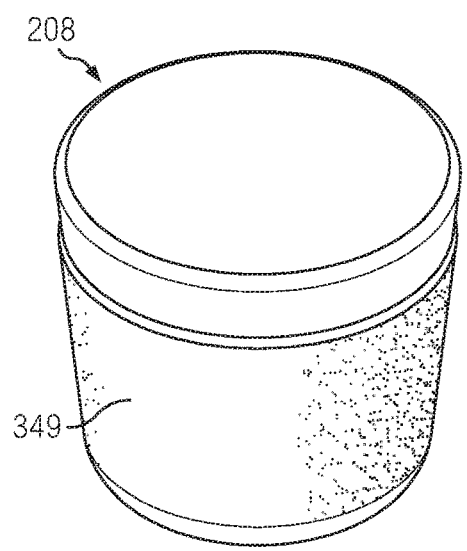
FIG. 3D is a perspective view showing a shell body with an elastomeric sleeve or overmolded cover.

An alternative for increasing the fitting engagement effectiveness of a shell or the base inner cup to the walls of a vehicle drink holder is to provide each shell and base inner cup exterior sidewall with an outer coat, band or sleeve. FIG. 3D shows that the sidewall of shell 208 is provided with an outer coat or sleeve 349. The sleeve 349 may be limited to applications where the means for attaching the shells together is located near the top edge of the shells and or base inner cup or where the attachment means is located on the bottom wall. In applications where the attachment means is located near the top of the shell or cup, the sleeve 349 is intended to cover a large portion of the sidewall, leaving an area near the attachment means clear so that the sleeve does not interfere with the function of the attachment means. The sleeve may comprise an over-molded material with an enhanced coefficient of friction, and if so, the coat 349 should be composed of a molding compound with a high affinity for bonding itself to the polymer compound used to mold the underlying shell sidewall. The coat 349 should be a relatively soft material that will deform as it frictionally engages the interior wall surface of the vehicle drink holder.

Instead of over-molding the coat, the coat 349 may comprise a separately formed or molded elastomeric sleeve that is slipped around the exterior of the shell or base inner cup wall to cover as much of the sidewall without interfering with the attachment means. A slip-on sleeve may consist of only a sidewall such that it would slip on the shell or cup exterior or it may also include an integral bottom wall such that the coat also envelopes the bottom surface of the shell. The slip-on sleeve should exhibit a high coefficient of friction relative to the surface(s) of the vehicle cup holder it is meant to engage. Further, the slip-on sleeve should be flexible and have a thickness that is deformable, so that, upon fitting the assembly into the cup holder, an outer surface of the slip-on sleeve will better conform to a facing vehicle cup holder surface that is not a complete analog of the shape of the sleeve sidewall and/or underlying shell sidewall.

Figure 3E:
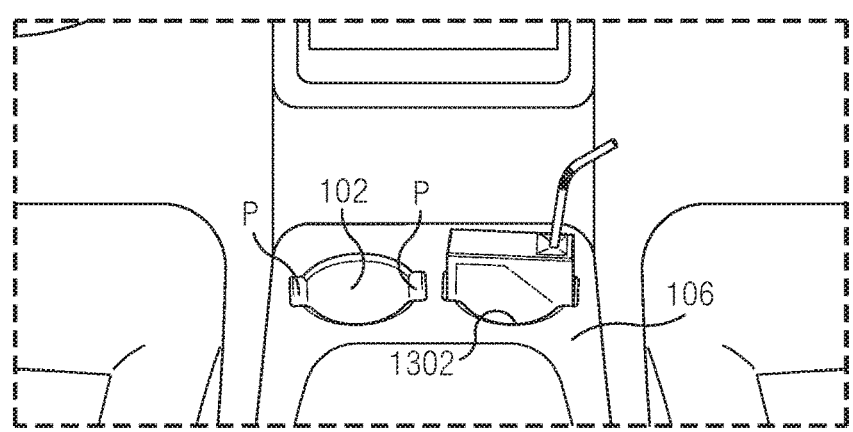
FIG. 3E is a view from above and aft of a vehicle center console, showing the profile of a vehicle drink holder that is configured to accommodate rectangular drink boxes.

Provision of an outer coat may be particularly useful in vehicles that have drink holders manufactured with means to alternatively accommodate cylindrical and non-cylindrical drink packages, such as a child's drink box and the like, which are typically rectangular in shape. In FIG. 3E, a top perspective view of a vehicle drink holder 102 that has been manufactured to accommodate rectangular drink boxes and cylindrical drink cups is shown. As illustrated, the typical continuously-cylindrical or frustoconical drink holder wall 1302 is now interrupted by walls that form pockets P for receiving the ends of a rectangular drink box. With this type of vehicle drink holder, the arcuate surface area that the frustoconical shells or base inner cup normally contact is reduced. In that circumstance, provision of an outer coat may enhance the securement of the shell or base inner cup within the vehicle drink holder.

Furthermore, some vehicle manufacturers are now providing at least two, and more typically three or more, spring-biased segments (not shown) that extend inwardly from the drink holder sidewall when in a fully unbiased condition. When a cylindrical drink container is inserted within this type of drink holder, the springs of the segments compress but do not fully retract the segments into or behind the drink holder sidewall. Instead, the segments remain partially extended, exerting a pushing force against the outer surface of the drink container. The spring pressure holds the drink container steady should the container have an outside diameter that is smaller than the inside diameter of the drink holder sidewall.

To accommodate such protruding segments so that the shells and the base inner cup can be fully inserted within the drink holder, the sidewall of the base inner cup 300 and the shells 208-202 may be provided with indentations formed into all of their respective sidewalls. FIG. 3C shows indentations 340, 345 in a sidewall, which can either be the sidewall of a shell (such as shell 208) or the base inner cup. The indentations 340 and/or 345 are vertically oriented and project radially inwardly towards axis X. The indentations 340, 345 may fully extend the entire distance from the bottom wall to the top edge of a shell or the base inner cup. Alternatively, the indentations may extend from the bottom wall and only a partial distance from the bottom wall to the top edge. Because the bottom walls of the shells or base inner cup enter the vehicle drink holder first, the indentations may be required to fully extend from the bottom wall, up to the top edge of the cup or shell sidewall, should the spring-loaded segments be located at the very top entry throat of the drink holder. If the segments are located further down, the indentations may only need to partially extend this distance.

Depending on the profile of the drink holder segments, the indentations should take on a form that most closely matches the segment profiles and to the extent that will allow the shells and inner cup to readily fit within the vehicle drink holder. In one form, the indentations may all be configured as a C-shaped channels. Channel 345 is shown as an example of a rounded, concave channel, and its shape and channel radius may be chosen to match the radius of a convex drink holder segment protruding inwardly from the drink holder sidewall. Of course, the number of internal spring-loaded segments will determine the number of identical indentations that must be incorporated into the sidewall of the shells or the sidewall of base inner cup but at least one indentation will be required in the shells and the base inner cup.

When an indentation is provided, the depth 341 and width 343 of each channel must increase from the outermost shell to the innermost shell, including the base inner cup. In that way, the channel on the outermost shell will be able to nest within the channel on the next shell interior to it, with the innermost shell eventually nesting within the channel of the base inner cup. Thus, the C-shaped channel 345 on the outermost shell 208 should preferably radially extend into its interior only to the extent necessary for the channel to receive the drink holder segment when it is compressed. Otherwise, the interior of the smaller shells or the base inner cup may not be of sufficient size to accommodate the inwardly extending and progressively-increasing channels that are to be formed in the respective sidewalls.

In addition, the width 343 of the indentations on each shell and base inner cup can be adjusted radially and/or angularly so that functionally, the indentations on one shell frictionally engage within the indentations of another shell or the base inner cup. This frictional engagement created by the nesting indentations will form a sidewall attachment means for fastening each of the shells 202-208 to each other and/or to the base inner cup 301. Other means for removably attaching the shells will be described below.

Means are provided for the inner surface of each hollow shell 202-208 to be removably fastened to the outer surface of the shell or base radially interior to it. In the embodiment illustrated in FIGS. 3, 11, 11A, 13 and 13A, these means comprise angularly spaced-apart bumps or protuberances 320 on the shell inner surface that register in or snap into a circumferential notch 322 on the outer surface of the next smaller shell (or, in the case of first shell 202, to a circumferential groove or notch 323 formed in the outer surface 302e of inner cup 300). As an example (see FIG. 11A), the protuberances 320 formed on the inner surface 303i of first shell 202 are adapted to snap into notch 323 formed in the outer surface 302e of base inner cup 300. Circumferential base notch 323 is formed near an upper edge 326 of inner cup 300. Likewise (see FIG. 11A), the protuberances 320 formed on the inner surfaces 307i, 315i, 317i of the second through fourth shells 204-208 are adapted to snap into respective notches 322 formed in the respective outer surfaces of shells 202-206. Each notch 322, 323 is positioned near an upper edge 324, 326 of the shell or base inner cup in question.

Figure 19:
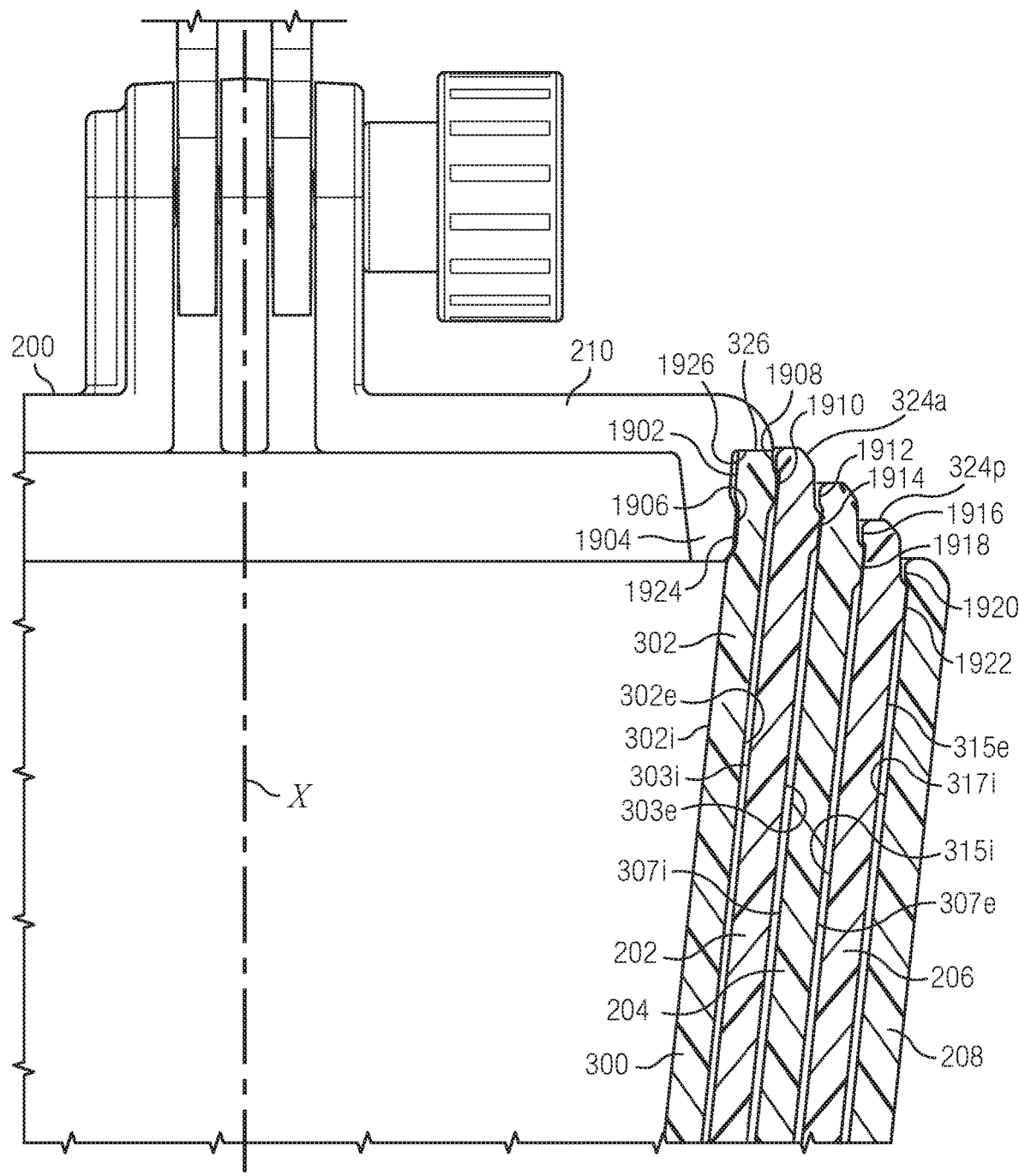
FIG. 19 is an axial sectional detail of a cell phone mount assembly using four shells and showing an alternative cup and shell affixation structure.
Figure 19A:
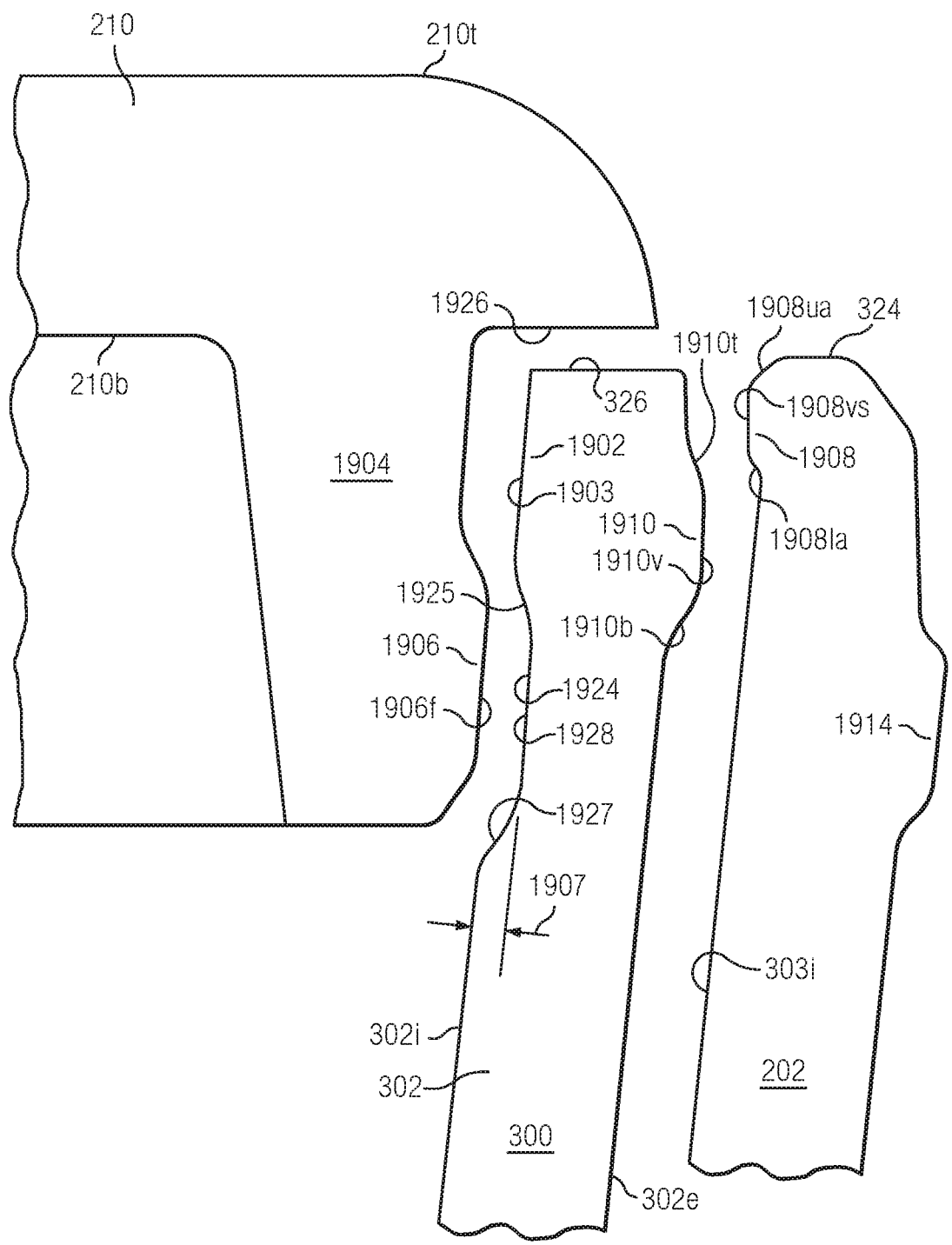
FIG. 19A is a detail of the attachment of the base inner cup and innermost shell that is shown in FIG. 19.

The removable fastening of a shell to a surface interior to it could be done by structures alternative to the attachment means previously shown and described, such as the structure shown in FIGS. 19 and 19A. The inside surface 302i of base inner cup sidewall 302 has a continuous, circumferential raised collar 1902 that is delimited by the planar upper edge 326 of cup 300 and an inward annular face 1903. Immediately below the collar 1902 is a circumferential channel 1924 that extends from the lower edge of the collar 1902, downwardly towards the bottom of cup 300. As FIG. 19A best illustrates, the vertical extent of a channel 1924 is made up by an upper angled ledge 1925, a lower angled ledge 1927 and an annular band 1928 that spaces apart ledges 1925 and 1927. The horizontal extent or depth 1907 of channel 1924 depends on the extent to which the angled ledges 1925, 1927 cut into the sidewall 302 of base inner cup 300. As seen in the axial section of FIG. 19A, inward face 1903 is colinear with inside surface 302i of cup 300.

A circumferential flange 1904 downwardly depends from bottom surface 210b of base top 210, radially inward from its radial outer edge. A horizontal, circumferential shoulder 1926 is disposed radially outwardly from the flange 1904. The bottom of circumferential flange 1904 includes a continuous, circumferential rib 1906 that projects radially outwardly towards the cup 300 to the same extent that channel 1924 cuts into the sidewall 302 of cup 300. The rib 1906 has a substantially vertical face 1906f (it and many of the other frustoconical surfaces discussed herein are not entirely "vertical" but instead are aligned with a degree of taper of the cup 300 and the shells 202-208) which has an extent that is the same as that of channel band 1928.

When base top 210 is assembled to cup 300, the circumferential rib 1906 will assume a position underneath the cup collar 1902 with rib 1906 occupying the entire channel 1924. The inside diameter of collar 1902 is smaller than the outside diameter of rib 1906 (measured at face 1906f), which means that when the base top 210 is being secured to inner cup 300, the interaction between collar 1902 and flange 1904 will cause a slight horizontal and inward flexing of flange 1904 in the area of the rib 1906, allowing the rib to inwardly slide along collar 1902. Once pushed downwardly past collar 1902, the flange 1904 will return to its resting state, then received within channel 1924. This creates a frictional snap fit of rib 1906 to channel 1924. The depth and height of the channel 1924, as well as its profile, are complementary to the horizontal and vertical extent and profile of the circumferential rib 1906 so that when rib 1906 occupies channel area 1924, the rib is prevented from movement, thereby securing base top 210 to the inner cup 300. When the lid is secured, shoulder 1926 of the lid will be in full resting contact upon upper edge 326, eliminating the potential for the base top 210 and any phone attached to it to wobble. By design, no part of the top surface 210t of top lid 210 will project beyond the upper edge 326 of cup 300, so that as joined surfaces 210t and 302e will be continuous.

The dimensioning of channel 1924 and rib 1906 is selected such that any attempt to remove the base top 210 from cup 300 will have to be done by intensely pulling the phone mounting bracket 214 in an upward direction so as to force the rib 1906 out of the channel area 1924. This degree of force preferably is greater than whatever axial force is necessary for the user to separate the shells 202-208 from each other and from base cup 300.

As FIGS. 19 and 19A illustrate, base inner cup 300 is also provided with a continuous, external circumferential rib 1910 that is located on outer surface 302e in close proximity to its upper edge 326 and which radially extends outwardly from axis X. The external rib 1910 on inner cup 300 is made up by an upper angled face 1910t, a lower angled face 1910b and a substantially vertical face 1910v between them.

As FIG. 19 best shows, each shell 202-208 is provided with a continuous, internal circumferential rib 1908, 1912, 1916 and 1920 that is located on a respective inside surface 303i, 307i, 315i or 317i, with each internal rib radially extending inwardly towards axis X. Shells 202, 204 and 206 are also provided with a continuous external circumferential rib 1914, 1918, 1922 that is located on a respective outer surface 303e, 307e or 315e, with each external rib radially extending outwardly from axis X. Outermost shell 208 is not provided with an external rib since no further shell will be attached to its outside surface.

Each external rib 1914, 1918, 1922 is spaced downward by the same distance from a respective top edge 324 of its shell and this location is lower than that of external rib 1910 of base inner cup 300. The external ribs 1914, 1918, 1922 on each shell are similar in sectional profile to the external rib 1910 on the base inner cup 300, each having a substantially vertical face extending between angled upper and lower faces of the rib, as previously described. The shell internal ribs 1908, 1912, 1916 and 1920 are similar in form to each other and are all located such that each one terminates at a respective top edge 324 of the shell, as best seen in FIG. 19A, which only shows shell 202 and cup 300 for clarity reasons. The internal ribs 1908, 1912, 1916 and 1920 are similarly formed by a lower angled section 1908la, an upper angled section 1908ua and a substantially vertical section 1908vs between them. The upper angled section 1908ua of each inner rib terminates at a respective top edge 324 of the shell.

If a user discovers that the base inner cup 300 does not frictionally fit within the vehicle drink holder because its outside diameter is too small compared to the inside diameter of the vehicle drink holder, the user must add a shell or shells to the base inner cup until an outside diameter of a shell matches the inside diameter of the vehicle drink holder. Doing so requires the shells to be stacked and attached to the base inner cup 300 one at a time, starting first with shell 202 and finishing with shell 208 if needed. In any event, the external rib of the last-stacked shell (or base inner cup) is designed to interact with and frictionally snap-fit into engagement with the internal rib on the shell that will be radially exterior to it. For example, with the base inner cup 300 and shell 202 shown in FIG. 19A, this occurs when the internal upper angled section 1908*ua* of rib 1908 of shell 202 initially contacts and then slides along the lower angled face 1910*b* of the external rib 1910 on cup 300, causing the top of shell 202 to flex slightly away from the axis. Rib 1908 will remain in that state as it continues upwardly and in sliding engagement against vertical surface 1910*v*, to the point where it encounters the upper angled face 1910*t* of external rib 1910, thus allowing the internal rib of shell 202 to effectively cam over the external rib 1910 of base inner cup 300 and snap into a resting state on top of the external rib 1910, whereby lower angled section 1908*la* will be in resting contact on upper angled face 1910*t*. In this way, when the internal rib is slid upwardly over the external rib, there will be a tight, frictional engagement between the internal and external ribs, which securely affixes the shell to the base inner cup. A user will hear an audible click when the shell snaps into engagement.

The internal ribs of the remaining shells will similarly interact with the external ribs of any shell that is already attached to the base inner cup. Thus, as shown in FIG. 19, internal circumferential rib 1912 of second shell 204 snaps over an external circumferential rib 1914 of shell 202. The internal circumferential rib 1916 of third shell 206 snaps over an external circumferential rib 1918 of second shell 204 and internal rib 1920 of fourth shell 208 snaps over an external circumferential rib 1922 of third shell 206. All of the affixation ribs on cup 300 and shells 202-208 preferably are located near the top end 326, 324 of the cup/shell side walls so that the external ribs do not interfere with press-fitting the assembly into the cup holder.

Although FIGS. 19 and 19A do not show the bottom parts of the base inner cup 300 and the shells 208-202 after they have been stacked together, it should be understood that in this embodiment, the outside, bottom surface of a shell or base inner cup will not be in full, resting contact against an interior bottom surface of the shell exterior to it. As a result, except for their close engagement by the inner and outer ribs near the top edges of the cup and shells, all attached shells and base inner cup 300 will have a slight separation or spacing between their respective sidewalls and bottom walls, as best depicted in FIG. 11. Nevertheless, once all shells 202-208 and the base inner cup 300 are attached, they will be substantially free from all vertical play relative to each other but will have the freedom to rotate relative to each other since each internal and external rib is continuously circumferential. This rotational freedom allows the vehicle occupant to grasp the cell phone mount 214 and rotate it around axis X in a fashion that best suits his or her angle of view, even where the outer surface of an outermost shell 208 has been press-fit to a vehicle drink holder sidewall.

The attachment means that was shown and described in FIGS. 11 and 19 is considered to be an internal attachment means because it requires each shell 202-208 and the base inner cup 300 to be provided with interacting internal and external features that focus the point of attachment on the inside wall surfaces of the shells. This internal attaching method is more difficult to accomplish from an injection molding perspective due to the very tight tolerances that must be maintained throughout the mass production of the components and because a non-typical, strip-away mold separation process must be used in order to prevent the destruction of the attachment means when the mold components are separated. As a result, it was discovered that other attachment means could be used without sacrificing the soundness of the attachment strength between the shells and/or base inner cup, and some were found to eliminate or significantly reduce the requirements for maintaining tight manufacturing tolerances or using the strip-away mold removal process. Some of these alternative attachment means are described below.

Figure 20:
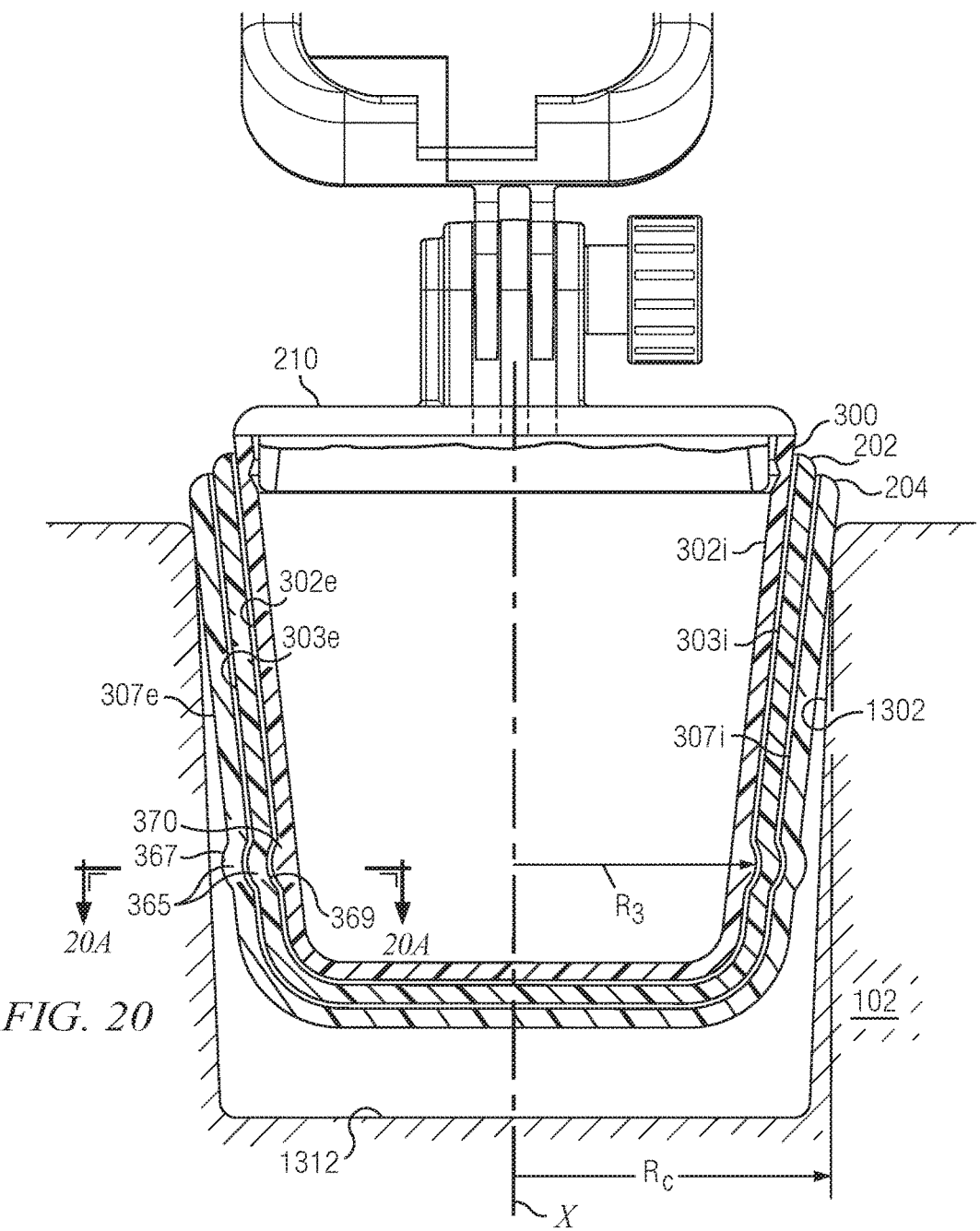
FIG. 20 is an axial sectional view of an embodiment of an external, double bump shell attachment means.
Figure 20A:
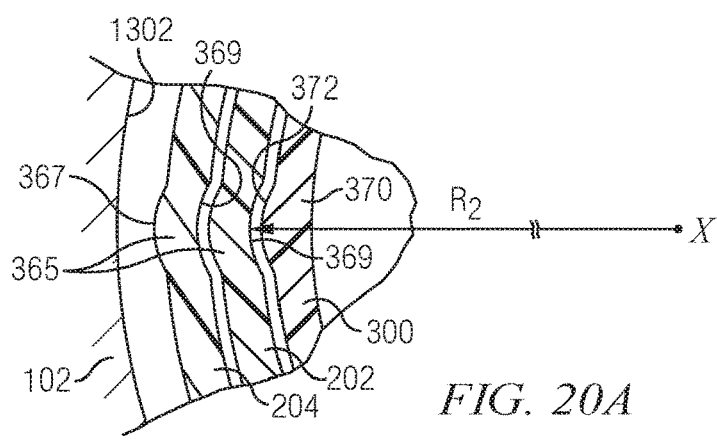
FIG. 20A is a cross sectional view taken through line 20A-20A in FIG. 20, highlighting the convex and concave profiles of the double bump shell attachment means.

In FIGS. 20 and 20A, an example of an external attachment means is shown, sometimes referred to herein as a double bump attachment means. This external attachment embodiment is comprised of at least two angularly spaced apart bumps that are integrally formed as part of the sidewall of the base inner cup 300 near the lower end thereof on outer surface 302*e*, and at least two angularly spaced bumps integrally formed as part of the sidewall of each shell 202-208 near a respective lower end thereof on a respective inside surface 303*i*, 307*i*, 315*i* and 317*i* (only the first two shells 202 and 204 are shown in FIGS. 20 and 20A for purposes of clarity). The bumps on the base inner cup and the bumps on the first shell have complementary shapes and all bumps extend away from axis X, wherein the bumps of first shell 202 and base inner cup 300 cooperate to form a means for attaching the first shell 202 to the base inner cup 300, and likewise, will form the means for attaching each successively larger shell to the shell immediately interior to it.

As will be explained in greater detail below, each bump 370 of the base inner cup 300 will have an outer surface 372 and each bump 365 of the first, innermost shell 202 will have an inner surface 369 and an opposed outer surface 367. The bumps 365 on the first shell 202 formed by its inner surfaces are complementary in shape to bumps 370 on the base inner cup 300 formed by its outer surfaces 2000, such that the bumps 370 on the base inner cup will snap within the bumps 365 on the first shell, thereby attaching the inner cup 300 to the first shell 202. Likewise, the outer surfaces 367 of the bumps on the first shell 202 will have a complementary shape to the inner surfaces 369 of the bumps 365 of the next larger shell 204, and so on.

At least two angularly spaced bumps 370, 365 should be provided to sufficiently attach the various shells 202-208 and base inner cup 300 together. If more than two bumps 365 are provided, the attachment strength may be improved. A double bump attachment system will have two attachment bumps 370, 365 in an opposed relationship, a triple bump attachment means system will comprise three attachment bumps preferably angularly spaced 120 degrees apart from each other around axis X, and a quadruple bump means system will comprise four attachment bumps angularly spaced, preferably by 90 degrees, apart from each other around axis X. Aside from the differences in the angular spacing between each bump, a triple and quadruple bump attachment means, or any number of bump sets that has a greater number of bumps, will have the same structure as the double bump system described herein and will function in the same manner.

As depicted in FIGS. 20 and 20A, each shell has two bumps 365 that extend away from axis X. Because each bump 365 is formed in the sidewall of the shell, each bump will have a concave inner surface or depression 369 and, opposite from this, a convex outer surface or protuberance 367. Since it is preferred that the thickness of the shell walls be substantially uniform, the thickness between the concave surface 369 and the closest point on the convex surface 367 will be substantially the same as the general thickness of the sidewall wall.

Base inner cup 300 does not externally attach to another component, so it is preferred, but not required, to construct each of its bumps as solid protuberance members 370. For each bump formed on the base inner cup 300, the inner portion may have an inner surface that conforms to the frustoconical inner surface 302i, while an outer portion is a protuberance having a convex outer surface 372 that extends away from axis X. The outer surfaces 372 of bumps 370 formed on the base inner cup 300 have a convex shape that is complementary to the concave shape of the depressions 369 formed on the on the inner surface of 303i of shell 202.

If a user has determined that the base inner cup 300 fits too loosely within the vehicle drink holder and desires to attach another shell and try the fit again, then shell 202 would be slid over the exterior surface 302e of base inner cup 300 and then pushed vertically upward until the concave inner surface depressions 369 on shell 202 initially contact the lower part of the convex outer protuberances 372 on base inner cup 300. Further upward movement will cause the concave, inner surfaces 369 on shell 202 to snap over the convex, outer surfaces 372 on base inner cup 300 such that each convex protuberance 370 will be captured within a respective concave surface depression 369, thereby affixing first shell 202 to base inner cup 300. The shell 204 will attach to shell 202 in the same manner, as will shells 206 and 208 to respective shells interior to them.

Continuing to refer to FIGS. 20 and 20A, the attachment that occurs is one of a frictional engagement where radius $R_3$, the maximum distance each convex protuberance projects away from axis X, preferably is chosen to be slightly larger than radius $R_2$, the maximum distance each concave depression in the next outer shell is away from axis X. By making $R_3$ equal or greater than $R_2$, the convex surfaces 372 will be very tightly captured within the concave surfaces 369 in an interference fit when the shell 202 is upwardly pushed into engagement with base inner cup 300. If $R_3$ were equal to or slightly greater than radius $R_2$, the bumps 370 would have a loose fit within the concave surface depressions 369 once captured. FIG. 20 shows shells 204 and 202 attached to each other and shell 202 attached to base inner cup 300, with a slight gap between these attached components, but only for the sake of clarity.

As FIG. 20 illustrates, the external double bump attachment means is preferably located near the bottom of the shells and the base inner cup 300. This location is preferred because the radius of the external sidewall surfaces 303e and 307e of shells 202, 204, as well as the radius of the external sidewall surface 302e of the base inner cup 300, will be the smallest near their respective bottoms. That also means that the radius to axis X of any angularly spaced bump will also be the smallest when located at the bottom of the shell or inner cup. In this way, the outer wall surfaces of each bump will not physically contact the internal wall 1302 of the drink holder 102 either before or after the shells or inner cup have been inserted within the vehicle drink holder. Moreover, there is a relationship between the distance the bumps project away from the outer sidewall surface and the strength of the attachment between shells. The farther distance that a set of bumps can project away from an outer sidewall surface, the stronger the attachment. Also, the longer the width or extent of the projection, the greater the surface area of each bump. Thus, a set of bumps with a relatively large cross sectional profile will have a higher attachment strength since large, projecting concave and convex surface areas will present larger interacting attachment surfaces.

The bumps 370, 365 shown in FIG. 20A have relatively small widths and only project outwardly by a small extent. However, when the radial distance $R_3$ between the outer surface protuberances 367 on the largest, attached shell, in this case shell 204, is equal to or exceeds the radius $R_c$ of the vehicle drink holder sidewall near its top opening, the frictional force between the drink holder sidewall 1302 and the outer surface of the outermost shell (here, shell 204) will be limited by the bumps' external surface area, as the rest of the shell outer surface will either be spaced from drink holder sidewall 1302 or any compressive force between the shell and the drink holder in nonbump areas will be reduced. This makes the fitment of the cell phone mount into the drink holder less secure.

When bumps are located at a lower position on the sidewall, the size of the cross sectional profile of the bumps can be made larger because the distance between $R_3$ and $R_c$ increases as one moves closer to the very bottom of a shell. As long as the distance between $R_3$ and $R_c$ is such that a shell will still have a good compression fit within the drink holder, the cross sectional profile of the bumps can be made as large as possible. When the cross sectional profile of the bumps is smaller, the bumps may be moved to a higher vertical position along the sidewall but at the expense of losing some of the strength of cup/shell attachment since the interactive surface area has been reduced. In FIG. 20, it is seen that most of the outside diameter of the sidewall of shell 204 is smaller than most of the inside diameter of a typical vehicle drink holder sidewall. Thus, the primary focus is to provide the double bumps with enough outward projection to create a strong shell-to-shell attachment and then secondarily to determine the vertical location on the outer sidewall of shell that satisfies the upper limit where $R_3$ is slightly less than sidewall inside radius $R_c$ so that the shell will have a good compression fit within the drink holder.

Alternatively, the attachment means for attaching the shells and base inner cup could be provided in the bottom wall of each shell and base inner cup rather than an exterior or interior sidewall position as described above. One embodiment of a bottom-based attachment means is illustrated in FIGS. 21, 21A and 21B.

Figure 21:
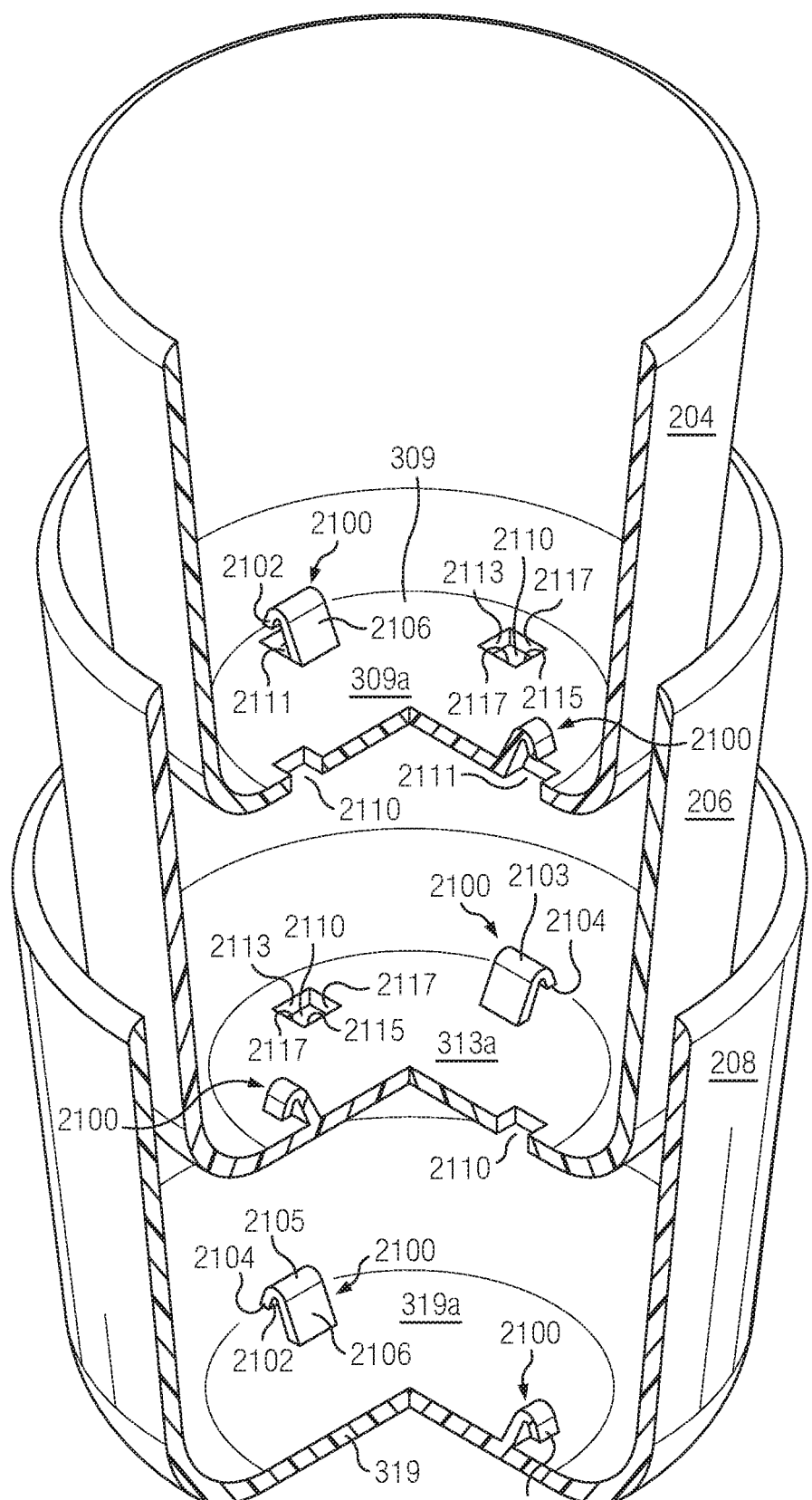
FIG. 21 is an exploded perspective view partially cut away showing an embodiment of a bottom-based spring clip attachment means that attaches an outer shell to a next inner shell, the means shown provided on three shells.
Figure 21A:
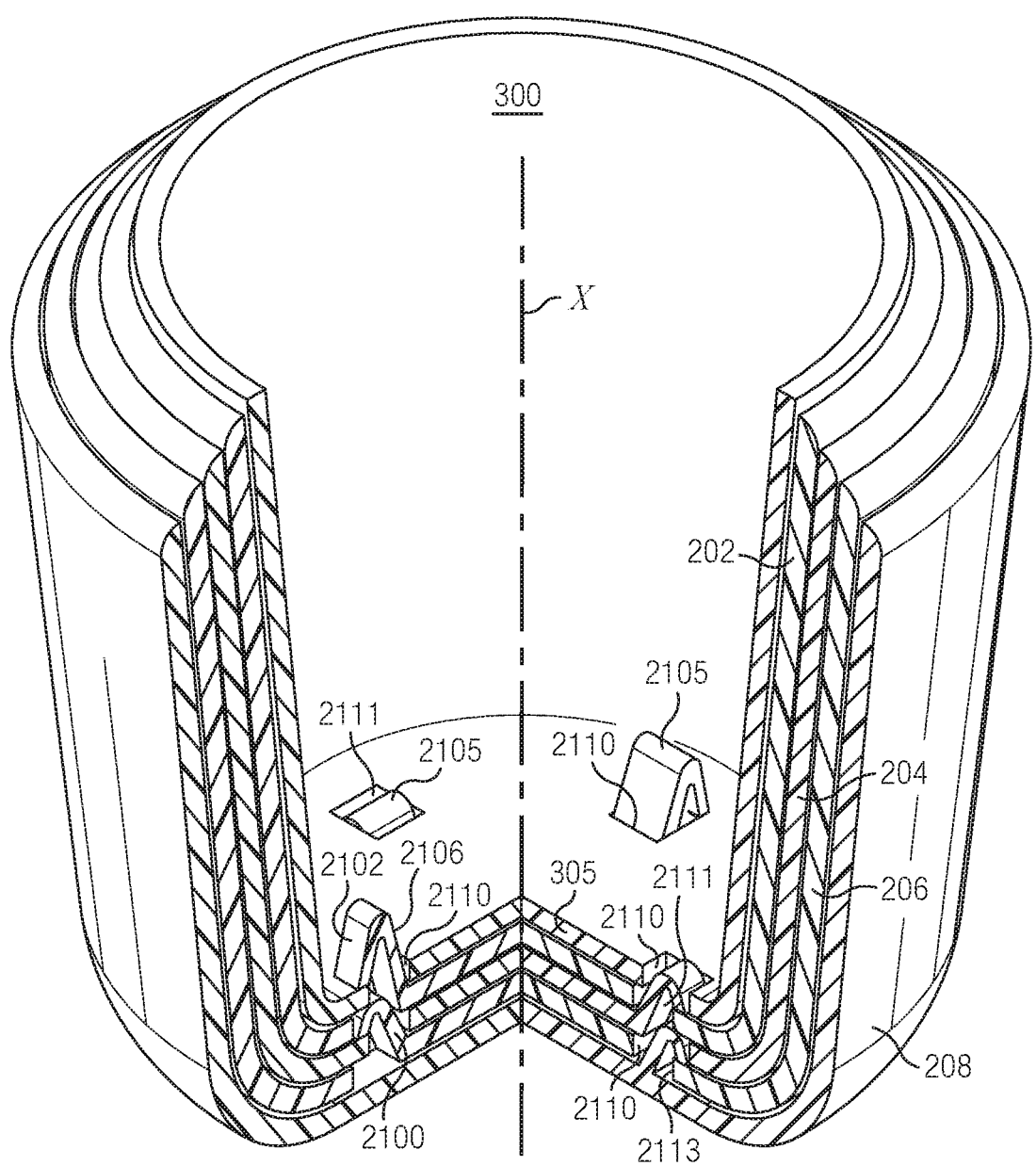
FIG. 21A is a perspective view partially cut away of the bottom-based spring clip attachment means of FIG. 21 showing four shells and a base inner cup attached together.
Figure 21B:
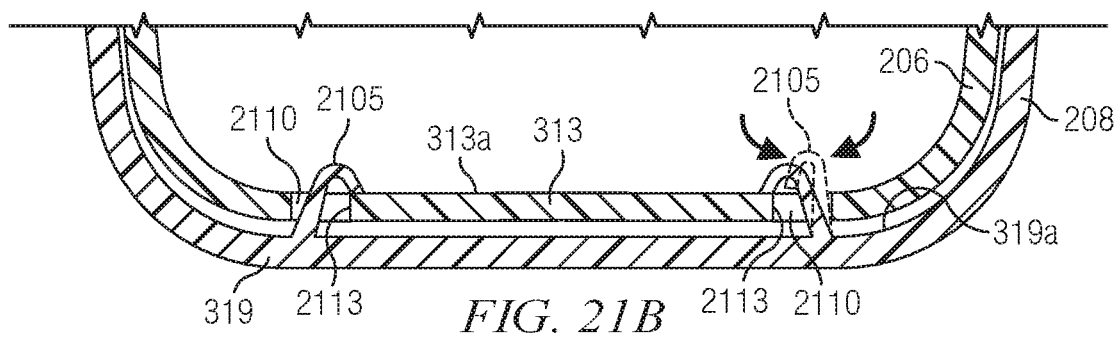
FIG. 21B is partial axial sectional view of the bottom-based attachment means of FIG. 21 detailing the mechanism for attaching two shells together.

In FIGS. 21 and 21B, it is seen that outermost shell 208 is provided with a pair of identically constructed retainers in the form of spring clips 2100 that extend upwardly by the same extent from the inside surface 319a of the bottom wall 319. The spring clips 2100 that are provided on one shell will interact with a like number of clip receiving holes 2110 on a shell that is interior to it. This point is best illustrated in FIG. 21B, where it is seen that clips 2100 from shell 208 extend through dedicated clip receiving holes 2110 formed through the bottom wall 313 of shell 206. In the embodiment illustrated in FIGS. 21, 21A and 21B, clips 2100 are all of the same width. The clip widths can be made to vary from shell to shell if desired but that would dictate that the size of the clip receiving holes 2110 vary from shell to shell also.

Pairs of the spring clips 2100 on shell 208 are directly opposed to each other and are preferably integrally molded with bottom wall 319. All clips 2100 from shell to shell are equally spaced from axis X. Likewise, each clip receiving hole 2110 on any shell is also equally spaced from axis X.

The placement and number of clips 2100 and holes 2110 vary according to the identity of the shell 202-208 or base cup 301. Shell 208 has two opposed clips 2100 but no holes 2110. Shell 206 has two holes 2110, in angular alignment to the clips 2100 of shell 208 and spaced away from axis X by the same radius. Shell 206 also has two clips 2100, disposed at 90 degrees from holes 2110 and therefore the clips 2100 on shell 208. Shell 204 has holes 2110 that are angularly spaced by 90 degrees from the holes 2110 of shell 206; the holes 2110 of shell 204 are angularly aligned with the clips 2100 of the shell 206. Shell 204 has two clips 2100 that are 90 degrees removed from clips 2100 of shell 206, and therefore are in angular alignment with clips 2100 of shell 208. In addition, shell 204 has two supplemental holes 2111 in close association with its clips. The clips 2100, holes 2110 and supplemental holes 2111 in shell 202 will be identical to those in shell 204, but will be angularly offset by 90 degrees from the corresponding structures in shell 204. For embodiments with more than four shells, each additional shell would be interior to shell 202, would have the same clips, holes and supplemental holes as those shown for shell 204, but would be angularly offset by 90 degrees from the structures of the shell immediately exterior to it. Finally, and as seen in FIG. 21A, base cup 301 has holes 2110 and supplemental holes 2111, but no clips, as there are no structures interior to it to which cup 301 needs to be attached.

Each clip 2100 is comprised of an upwardly projecting base arm 2106 that has an upper end joined with a downwardly extending attachment arm 2102 at a living hinge 2105. The other end of the base arm 2106 is integrally formed with the bottom wall of the shell. The other, remote end 2104 of the attachment arm 2102 extends downwardly and radially away from living hinge 2105 and is free to move relative to the base arm 2106 as a result of the living hinge. The attachment arm 2102 has considerable freedom of movement in the radial direction, less so in the axial direction. The base arm 2106 also has a capacity to move radially with respect to axis X but its movement may be more limited compared to that of the attachment arm. The relative length of each arm of the clip 2100 gives all of the clips an inverted J-hook profile. The attachment arm 202 has a top surface 2103 and terminates in a downward-facing surface 2104 that, in use, will contact a top surface of a bottom wall of the next shell interior to it.

When attachment arm 2102 and base arm 2106 are pinched and compressed towards each other, an inherent spring tension is realized in the form of a counter-resistive force that resists the compression of arm 2102 towards base arm 2106. When the compression is released, the inherent spring tension will cause attachment arm 2102 to spring away from body 2106 and assume its resting state position. This inherent spring tension force is used for attaching the various shells together. For instance, as best seen in FIG. 21B, shell 206 has been provided with a pair of identical rectangular receiving holes 2110 that accept the spring clips 2100 of shell 208 when they are in a compressed state. Each receiving hole 2110 that is provided in a shell or in the base inner cup will be vertically registered with a spring clip 2100 from a shell immediately exterior to it. If more than two spring clips are provided on each shell, then it should be understood that the shell immediately interior to it will have a like number of receiving holes.

For the purposes of this disclosure, the compressed state is considered to be that point where attachment arm 2102 is compressed to be more proximate to base arm 2106, as depicted in the right spring clip shown in dashed line in FIG. 21B. In this compressed state, the clip is now ready for insertion into the receiving hole 2110 that is formed through bottom wall 313 of shell 206. Each receiving opening is delimited by an end wall 2113, a rear wall 2115 and the side walls 2117 (See FIG. 21). The distance between end wall 2113 and rear wall 2115 is only long enough to allow a spring clip that is in a compressed state to pass through, in its uncompressed state, the clip cannot pass through. The width of the end wall 2113 and rear wall 2115 is slightly larger than the width of the spring clip and since the width of the clip is constant, the width of the receiving holes is not an impediment to the clips passing through.

The shape (in a horizontal plane) of the receiving holes and spring clips are shown to be rectangular but they can have other configurations as long as both have matching footprints to allow the spring clips to be received and passed therethrough. When the compressed spring clips are aligned with the receiving holes 2110 and shell 208 is moved upwardly for attachment to shell 206, the outside surface of arm 2102 near living hinge 2105 will make initial contact against the inside surface of end wall 2113. As shell 208 is further moved upwardly, the end wall 2113 continues to exert a force against arm 2102, maintaining the compression since the arm is angularly disposed relative to base arm 2106.

Once arm 2102 is no longer in contact against end wall 2113, it will spring back into its resting state, which is shown with respect to the left spring clip in FIG. 21B. Because the size of the receiving hole is only as large as the size of the compressed spring clip, the free end of arm 2102 will project beyond the end wall 2113 of the receiving hole 2110 once in its resting state. When both spring clips are in the resting state, the respective attachment arms 2102 will be superimposed over and in engagement with the inside surface 313a of the bottom wall 313 of shell 206 in the area immediately adjacent to end wall 2113, as best exemplified in FIGS. 21A and 21B. When both arms 2102 are in this position, shell 208 is attached to shell 206 whereby the respective free ends 2104 of each attachment arm 2102 firmly press against the inside surface 313a of shell 206.

Shell 206 cannot be detached it from shell 208 until the attachment arms 2102 of each clip are again compressed towards their respective base arms 2106 to the point where they can again be fitted within the receiving holes 2110 and pushed downwardly through and out. This detaching process can be accomplished by reaching inside of shell 206 to initiate the compression of the attachment arms 2102 toward the base arms 2106.

FIG. 21 illustrates that each of the shells 208-202 is provided with its own pair of spring clips 2100 and FIG. 21A illustrates that the pair of clips 2100 on one shell only attach to the inside surface of the bottom wall of the shell interior to it. This figure also shows that when a spring clip 2100 is attached to a shell above it, a tip part of the clip, mainly the living hinge 2105, also extends through the bottom wall two shells above it.

As seen in FIG. 21B, both of the clips extend through and attach to the bottom wall 313 of shell 206, with a part of the clips also extending above the bottom wall. In FIG. 21A, the rightmost clip 2100 of shell 208 is seen to be extending through opening 2110 on shell 206 and partially extending through a supplemental hole 2111 on shell 204 (See also FIG. 21 for the location of the supplemental holes 2111). The supplemental holes 2111 must be provided in shell 204, otherwise the living hinge areas 2105 of the clips 2100 from shell 208 would contact the bottom wall of shell 204 and prevent shell 208 attaching to shell 206. The size of the supplemental holes 2111 that are required in shells 206-202 and base inner cup 300 is smaller than the size of the receiving openings 2110 since only a tip of any particular clip has to be accommodated therein.

FIG. 21 clarifies that shell 206 is provided with its own pair of spring clips for attaching it to shell 204. However, shell 206 does not require supplemental holes 2111, only clip receiving openings 2110, because the clips 2100 from shell 208 fully extend through shell 206 and the living hinge areas 2105 partially extend into shell 204. Therefore, shell 204 is the first shell to require the supplemental holes 2111. The supplemental holes 2111 in the bottom wall of shell 204 are seen positioned adjacent to that shell's attachment clips 2100, while the bottom wall 309 of shell 204 is also seen with the pair of receiving holes 2110 that accept the spring clips 2100 from shell 206.

The bottom wall 301 of base inner cup 300 will be provided with receiving openings 2110 for receiving the clips 2100 from shell 202 as well as supplemental openings 2111 for receiving the tips of the clips from shell 204.

Figure 22:
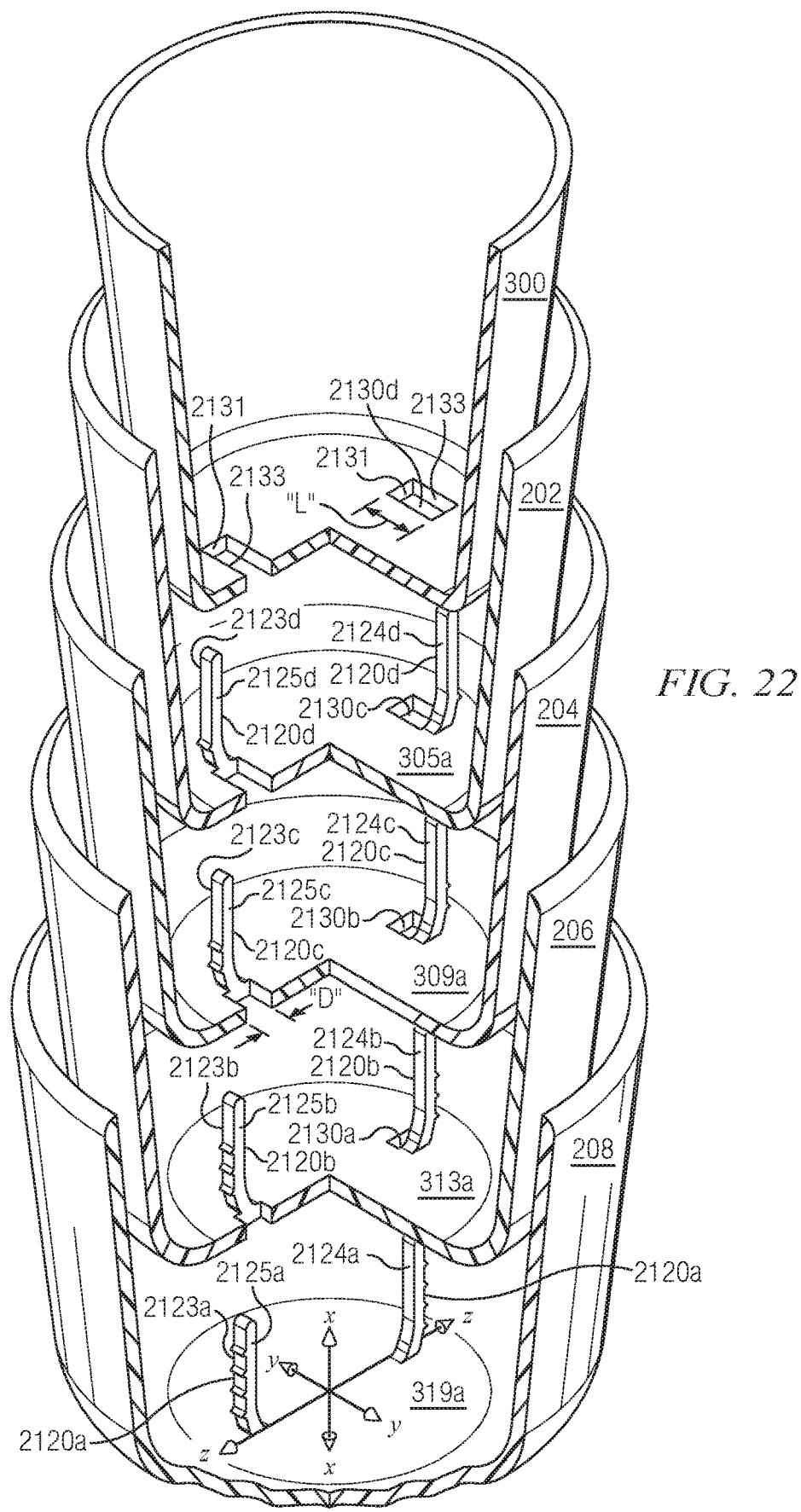
FIG. 22 is an exploded perspective view with parts broken away showing another embodiment of a bottom-based attachment means in the form of toothed ratcheting arms for attaching the shells to each other and to the base inner cup.
Figure 22A:
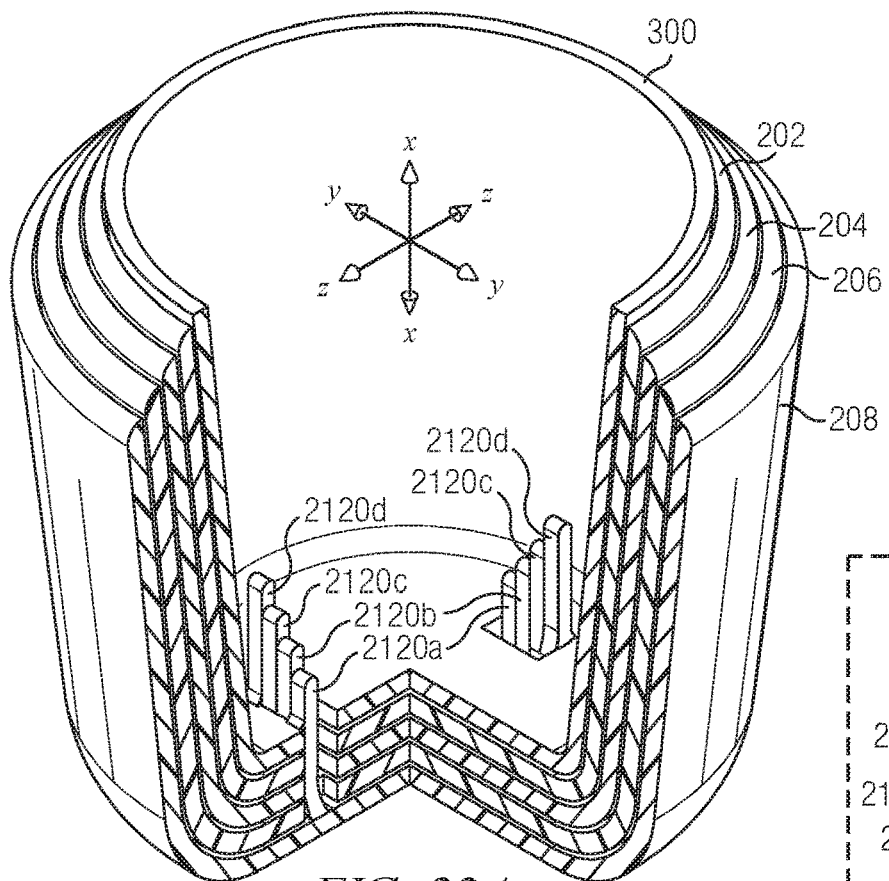
FIG. 22A is a perspective view partially cut away showing all of the shells and the base inner cup attached together using the bottom-based attachment means introduced in FIG. 22.

Another type of retention means that attaches the shells and base inner cup together through their respective bottom walls is shown in FIGS. 22 and 22A-22C. FIGS. 22 and 22A include a schematic, tri-axis xyz coordinate system for use in describing this attachment means. In FIG. 22, the retention means is seen to comprise a plurality of retainers and a plurality of retainer receiving apertures. At least two ratcheting arms 2120a are provided for shell 208. At least two ratcheting arms 2120b are provided for shell 206. At least two ratcheting arms 2120c are provided for shell 204, and at least two ratcheting arms 2120d are provided for shell 202, for at least eight ratcheting arms in all.

Each arm 2120a-d is integrally molded with a respective inside surface 319a, 313a, 309a or 305a of a respective bottom wall of each shell 208-202. Each of the two ratcheting arms within a particular shell project upwardly and perpendicularly from its inside bottom surface such that all ratcheting arms will project from their respective bottom walls by the same vertical extent. The ratcheting arms provided on a particular shell are equally spaced from each other and the same distance away from the x and y axes, with the same spacing being maintained from shell to shell so that all ratcheting arms are in alignment with each other after the shells are attached to each other and to the base inner cup 300, as best depicted in FIG. 22A.

The ratcheting arms 2120a on shell 208 are slightly offset from each other in they direction such that one post is on each side of the z axis. This arrangement balances the points of attachment from shell to shell, as will become clearer shortly. The location of each of the individual ratcheting arms 2120a is considered as the ratcheting arm starting point and the relative locations of all other ratcheting arm sets on shells 206-202 will be displaced from the starting point location in a direction that is parallel to axis y, with one ratcheting arm of the set displaced in one direction and the other arm displaced in an opposite direction, the arm sets moving away from but staying perpendicular to the z axis.

Figure 22C:
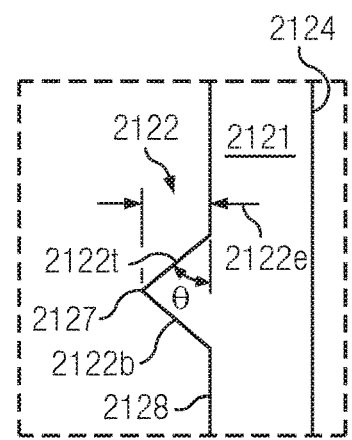
FIG. 22C is a sectional detail of a ratcheting arm tooth of the attachment means shown in FIG. 22.
Figure 22B:
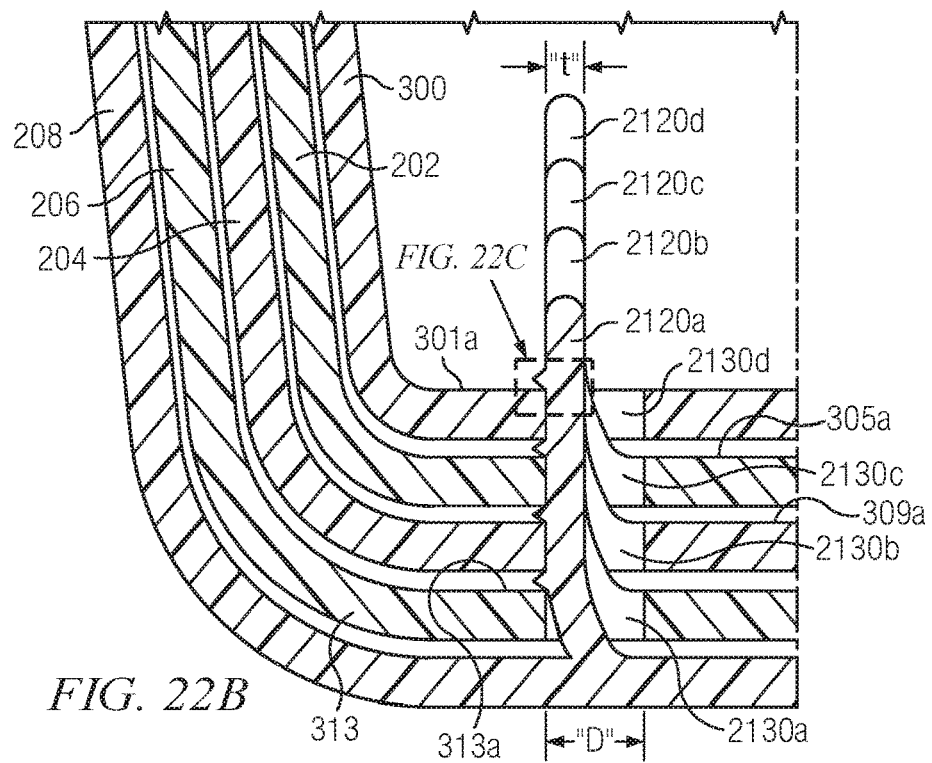
FIG. 22B is a partial sectional view detailing the structural arrangement of the attachment means introduced in FIG. 22.

The ratcheting arms 2120b on shell 206 are displaced in the same (y, −y) direction from arms 2120a and the displacement is the same as the displacement of arms 2120a from the starting location. The individual ratcheting arms 2120c on shell 204 are also displaced in the same (y, −y) direction from arms 2120b and the displacement is the same as the displacement of arms 2120b from arms 2120a. The individual ratcheting arms 2120d on shell 202 are displaced in the same (v, −y) direction from the position of arms 2120c by an amount that is the same as the displacement of arms 2120c from arms 2120b. This arm spacing arrangement aligns each of the pairs of ratcheting arms as depicted in FIGS. 22A and 22B when all of the shells 208-202 and base inner cup 300 are attached together, so that each individual ratcheting arm will be aligned in a respective plane parallel to the x axis and equally spaced from the y axis.

As FIG. 22 illustrates, the outermost shell 208 has a first and outermost pair of ratcheting arms 2120a, shell 206 has a second pair of ratcheting arms 2120b, shell 204 has a third pair of ratcheting arms 2120c and shell 202 has a fourth pair of ratcheting arms 2120d. Each ratcheting arm is similar in shape and is comprised of a post having at least one tooth thereon. As shown in the exemplary detail of FIG. 22C, and the exploded view of FIG. 22, each of the posts 2121a-2121d (and representative post 2121) has a corresponding front wall 2128 formed with one or more saw-tooth-shaped teeth 2122, an alignment wall 2123a-2123d that occupies an xz plane, an abutting wall 2125a-2125d opposed to the alignment wall 2123a-2123d, and a back wall 2124, 2124a-2124d that is opposed to the front wall 2123a-2123d. The posts within each shell are arranged so that the teeth 2122 of each post will face in opposite (z, −z) directions and this arrangement facilitates the release of one shell from the next, as will be explained below.

FIG. 22 also shows that each post has a different number of teeth depending on the identity of the shell of which it is a part, although alternatively all of the posts may be provided with the same number of teeth. The individual teeth 2122, no matter which ratcheting arm they are on, are identical in size and shape. FIG. 22C shows one such tooth 2122, it being defined by a tooth top wall surface 2122t that downwardly extends at an angle θ to the vertical and a bottom wall surface 2122b that upwardly extends at the same angle θ to the vertical towards top tooth wall 2122t, to form a tooth peak 2127. Each tooth 2122 has an extent 2122e that is defined as the distance the tooth peak 2127 extends in a z or −z direction away from the front wall 2128. As best seen in FIG. 22B, ratcheting arm 2120a of shell 208 is shown to have been provided with four teeth 2122, with the bottom surface 2122b of each tooth abutting a respective inside surface 313a, 309a, 305a of the bottom walls of each shell 206, 204, 202 and the inside surface 301a of base inner cup 300.

The extent 2122e of each tooth should be large enough that the respective bottom surface 2122b of a tooth satisfactorily captures the interior surface of the bottom wall of a shell or base inner cup 300. In a like fashion, the ratcheting arms 2120b of shell 206 would find the bottom surfaces 2122b of its three teeth capturing the inside surfaces of the bottom walls of shells 204, 202 and the base inner cup 300. Likewise, ratcheting arms 2120c of shell 204 and arms 2120d of shell 202 would find the respective bottom surfaces of its respective teeth functioning in a similar manner, capturing two bottom walls 305, 301 in the case of arms 2120c, and capturing bottom wall 301 in the case of arm 2120d.

FIG. 22B shows the posts 2121a-2121d of each ratcheting arm 2120a-2120d having a common thickness "t". In conjunction with the properties of the polymer material used to mold the shells, thickness "t" is selected to be thin enough to allow each post to slightly bend relative to an xy plane. A slight elastic bending capability will facilitate the attachment and removal of each ratcheting arm from the bottom wall of a shell or base inner cup, which will be explained below.

As FIG. 22B illustrates, shell 206 is provided with a first set of identical ratcheting arm receiving apertures 2130a comprised of a first aperture that is equally spaced from and in an opposed relationship to a second aperture on the shell, while shell 204 is provided with a second set of ratcheting arm receiving apertures 2130b comprised of a first aperture that is equally spaced from and in an opposed relationship to a second aperture on the shell. Shell 202 is provided with a third set of ratcheting arm apertures 2130c comprised of first aperture that is equally spaced from and in an opposed relationship to a second aperture on the shell. The base inner cup 300 is provided with a fourth set of ratcheting arm receiving apertures 2130d comprised of first aperture equally spaced from and in an opposed relationship to a second aperture on the cup.

The receiving apertures on a given shell are identical in size, but they are not all of the same size from shell to shell. The apertures 2130a on shell 206 are a first aperture set for receiving only the ratcheting arms 2120a from shell 208, with each aperture of the set being vertically registered with the ratcheting arms 2120a. The apertures 2130b on shell 204 present a second aperture set for receiving the ratcheting arms 2120b and 3120a from shells 206 and 208, with each aperture of the set being vertically registered with the ratcheting arms 2120a and 2120b. The apertures 2130c on shell 202 represent a third aperture set for receiving ratcheting arms 2120c, 2120b and 2120a from shells 204, 206 and 208, with each aperture of the set being vertically registered with the ratcheting arms 2120a, 2120b and 2120c. The apertures 2130d in base inner cup 300 make up a fourth aperture set for receiving ratcheting arms 2120d, 2120c, 2120b and 2120a from shells 202, 204, 206 and 208, with each aperture of the set being vertically registered with the ratcheting arms 2120a, 2120b, 2120c and 2120d.

Each ratcheting arm receiving aperture 2130a-2130d is disposed immediately adjacent the alignment wall 2123a-d of each respective ratcheting arm 2120a-2120d. Each of the ratcheting arm receiving apertures on a particular shell is equally spaced from the y axis. However, the first aperture 2130a in shell 206 is the smallest in the lengthwise direction "L" (aligned with the y axis; FIG. 22), which is the extent of the spaced side walls 2133 that define the size of the aperture and which are disposed parallel to the y axis. The sidewalls 2133 of the fourth aperture 2130d in base inner cup 300 are the longest in length.

The size of each aperture is further defined by the spaced, parallel end walls 2131 that are disposed perpendicular to the sidewalls 2133. End walls 2131 define the width of each aperture, identified as "D" in FIGS. 33 and 22B. The end walls 2131 of each aperture 2130a-2120d are equal in length and are also disposed parallel to the z axis. All apertures are intentionally sized to be large enough in the "D" and "L" directions to receive the ratcheting arms 2120a-2120d while allowing for some bend in the arms to bend relative to the z axis for attachment and detachment purposes.

Distance "D" should only be long enough to allow the teeth and the posts to snugly fit through the aperture. Otherwise, if the extent of each end wall 2131 is too large, the teeth 2122 of each arm will not extend far enough over and beyond the perimeter edge that delimits the aperture to allow the bottom tooth surface to capture and hold the bottom wall of the shell or cup. For example, when the first ratcheting arms 2120a on shell 208 are initially inserted within the first receiving apertures 2130a on shell 206, the upward force exerted on the outside wall of shell 208 will cause the top surface 2122t of each tooth to contact against a wall defining each of the apertures, allowing the entire arm and its teeth through the aperture on each shell interior to it. When an outer shell is fully seated against the bottom of a shell or the cup interior to it, the arms of the outer shell will spring back and resume a normal resting state wherein the bottom surface 2122b of the tooth will capture and hold the bottom wall 313 of shell 206.

The posts within shell 208 are designed to also extend upwardly through shells 204-202 and the base inner cup 300 when attached to shell 206. Immediately adjacent to apertures 2130a on shell 206 are posts 2120b that are also intended to upwardly extend through shells 204, 202 and base inner cup 300 and be in a side-by-side relationship with arms 2120a of shell 208. Therefore, shell 204 is provided with arm receiving apertures 2130b that are in vertical alignment with the ratcheting arms 2120a of shell 208 and the arms 2120b of shell 206. The apertures 2120b in shell 204 have sidewalls that are longer than the lengths of the sidewalls of receiving holes 2120a in shell 206 in the lengthwise direction "L" so that the ratcheting arms of shell 208 can project through them, along with arms 2120c of shell 206 so that all arms projecting through shell 204 are in a side-by-side relationship.

Immediately adjacent each of the apertures 2130b of shell 204 is a respective arm 2120c that is intended to upwardly extend through shell 202 and base inner cup 300. Shell 202 is therefore provided with arm receiving holes 2130c that are in vertical alignment with the arms 2120a, 2120b and 2120c of shells 208, 206 and 204. The apertures 2130c have lengths that are longer than the lengths of the receiving holes 2130b in shell 204 so that the arms of shells 208, 206 and 204 can project through apertures 2130c in a side-by-side relationship. Immediately adjacent each aperture 2130c in shell 202 is an arm 2120d that is intended to upwardly extend through base inner cup 300. Base inner cup 300 is provided with apertures 2130d that are in vertical alignment with the arms 2120a-2120d of shells 208-202. The apertures 2130d have lengths that are longer than the lengths of the receiving apertures 2130c in shell 202 so that the arms of shells 208-202 will project through them in a side-by-side relationship.

In light of the above arrangement of openings and ratcheting arms, it should be further understood that the other three teeth 2122 on ratcheting arm 2120a will also capture the bottom walls of shells 204, 202 and base inner cup 300 in a manner similar to the lowest tooth on the post capturing the bottom wall of shell 206, as depicted in FIG. 22B. Similarly, the ratcheting arms 2120b on shell 206 have three teeth, which would capture shells 204, 202 and base inner cup 300; arms 2120c on shell 204 have two teeth, which would capture shell 202 and the base inner cup 300, and arms 2120d on shell 202 only have one tooth which captures the base inner cup 300.

When all shells 208-202 are attached to each other and to the base inner cup 300, the ratcheting arms from each shell extend through the bottom wall of base inner cup 300 in a side-by-side relationship wherein the alignment walls 2123a-2123d of each arm will be in very close proximity with the abutment walls 2125a-2125d, as depicted in FIG. 22A. In FIGS. 22A and 22B, it is also seen that the ratcheting arms 2120a of shell 208 extend upwardly by the shortest distance relative to ratcheting arms 2120b-2120d of shells 206-202. This results from arms 2120a having the same height as arms 2120b-2120d, but extending through four bottom wall thicknesses rather than three, two or one. Advantageously, the side-by-side relationship and the height variation allows a user to readily identity a match in arms and to remove a shell in the order of the heights. The height variation from one ratcheting arm set to the other is equal to or a little more than a single bottom wall thickness. Alternatively, and to avoid the ascending ratcheting arm heights, the ratcheting arm sets can be made relatively taller from shell to shell so that all arms project out of the bottom wall of base inner cup 300.

To release an outermost shell from one interior to it, say shell 208 from shell 206, a user must reach inside the interior of base inner cup 300 with a thumb and index finger and continuously pinch or squeeze the matched pair of ratcheting arms 2120a towards each other to the point where the posts 2121a bend, whereby teeth peaks 2127 on each post 2121 disengage from the bottom wall of shell 206 and clear the edge wall surfaces 2133 of the receiving apertures. When that condition is met, the squeezing of the arm is maintained while the user pulls shell 208 downwardly until the very top tooth of each arm is no longer in contact against the interior bottom wall surface of shell 206. At that point, shell 208 would be detached from shell 206. A similar methodology would be used for detaching the next outermost shell 206 from shell 204, and the remaining shells 204 and 202.

Figure 23:
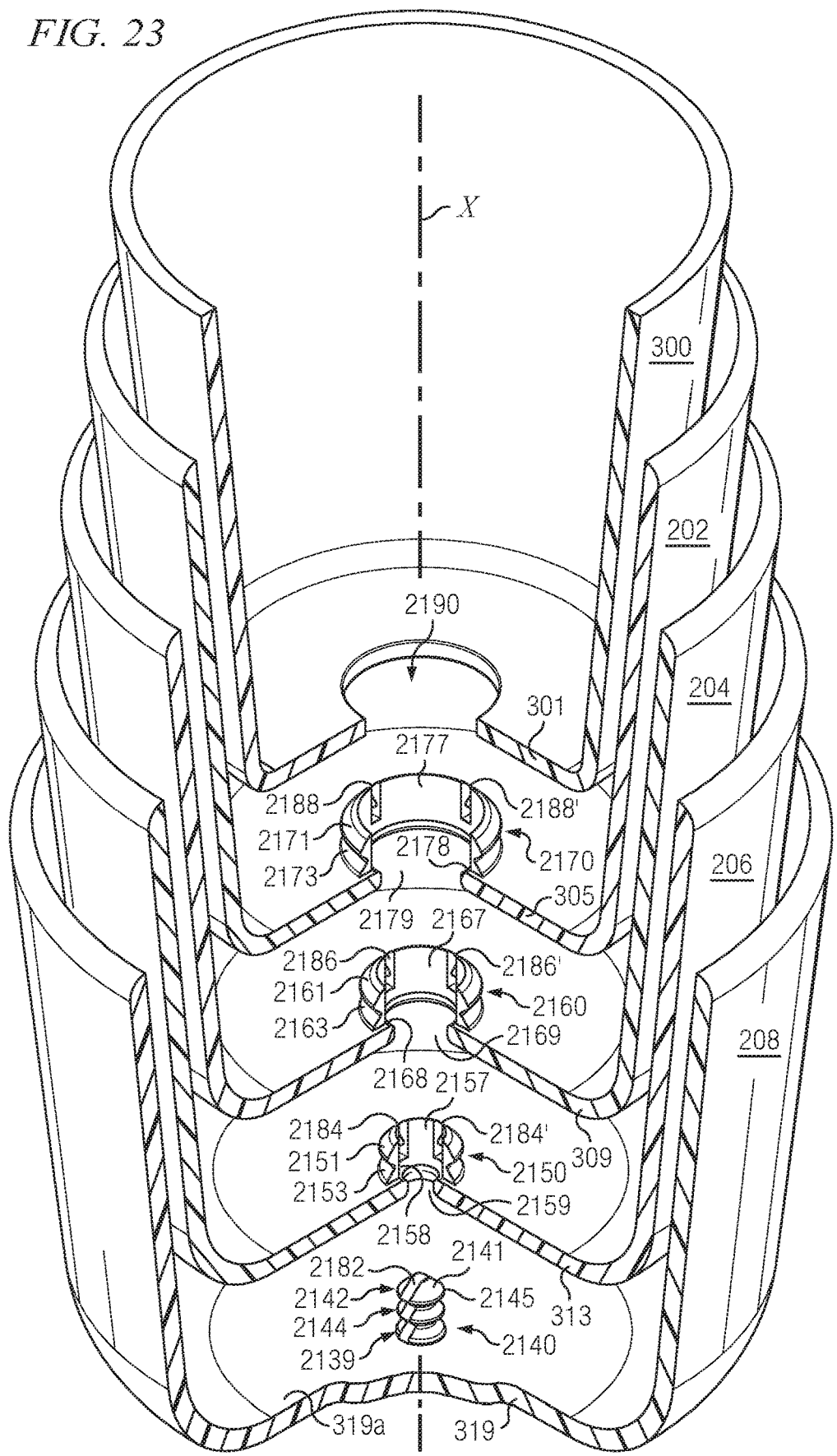
FIG. 23 is an exploded perspective view partially cut away showing another embodiment of a bottom-based attachment means in the form of stacking ratcheting posts for attaching the shells to the base inner cup.
Figure 23A:
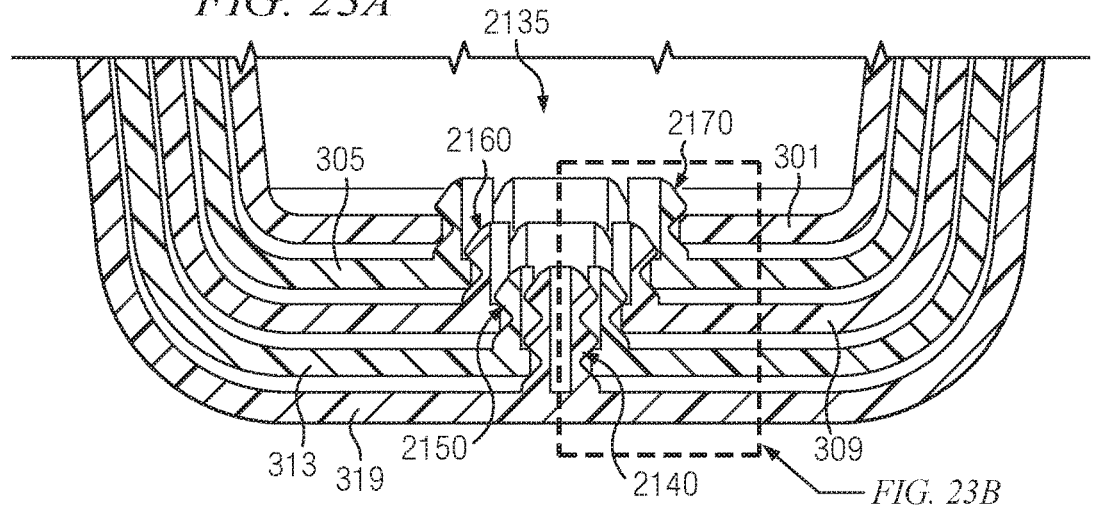
FIG. 23A is a partial axial sectional view of the shells and base inner cup in an attached state using the attachment means shown in FIG. 23.
Figure 23B:
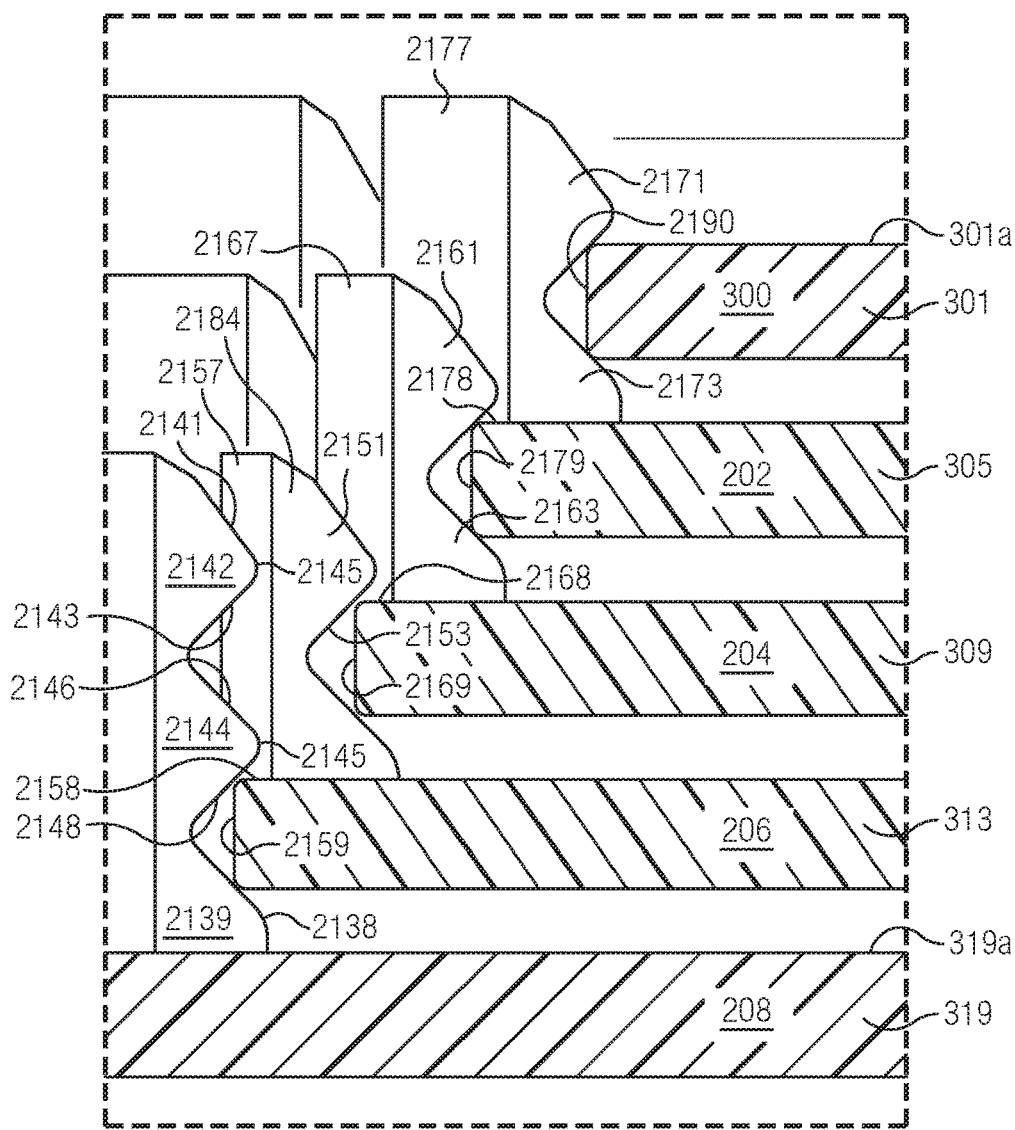
FIG. 23B is a detail of FIG. 23A, detailing attachment of ratcheting posts to the bottom walls of the shells and base inner cup.

FIGS. 23, 23A and 23B show yet another type of affixing means that will attach the shells 208-202 and the base inner cup 300 through their respective bottom walls. For simplicity's sake, illustrated is a single retainer in the form of a ratcheting post system that is centered on axis X, which extends through the center of the shells 208-202 and base inner cup 300. This form of retainer may also be constructed with a pair of circular ratcheting posts (not shown) formed around spaced-apart, respective axes, such ratcheting posts being angularly spaced by 180 degrees from each other, identical and equally spaced from the axis X.

The ratcheting post retainer system is comprised of a series of generally cylindrical ratcheting posts 2140, 2150, 2160 and 2170 (See FIG. 23A) that nest within each other. Each post 2140, 2150, 2160, 2170 is preferably integrally molded with the respective bottom wall 319, 313, 309, 305 of a shell, so as to perpendicularly extend upwardly from the bottom wall of the respective shell. Since the base inner cup 300 does not attach to another component interior to it, it is only provided with a circular ratcheting post receiving hole 2190 through its bottom wall 301.

As best seen in FIG. 23, the effective diameter of each ratcheting post increases as the shell outside diameter decreases. The centers of each ratcheting post 2150-2170 on shells 206-202 are hollow while post 2140 on shell 208 is a solid post, although it could also be hollow. The hollow centers of ratcheting posts 2150-2170 are delimited by the respective circular inner sidewalls 2157, 2167 and 2177.

Each post is optionally provided with at least one respective slit 2182, 2184, 2186 or 2188 that axially dissects the sidewall of each respective post 2140, 2150, 2160 and 2170. The hollow centers of each post 2150-2170, in combination with the slits 2182-2188, will provide flexibility that facilitates the attachment of the shells to each other or to the base inner cup, as will be explained below.

A second, additional slit 2184', 2186' and 2188' may be provided to further increase the flexibility of these posts, as depicted in FIG. 23. The two slits which are provided in each of the ratcheting posts 2150-2170 are positioned at 90 degrees to each other. It is preferred that post 2140 of shell 208 be constructed as a solid post with a single slit 2182 to increase its structural integrity against repeated attachments and detachments from shell 206 during the life of the cell phone mounting apparatus.

In the embodiment shown in FIGS. 23-23B, when shells 208-202 and base inner cup 300 are affixed together, ratcheting post 2140 of shell 208 is received within the hollow interior of post 2150 of shell 206, while post 2150 is received within the hollow interior of post 2160 of shell 204 and post 2160 of shell 204 is received within the hollow interior of post 2170 on shell 202. The ratcheting post 2170 on shell 202 is received within the ratcheting post receiving hole 2190 formed through the bottom wall 301 of base inner cup 300.

The outside wall of each ratcheting post is formed with at least first and second axially spaced, radially projecting rings, each ring having an identical, discus-like profile. The radial extent of each ring defines an outside diameter of a particular post when the rings are in the resting state, which FIGS. 23A and 23B show. The outside diameters of each post increase from shell 208 to shell 202. The rows of rings on any ratcheting post only fasten to the bottom wall of the shell interior to it. Post 2140 has been provided with three rings: a first, upper ring 2142, a second, central ring 2144, and a third, bottom ring 2139. However, it has been found that only two rows of rings 2139, 2144 are needed to sufficiently attach the shells together.

The rings on each hollow post 2150-2170 are identical in section to the rings 2139, 2142 and 2144 on post 2140. Therefore, only the rings of post 2140 will be described in detail. As shown, the top ring 2142 is defined by a sloped top surface 2141 and a sloped bottom surface 2143. The central ring 2144 has a sloped top surface 2146 and a sloped bottom surface 2148. The lowest ring 2139 is only a half ring, defined only by a sloped top surface 2138, as best seen in FIG. 23B. It is seen that the bottom rings 2153, 2163, 2173 on posts 2150-2170 are also formed as half rings.

Each ring surface 2138, 2141, 2143, 2146, 2148 extends radially outward from the post and at an acute angle towards each other so as to form ring edges 2145. The ring edge 2145 on the bottom ring 2139 is considered to be the point where the top surface 2141 meets the bottom wall surface 2143. The vertical distance between ring edge 2145 on ring 2142 and ring edge 2145 on ring 2144 is the same as the axial separation of the ring edges 2145 on posts 2150-2170. FIGS. 23, 23A and 23B only show two rings on posts 2150-2170 but if a like number of additional rings were provided on each of these posts, the vertical distance from peak to peak would remain constant between rings.

The wall thickness of each hollow post is identical from post to post and it is defined as the distance from the ring edge 2145 to a respective interior wall of the post. For example, the wall thickness of post 2170 is represented by the distance between edge 2145 and internal wall 2177.

Functionally, when shell 208 is moved upwardly for connection within the hollow interior of shell 206, the post 2140 on shell 208 must first enter through a circular ratcheting post receiving aperture 2159 formed through the bottom wall 313 of shell 206 (FIG. 23B). The circular opening 2159 is in communication with the hollow interior of shell 206 and is centered with respect to the circular inner sidewall 2157 that defines the generally circular and hollow interior of post 2150. The circular opening 2159 has a perimeter edge that defines a diameter thereof, and it should be noted that the diameter of circular opening 2159 is relatively smaller than the outside diameter of post 2140.

When an upper ring surface 2141, 2146 of the first, upper ring 2142 and the second central ring 2144 encounters opening 2159, the slit 2182 in the post 2140 will allow the first and second rings to radially inwardly flex to a compressed state while being inserted through opening 2159. Once the post and the rings are passed through opening 2159, the rings of the post return to the resting state. At that point, the upper ring 2142 and the central ring 2144 will extend beyond the perimeter edge of the ratcheting post receiving aperture 2159, whereby bottom wall 313 of shell 206 becomes lodged between and captured by the central ring 2144 and the bottom ring 2139. More specifically, the perimeter ledge 2158 will be captured between bottom surface 2148 of the central ring 2144 and top surface 2138 of bottom ring 2139 such that each ring is cooperatively holding the bottom wall 313 of shell 206 so as to affix shell 208 to shell 206. The slit 2182 intentionally extends the entire height of post 2140 in order to give the post a limited amount of ability to flex, which assists with the teeth 2144 and 2142 being pushed through opening 2159.

In a similar fashion, when shell 206 is to be affixed to shell 204, the post 2150 on shell 206 will be inserted through the circular opening 2169 formed through the bottom wall 309 of shell 204. However, shells 206-202 are only provided with two rings, a first and upper ring 2151, 2161, 2171 and a second and bottom ring 2153, 2163, 2173. The upper surfaces of the respective first, upper rings 2151, 2161 and 2171 encounter the respective openings 2169, 2179 and 2190, whereby the respective slits 2184, 2186, 2188 in the posts 2150, 2160, 2170 will allow the respective first rings 2151, 2161, 2171 to radially inwardly flex to a compressed state while being inserted through respective openings 2169, 2179 and 2190. Once the respective posts and rings are passed through the openings, the first, upper rings on each of the posts will return to the resting state. At that point, the upper rings 2151, 2161, 2171 extend beyond the perimeter edge of the respective ratcheting post receiving apertures 2169, 2179 and hole 2190, whereby a respective bottom wall 309, 305, 301 will become lodged between and captured by the respective upper rings 2151, 2161, 2171 and the respective bottom rings 2153, 2163, 2173 on posts 2150, 2160 and 2170, thereby fastening a shell to the next shell more interior to it or fastening the innermost shell 202 to the base inner cup 300.

More specifically, the perimeter ledges 2168 on shell 204, 2178 on shell 202 and the bottom wall 301 surrounding hole 2190 will be captured between the bottom surfaces of the upper rings 2151, 2161, 2171 and the top surfaces of the bottom ring 2153, 2163, 2173 such that the top and bottom rings on each post will cooperatively hold the respective ledges of shells 204 and 202 and the bottom wall 301 of base inner cup 300 so as to affix shell 206 to shell 204, shell 204 to shell 202 and shell 202 to inner cup 300.

As seen in FIG. 23B, circular aperture 2169 is larger than circular aperture 2159, and any such opening on an interior shell or cup wall will be larger than the opening on any shell that is exterior to it.

FIGS. 23A and 23B also illustrate that the inside diameter of each of the hollow posts 2150, 2160, 2170 is partly controlled by the outside diameter of the tooth rings of the post that will slide within the hollow post. The minimum inside diameter of each hollow post occurs adjacent to a small detenting ledge 2158, 2168, 2178 around the respective interior circular openings 2159, 2169, and 2179 in each post 2150-2170. As best illustrated in FIGS. 23 and 23B, the diameter of opening 2159 is smaller than the interior diameter of hollow post 2150, which is delimited by the interior wall 2157, thereby creating an annular detenting ledge 2158 around opening 2159 at the bottom of post 2150. The detenting ledge 2158 gives rings 2144 and 2139 a respective top and bottom wall surface to capture and hold. A similar detenting ledge 2168, 2178, is formed at the interior bottom of respective posts 2160 and 2170, which means that the circular openings 2169 and 2179 associated with posts 2160 and 2170 are smaller in diameter than the respective inside diameters of each post. The respective ledges 2168 and 2178 present a cylindrical surface for the rings of posts 2150 and 2160 to capture and hold. The base inner cup 300 is not provided with a hollow post, but is provided with a circular hole 2190 that is sized to allow the rings on post 2170 to capture and hold the bottom wall 301 after the cup is pushed downwardly into engagement with post 2170.

Ledge 2158 is created by a difference in diameter between opening 2159 and post interior sidewall 2157. Ledges 2168 and 2178 are formed similarly. The amount that a ledge extends radially inwardly from a post interior sidewall is uniform. This ledge width should only be as wide as needed for the rings to fully capture the upper and lower surfaces of a respective bottom wall. FIG. 23A shows the arrangement of the shells and base inner cup when they are affixed together and it should be clear that detaching the shells from each other or from the base inner cup can be accomplished by removing the outermost shell, one shell at a time.

Figure 29:
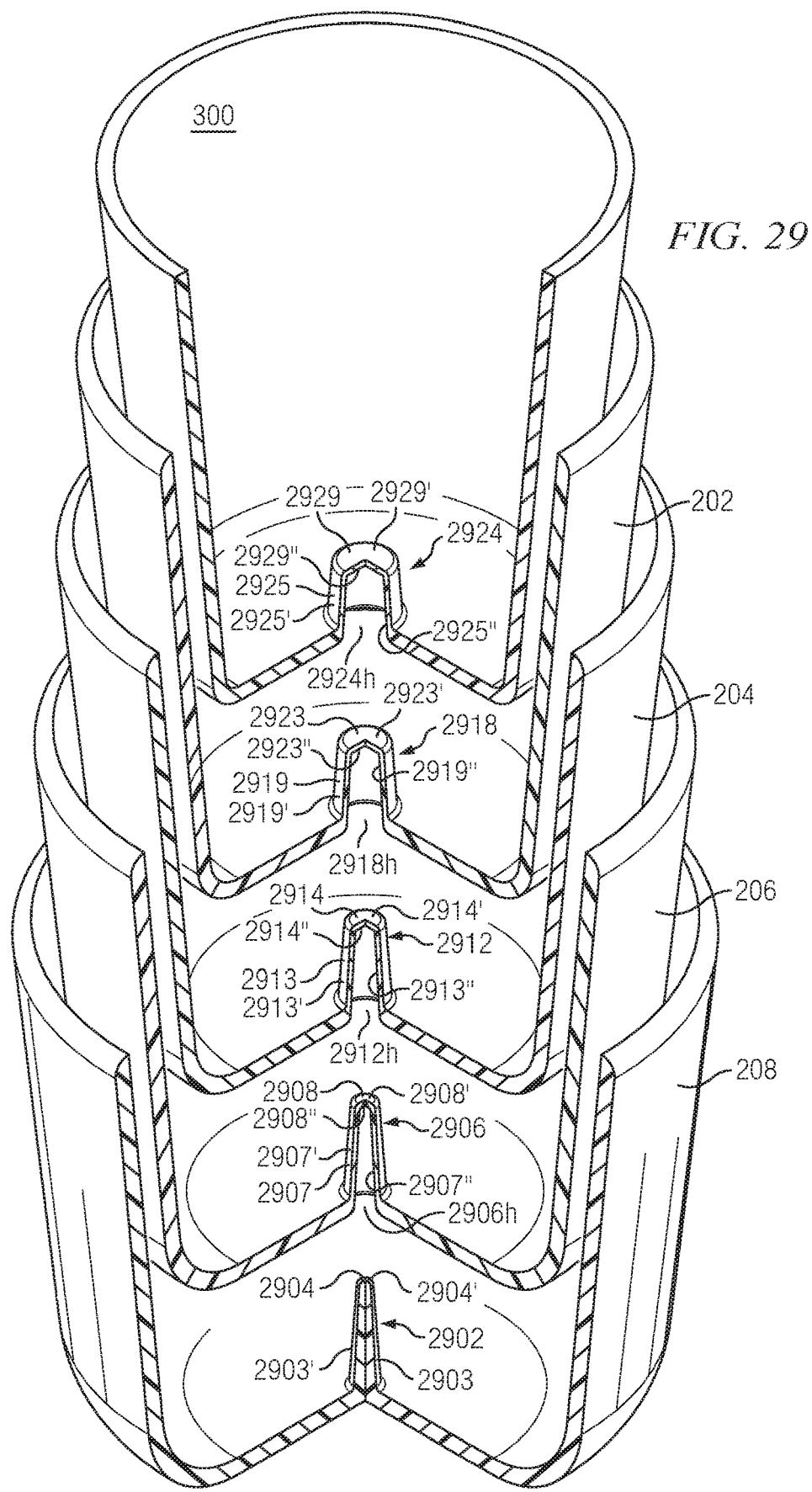
FIG. 29 is an exploded perspective view partially cut away showing another embodiment of a bottom-based attachment means in the form of hollow posts that frictionally stack within each other for attaching the shells to each other and to the base inner cup.
Figure 29A:
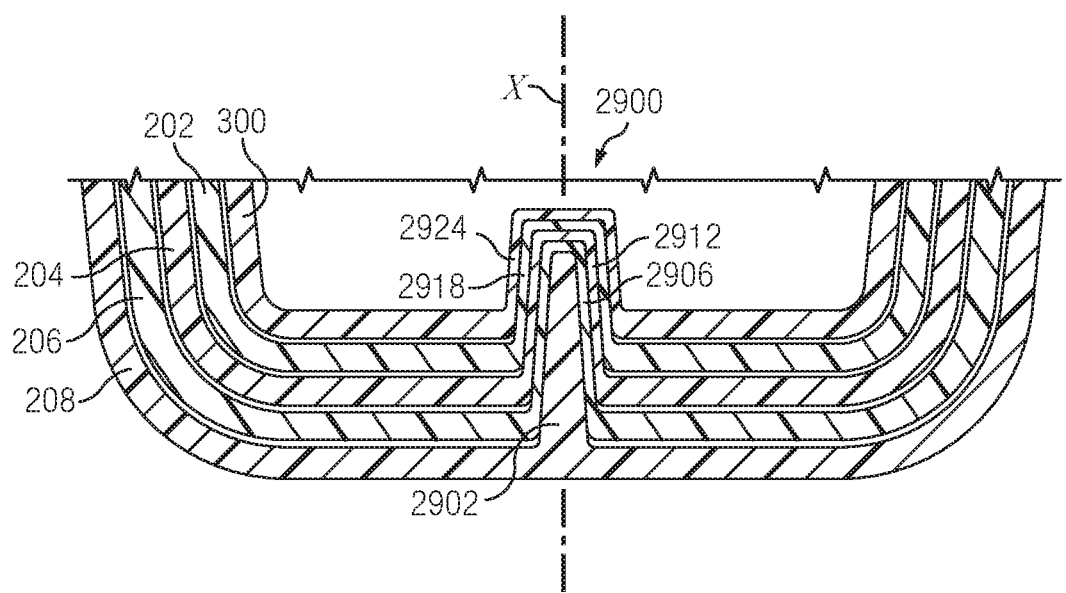
FIG. 29A is a partial axial sectional view showing the shells and base inner cup in an attached state using the attachment means shown in FIG. 29.

FIGS. 29 and 29A show yet another embodiment for affixing the shells and base inner cup through their respective bottom surfaces. The retainer illustrated here is a different type of center post retaining system 2900 that is comprised of cones 2902, 2906, 2912, 2918 and 2924 that preferably are respectively integrally formed with the interior bottom wall surface on each shell and on the base inner cup as shown. The cones 2902-2924 are designed to frictionally fit within a mating cone on a shell or base inner cup that is interior to it so as to releasably affix the shells and base inner cup together. In this illustrated embodiment, the shape of each cone is defined by a continuous and tapering sidewall that is centrally located (on axis X) within the interior of each shell and base inner cup, each sidewall forming a hollow interior.

The sidewall of each cone 2906, 2912, 2918, 2924 on shells 206-202 and the base inner cup 300 is defined by a wall having an inside frustoconical wall surface and an outside frustoconical wall surface. The top of each respective cone 2902, 2906, 2912, 2918 and 2924 is truncated and includes a top wall 2904, 2908, 2914, 2923 or 2929. The top walls of the hollow cones 2906, 2912, 2918 and 2924 close the interior opening of each cone at a respective top end thereof. At the bottom end of each hollow cone, the bottom wall is provided with a central hole that extends through the bottom wall of the shell such that the hole is in communication with the interior of the cone. The diameter of the hole in each bottom wall is the same as the inside diameter of the entrance of the cone formed on the same bottom wall. The bottom wall of shell 208 is not provided with a hole. This stackable retainer system could also be constructed as a dual system (not shown) such that a pair of stackable cones could be arranged in an opposed relationship on the bottom wall of each shell or base inner cup, equally spaced from a respective shell or cup sidewall and both spaced from axis X.

As shown in FIG. 29, the top wall 2904 of conical member 2902 has an exterior wall surface 2904'. This particular cone is the tallest of the other retention cones (see FIG. 29A) and the solid body strengthens the mated connection between it and the hollow cone on shell 206 once cone 2902 is inserted within cone 2906. Because of its tall profile, the outside wall surface 2903' presents a large surface area for frictional engagement when it is slid within cone 2906 on shell 206. At any particular point along the X axis, the outside diameter of cone 2902 is at least equal to and is preferably slightly larger than the inside diameter of cone 2906 such that when outside wall surface 2903' frictionally engages against inside wall surface 2907" of cone 2906, the interference fit within cone 2906 will be very strong, heightened by it being a solid wall. Most of the outside wall surface 2903' of cone 2902 will be in frictional engagement with the entire inside wall surface 2907" on cone 2906 of shell 206 when outermost shell 208 is attached to shell 206.

As best seen in FIG. 29A, the vertical height of cone 2902 is predetermined so that when cone 2902 is inserted through the central hole 2906h in shell 206 (See FIG. 29) and then fully within the interior of cone 2906, the top wall surface 2904' will contact the inside surface 2908" of the top wall 2908 of cone 2906, leaving no gap between the shells. This same arrangement will be provided on the other shells 206-202 and inner cup 300 so that when they are attached together, there is no gap between them.

Again turning to FIG. 29, it is seen that cone 2906 within shell 206 is defined by a frustoconical wall 2907 with an inside wall surface 2907" and an outside wall surface 2907'. Cone 2906 has a top wall 2908 with an inside surface 2908" and an outside surface 2908'. The lowest point of interior wall surface 2907" delimits the diameter of central hole 2906h. Likewise, the lowest points of the respective inside surfaces of each of the other cones will delimit the diameter of the central hole that is formed through the bottom wall of each of the other shells and each of the other central holes will also be in communication with the interior of the cone.

Cone 2906 on shell 206 is taller than cone 2912 on shell 204. Most of the outside wall surface 2907' of cone 2906 will be in frictional engagement with the entirety of the inside wall surface 2913" of cone 2912 on shell 204 once cone 2906 is slid within cone 2912. The outside diameter of cone 2906 is at least equal to and preferably slightly larger than the inside diameter of cone 2912 in order to increase the interference fit between these cones. With reference to FIGS. 29 and 29A, the cone 2906 is first inserted within the central hole 2912h that is in communication with cone 2912 on shell 204 and once inside cone 2912, it is pushed upwardly until the top wall surface 2908' contacts the inside surface 2914" of the top wall 2914 of cone 2912.

The cone 2912 on shell 204 is likewise defined by frustoconical wall 2913 with an inside surface 2913" and an outside surface 2913'. A top wall 2914 of cone 2912 has an outside surface 2914' and an inside surface 2914". The lowest point or locus on interior wall surface 2913" delimits the diameter of central hole 2912h. Cone 2912 is taller than cone 2918 on shell 202, such that most of its outside wall surface 2913' will be in frictional engagement with the entirety of the inside wall surface 2919" of cone 2918 on shell 202 when cone 2912 is slid within cone 2918 on shell 202. At any particular point on axis X, the outside diameter of cone 2912 is at least equal to and preferably slightly larger than the inside diameter of cone 2918 in order to increase the interference fit between these cones. When cone 2912 is first inserted within the central opening 2918h that is in communication with the interior of cone 2918 on shell 202, it is then upwardly pushed into the interior of cone 2918 until the top wall outside surface 2914' contacts the inside surface 2923" of the top wall 2923 of cone 2918.

As FIG. 29 finally shows, the cone 2924 on base inner cup 300 is likewise defined by a frustoconical wall 2925 and a top wall 2929. The frustoconical wall 2925 has an exterior surface 2925' and an inner surface 2925". The top wall 2929 has an inside surface 2929" and an outside surface 2929'. Cone 2924 is the shortest cone. At any particular point along axis X, the outside diameter of cone 2918 is at least equal to and preferably slightly larger than the inside diameter of cone 2924 in order to increase the interference fit between these cones. When cone 2918 is first inserted within the central opening 2924h that is in communication with the interior of cone 2924 on base cup 300, it is upwardly pushed into the interior of cone 2924 until the top wall outside surface 2923' contacts the inside surface 2929" of the top wall 2929 of cone 2924. When assembled, it is seen that most of the outside wall surface 2919' of cone 2918 is in frictional engagement with the entire inside wall surface 2925" on cone 2924 of base inner cup 300. Although slightly exaggerated in FIG. 29, it is seen in FIG. 29A that the difference in height from one cone the next is merely the thickness of each shell bottom wall.

Figure 30:
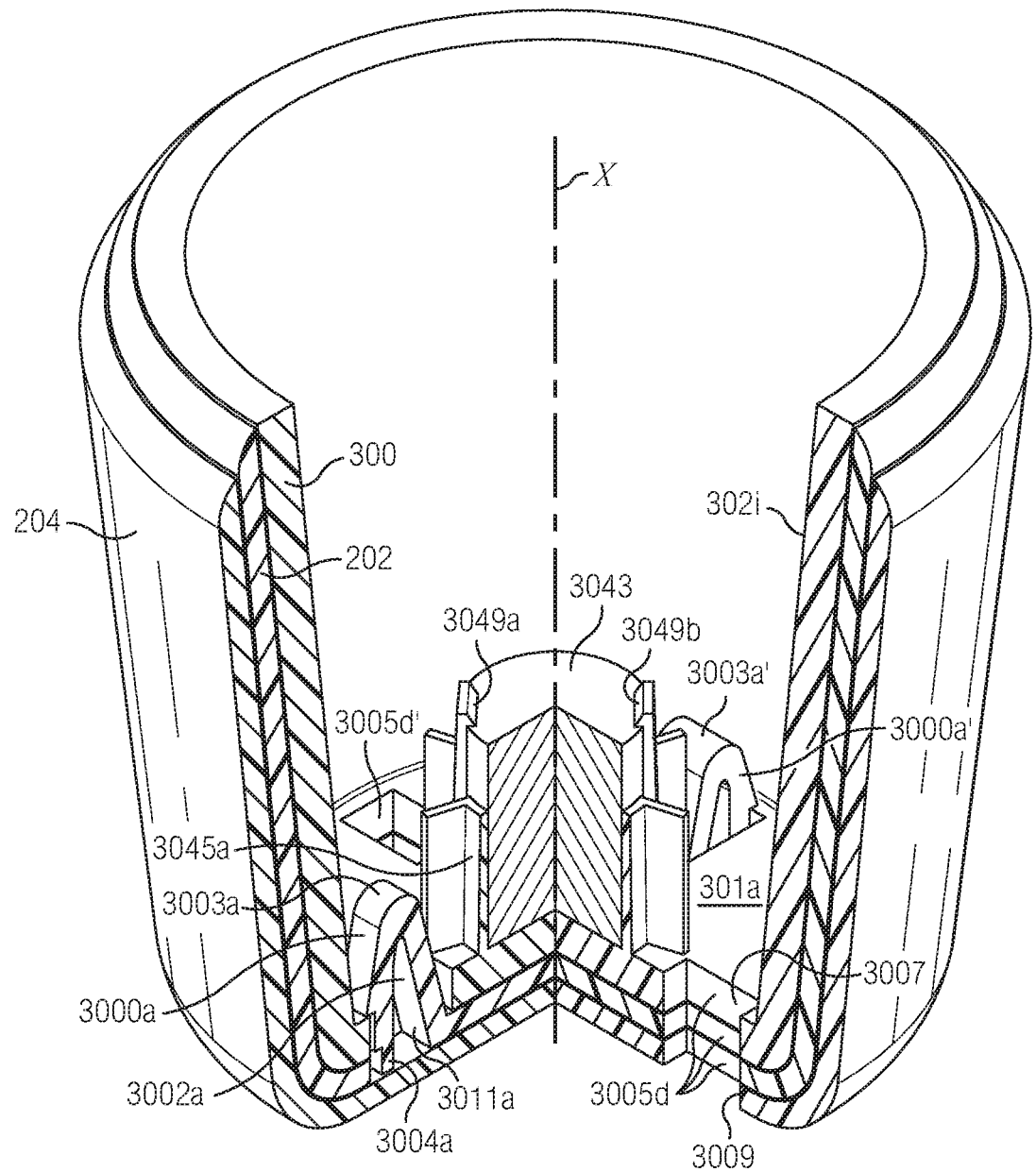
FIG. 30 is a perspective view partially cut away showing another embodiment of a bottom-based attachment means in the form of spring clips that attach each of the shells independently to the base inner cup and wherein the interior of the base inner cup is shown to be provided with an optional weight that provides added cup stability.

Still another embodiment of a bottom attaching means is shown in FIGS. 30-30E and this embodiment is comprised of a plurality of similar retainers and a plurality of identical retainer receiving holes that interact with the retainers to attach each of the plurality of shells to the bottom wall 301 of the base inner cup 300 rather than to each other. In order to provide an effective and balanced attachment, it is preferred to provide two or more retainers 3000a, 3000a'; 3000b, 3000b' etc. on each shell with a like number of retainer or clips from shell to shell. Likewise, if the retainers 3000a, 3000a'; 3000b, 3000b' etc. are provided in pairs, then retainer receiving holes 3005a, 3005a'; 3005b, 3005b' etc. should be provided in pairs also.

Figure 30B:
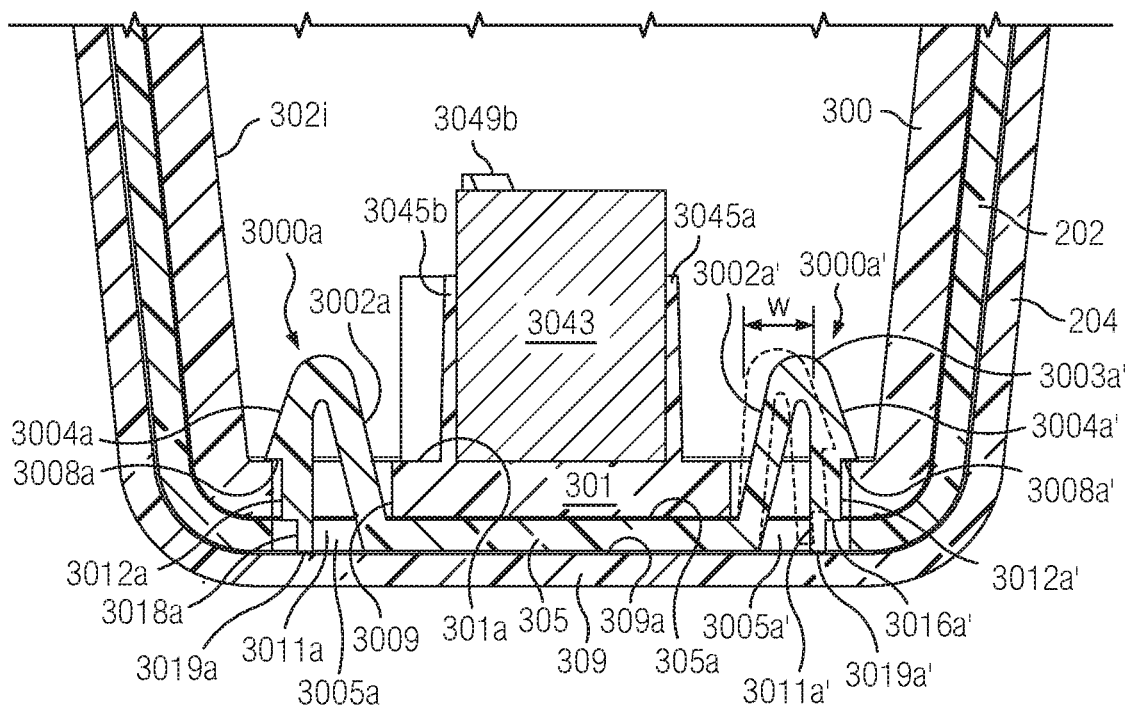
FIG. 30B is a partial axial sectional view taken substantially along line 30B-30B of FIG. 30A.

Retainer receiving holes 3005a, 3005a' 3005b, 3005b'; 3005c, 3005c' and 3005d, 3005d' are formed through the bottom walls of some or all of the shells and are formed through the bottom wall 301 of the base 300. FIG. 30D, an exploded schematic view showing only the shell and cup bottom walls, best illustrates an exemplary arrangement of four clip pairs 3000a, 3000a'; 3000b, 3000b'; 3000c, 3000c' and 3000d, 3000d' and the retainer receiving holes 3005a, 3005a'; 3005b, 3005b'; 3005c, 3005c'; 3005d, 3005d' adapted to receive them.

Figure 30C:
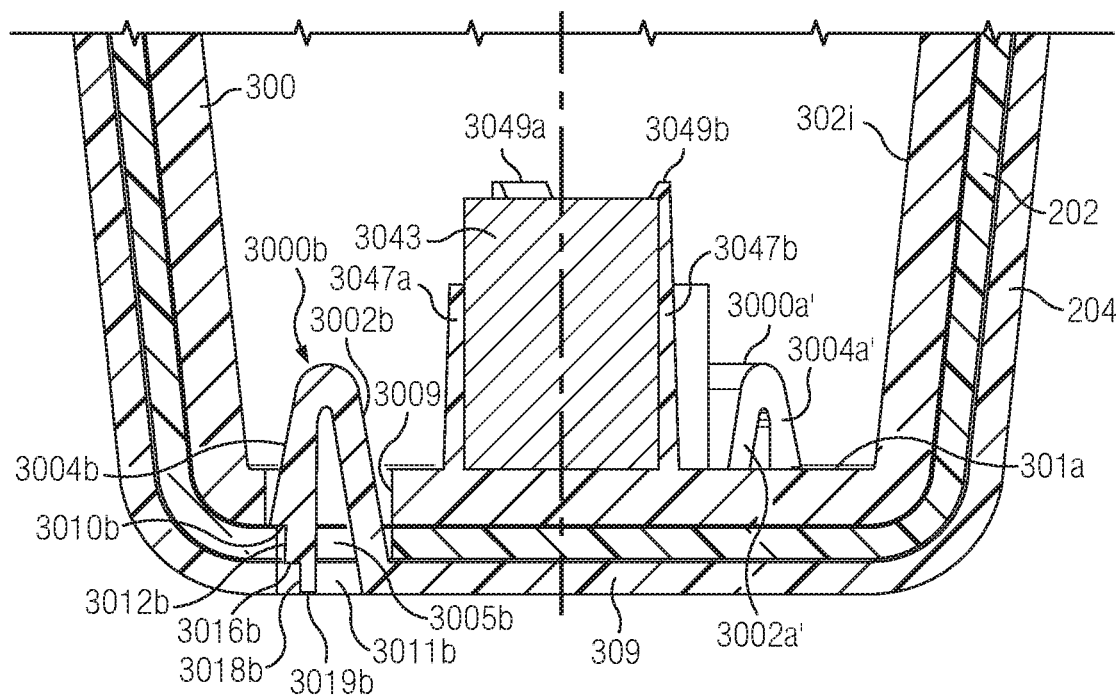
FIG. 30C is a partial axial sectional view taken substantially along line 30C-30C of FIG. 30A.
Figure 30D:
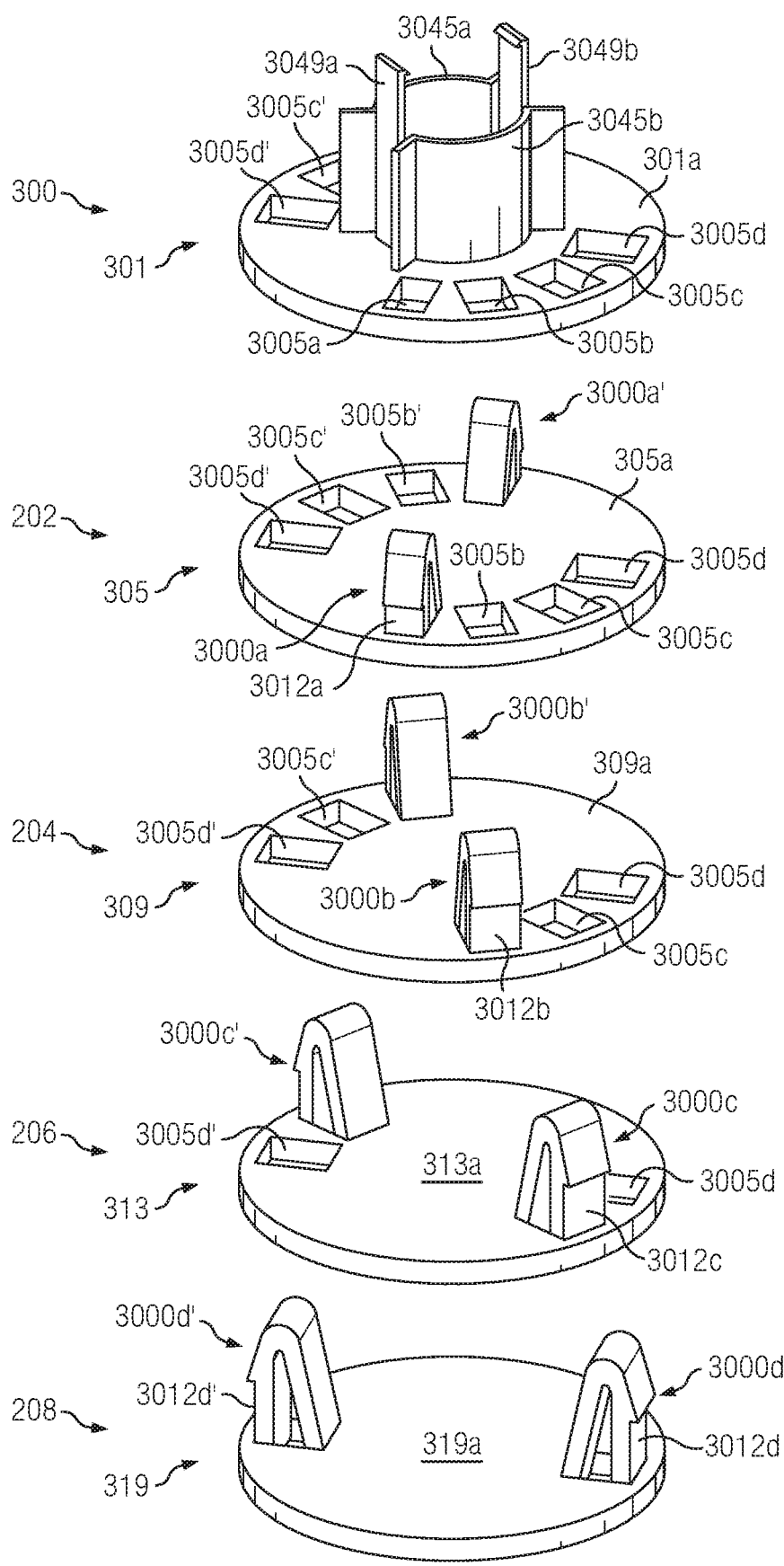
FIG. 30D is a schematic exploded view of the bottom walls of the shells and the base inner cup illustrating the angular positioning of the spring clips and the clip receiving openings in order for all spring clips to attach to the interior surface of the bottom wall of the base inner cup.

For reasons of clarity, FIGS. 30-30C illustrate the concept of this embodiment with only shells 204, 202 and base inner cup 300 and with just two pairs of 3000a, 3000a' and 3000b, 3000b' of the spring clips. All retainers of this embodiment are in the form of similarly constructed spring clips that extend upwardly away from a respective bottom wall of a shell and are radially spaced by the same extent from axis X, no matter the shell. Each clip also extends upwardly away from the bottom wall of the base inner cup by the same extent when the shells are attached to the base inner cup. The spring clips that are provided on one shell will be received into a like number of dedicated receiving openings on all shells interior to it as well as the base inner cup.

As shown in FIGS. 30 and 30B, the first shell 202 is provided with a pair of identically constructed and opposed spring clips 3000a, 3000a' that extend upwardly by the same extent from the inside surface 305a of the bottom wall 305 and are spaced an equal distance away from axis X. Clips 3000a and 3000a' extend through dedicated and identical clip receiving holes 3005a and 3005a' that are formed through the bottom wall 301 of the base inner cup 300. Thus, the spring clips on any shell which may be added to the two shells in the illustration will have the same added number of spring clips on the bottom walls of the other shells, and the spring clips from those additional shells will interface with a dedicated number of identical clip receiving holes on all shells that are interior to it, as well as the base inner cup 300. All of the clips are preferably integrally molded with the bottom wall from the shell from which they originate.

As shown in FIG. 30D, opposed spring clips 3000a, 3000a' on shell 202 and opposed spring clips 3000b, 3000b' on shell 204 are integrally formed with a respective bottom walls 309, 305. Each pair of clips projects upwardly through dedicated clip receiving holes 3005a, 3005a' and 3005b, 3005*b*' that are formed in the bottom walls of the shells and base inner cup 300 that are interior to it.

In a like manner, the spring clips on an outermost shell 208 and the shell interior to it, shell 206, upwardly extend through dedicated openings 3005*c*, 3005*c*', 3005*d*, 3005*d*' in the shells interior to them and through dedicated openings 3005*c*, 3005*c*', 3005*d*, 3005*d*' in the base inner cup 300. In this way, the clips from each shell will directly fasten to the inner surface 301*a* of the bottom wall 301 of base inner cup 300.

For each pair of clips on a particular shell, an identical set of holes in the shells interior to it are dedicated to receive only that pair. Each set of holes meant to receive a particular pair of spring clips, such as holes 3005*d*, 3005*d*' which receive spring clips 3000*d*, 3000*d*', are in angular alignment with each other but are angularly spaced from all other clip-receiving holes.

The clips on all of the shells may be of the same width, but alternatively the widths of the clips can be made to vary from shell to shell. However, if the clip widths vary, the widths of the clip receiving holes must vary in the same way. In some instances, it may be desirable to make the clip widths on every other shell vary between wide and narrow or to provide clips the outermost shell 208 with the widest clips and then progressively narrow the widths from shells 206-202 such that shell 202 would have the narrowest set of clips relative to the other shells. Introducing variation into the widths of the clips from shell-to-shell could assist a user to more readily align a set of clips on one shell with its matched clip receiving holes on all of the other shells that have the same width.

Because the clips on each shell upwardly project through all of the shells and the base inner cup interior to it, the clips 3000*a*, 3000*a*' on shell 202 will be shorter in height than the clips 3000*b*, 3000*b*' on shell 204, while the clips on shell 204 will be shorter than the clips on shell 206 and that the clips on shell 206 will be shorter than the outermost clips on the outermost shell 208, with the height differing from shell-to-shell by the thickness of the bottom wall of the shells to which the clips must extend.

FIGS. 30 and 30B-30C show bottom wall 301 of base inner cup 300 with a relatively thicker bottom wall compared to the bottom walls of shells 202 and 204. Alternatively the bottom wall 301 of base cup 300 could be of the same thickness as the thickness of the shell bottom walls 305, 309, 313, 319. The heights of the clips would be adjusted accordingly. FIG. 30D best illustrates that shell 208, being the outermost shell, will not be provided with clip receiving holes, but only the pair of upstanding clips 3000*d*, 3000*d*'. Base inner cup 300, being the innermost component, is only provided with clip receiving openings 3005*a*, 3005*a*', 3005*b*, 3005*b*', 3005*c*, 3005*c*' and 3005*d*, 3005*d*' since it will not be attaching to any other shell interior to it. (The holes 3005*a*, 3005*a*', 3005*b*, 3005*b*' formed in base bottom wall 301 are obscured by other structure in FIG. 30D; see FIG. 30A-30C.)

FIG. 30D shows shells 206 and 208 being provided with respective spring clips 3000*c*, 3000*c*' and 3000*d*, 3000*d*' that are similar in form to the clips on shells 204 and 202. Because the bottom-most clips 3000*d*, 3000*d*' on shell 208 are tall and each one extends through the bottom walls of all shells 206-202 and the base cup 300 above it, the opposed pair of clips 3000*c*, 3000*c*' provided on shell 206 must be angularly displaced from the pair of clips 3000*d*, 3000*d*' from shell 208 which are projecting through its bottom wall 313. Likewise, the clips 3000*b*, 3000*b*' on shell 204 must be angularly displaced from the clips of shells 208 and 206 which are projecting through its bottom wall 309, while the clips 3000*a*, 3000*a*' on shell 202 must be angularly displaced from the clips of shells 208, 206 and 204, all of which are projecting through its bottom wall 305. All clip pairs will be angularly spaced around the circumference of each of the circular bottom walls much like the numbers on the face of a clock but angularly displaced relative to the location of each pair of clips from the shells below it.

Likewise, the clip receiving holes 3005*a*, 3005*a*'-3005*d*, 3005*d*' on shells 206-202 and the base inner cup 300 will be displaced angularly from each other around the circumference of the respective bottom walls in the same manner and also equally spaced from axis X. FIG. 30D also illustrates that the pairs of various clip receiving holes on a shell or on the base inner cup which are dedicated to receive the pair of clips from the shell from which the clips originated, will be in vertical registry with each other and with the clips to which they are dedicated. In this way, the clips from a particular shell will upwardly extend through dedicated, vertically registered clip receiving holes in the bottom walls of all shells and the base inner cup that are above that particular shell.

As FIG. 30B best shows, clips 3000*a* and 3000*a*' on shell 202 upwardly extend through clip receiving holes 3005*a* and 3005*a*' that are formed in shell 202 and in the base inner cup 300. Clips 3000*a*, 3000*a*' fasten to bottom wall 301.

Likewise, and as seen in FIG. 30D the outmost clips 3000*d*, 3000*d*' on outmost shell 208 extend upwardly through the vertically registered receiving holes 3005*d*, 3005*d*' in shells 206, 204, 202 and base inner cup 300. Clips 3000*c* and 3000*c*' on shell 206 extend upwardly through the vertically registered clip receiving holes 3005*c* and 3005*c*' on shells 204 and 202 and base inner cup 300. As seen in FIGS. 30C and 30D, clips 3000*b*, 3000*b*' on shell 204 extend upwardly through dedicated and vertically registered receiving holes 3005*b*, 3005*b*' in shell 202 and base inner cup 300.

All clip pairs will project the same extent above the interior surface 301*a* of the base inner cup 300 once the shells are attached thereto. FIG. 30A illustrates an example of how the clips 3000*a*, 3000*a*' and 3000*b* and 3000*b*' from shells 202 and 204 are equally spaced from axis X and are angularly spaced from each other, preferably by an equal distance. Although not shown in FIG. 30A, the clip pairs from shells 208 and 206 would be shown in this figure equally spaced between the clip pairs 3000*a*, 3000*a*' and 3000*b*, 3000*b*'. In the illustrated embodiment, clips 3000*a*-3000*d* and their dedicated receiving holes subtend an arc of 90 degrees around axis X, while opposed clips 3000*a*' 3000*d*' and their dedicated receiving holes subtend an opposed 90 degree arc around axis X.

As seen in FIGS. 30, 30A, 30B and 30D, the exemplary pair of spring clips 3000*a*, 3000*a*' on shell 202 pass through clip receiving holes 3005*a* and 3005*a*' formed in the bottom wall 301 of base inner cup 300.

The dedicated clip receiving holes 3005*a* and 3005*a*' formed in base inner cup 300 which receive the spring clips 3000*a*, 3000*a*' are identical in size and shape and are equally spaced the same distance from axis X. Each of the receiving holes 3005*a*, 3005*a*' is comprised of a pair of spaced sidewalls 3007 and a pair of spaced end walls 3009. Each hole has the same length, which corresponds to the extent of the sidewalls 3007, and each hole also has the same width, which corresponds to the extent of the end walls 3009.

Since all illustrated clips have the same basic construction, only the clip 3000*b* will be described in conjunction with FIG. 30E. Clip 3000*b* has an upwardly extending base arm 3002*b* that has an upper joined to a downwardly extending attachment arm 3004*b* at a living hinge 3003*b*. The lower end of base arm 3002*b* is integrally formed with the bottom wall of the shell, in this case bottom wall 309 of shell 204. The remote and free end 3019*b* of the attachment arm 3004*b* extends downward and radially outward from living hinge 3003*b* and has a limited freedom to horizontally move relative to the base arm as a result of the living hinge 3003*b*.

All spring clips must be provided with a supplementary opening in order to provide the respective free ends with the ability to move. In FIGS. 30 and 30B it is seen that supplementary openings 3011*a*, 3011*a'* have been provided through the bottom wall 305 of shell 202, each one adjacent to its respective base arm 3002*a*, 3002*a'*. An identical supplementary opening is provided in the same location for all of the other spring clips on each shell. FIG. 30C shows supplementary opening 3011*b* in shell 204 being provided for spring clip 3000*b*.

As best seen in FIG. 30B, the free end 3019*a'* of the respective attachment arm 3004*a'* is disposed within supplementary opening 3011*a'*, but does not extend beyond it. The extent of movement of the free end 3019*a'* within the supplementary opening 3011*a'* is limited to an axial direction relative to axis X (FIG. 30). Each of the base arms 3002*a*, 3002*a'* also have a limited capacity to move radially with respect to axis X but their movement is significantly more limited compared to that of the attachment arms. In this illustrated embodiment, the length of the base arm 3002*b* and the length of the attachment arm 3004*b* of spring clip 3000*b* are about the same and the relative lengths of the base and attachment arms on the other clips is similar likewise. All of the clips will therefore have a profile that resembles an inverted letter V.

As FIG. 30E illustrates, the attachment arm 3004*b* has a first surface 3006*b*, a second surface 3012*b* and a third surface 3018*b*. The first surface 3006*b* downwardly and radially outwardly extends from its upper end, which is attached to the living hinge 3003*b*, to a lower end of the first surface 3006*b*. The attachment arm 3004*b* is also provided with a first horizontal undercut that forms a first overhang 3008*b* and a second horizontal undercut that forms a second overhang 3014*b*. The first overhang 3008*b* is spaced from the free end 3019*b* of the attachment arm 3004*b*. The first surface 3006*b* slopes radially outwardly and downwardly until it meets the first overhang 3008*b*. The first overhang 3008*b* is formed at an angle to the sloping first surface 3006*b* and radially inwardly extends from the lower end of the first surface 3006*b* to an inner end of the first overhang 3008*b*. In the illustrated embodiment, the first overhang 3008*b* is comprised of a horizontal surface 3010*b* that extends radially inwardly to a vertical second surface 3012*b*.

The second surface 3012*b* extends downwardly to a lower end of the second surface, where it meets a respective second overhang 3014*b*. The second overhang 3014*b* is formed at an angle to the second surface and radially inwardly extends from the lower end of the second surface 3012*b* to an inner end of the second overhang, where it meets a third, vertical surface 3018*b*. In the illustrated embodiment, the second overhang 3014*b* is comprised of a horizontal surface 3016*b* that extends radially inwardly from the second end of the second surface 3012*b* to the first end of a third planar surface 3018*b*. In the illustrated embodiment, the third surface is vertical and extends from the second overhang 3014*b* to a free end 3019*b* of the attachment arm 3004*b*.

The other clips 3000*a*, 3000*a'*, 3000*b'*, 3000*c*, 3000*c'*, 3000*d* and 3000*d'* have similar structure, and their parts are identified with cognate characters as necessary. For example, and as seen in FIG. 30B, clip 3000*a'* has a sloping first surface 3004*a'* that corresponds to first surface 3004*b* of clip 3000*b* (FIG. 30E).

In FIG. 30E it is seen that the third planar surface 3018*b* has a vertical height that will be the same on all the other clips. Although FIG. 30C illustrates this height 3018*b* as about the same as the thickness of the bottom wall 309 of shell 204, it can be extended if desired as the free ends 3019*b*, 3019*b'*, etc. do not attach to anything, do not abut the upper surfaces of the shells below them, and only serve as tabs for detachment purposes, as will be explained below.

As best illustrated by FIG. 30D, the vertical height of the second vertical planar surfaces 3012*b* (one shown) on clips 3000*b*, 3000*b'* are seen to be the same, but the vertical height of the corresponding planar surfaces 3012*a* (one shown) on shell 202 is shorter than that of surfaces 3012*b*, 3012*b'* because it is preferred that all clips upwardly project through the bottom wall 301 of base inner cup 300 by an equal extent, so that each can be readily reached and manipulated for detachment purposes. Thus, in FIG. 30C, the top of clip 3000*a'* is seen to be substantially in the same horizontal plane as the top of clip 3000*b*. In addition, FIG. 30D shows vertical surface 3012*a* on clip 3000*a* of shell 202 to be vertically shorter than cognate vertical surfaces 3012*b*, 3012*b'*, since surface 3012*a* (and the similar surface on clip 3000*a'*) only extend upward through the bottom wall 301 of base inner cup 300 once shell 202 is assembled to base cup 300. Thus, it should be understood from viewing FIG. 30D that the clips 3000*d*, 3000*d'* on the most exterior shell 208 will have the tallest attachment arms and hence the longest first planar surfaces 3012*d*, 3012*d'* compared with all of the other clips since they are required to extend through the bottom walls of each shell 206-202 as well as that of the base inner cup 300.

Each clip of this embodiment will function similarly and as best seen with respect to the rightmost clip 3000*a'* shown in FIG. 30B, when an attachment arm 3004*a'* is compressed towards base arm 3002*a'* and the two arms are held in a position close to each other, an inherent spring tension is realized in the form of a counter-resistive force that wants to resist the compression. When arm 3004*a'* is no longer being compressed, the inherent spring tension will cause attachment arm 3004*a'* to spring away from base arm 3002*a'* and assume its resting state position, which is exemplified in the left clip 3000*a* and the position of its base and attachment arms 3002*a*, 3004*a* of FIG. 30B. As shown, in the resting state, both arms of clip 3000*a* upwardly extend through the aligned openings 3005*a* that are formed in the base inner cup 300. As mentioned above, the horizontal lengths of the side walls 3007 (FIG. 30A) of all clip receiving openings are the same and this length is slightly larger than the distance "w" (FIG. 30B) between arms 3002*a'* and 3004*a'* when they are in a compressed state, which is best seen in dashed line in FIG. 30B. The insertion of each clip 3000*a* and 3000*a'* into a respective clip receiving opening 3005*a*, 3005*a'* will require the base arms 3002*a*, 3002*a'* and the attachment arms 3004*a*, 3004*a'* to be simultaneously compressed and pushed upwardly through clip receiving openings 3005*a* and 3005*a'*.

When the pairs of clips 3000*a*, 3000*a'* on shell 202 are completely through the openings 3005*a*, 3005*a'* and the compression is released so that each clip resumes its resting state condition, the clips will expand such that each of the first overhangs (see cognate overhang 3008*b* in FIGS. 30B and 30E) is disposed upwardly from the receiving holes 3005*a*, 3005*a'* in the base inner cup 300, whereby each of the horizontal surfaces (see cognate surface 3010b in FIG. 30E) is in abutting contact against the inside surface 301b of the bottom wall of cup 300. Thus, each clip captures the bottom wall 301 and fastens the shell 204 to base inner cup 300.

In the attached position, the third surfaces 3019a, 3019a' of each attachment arm 3004a, 3004a' will be disposed within the respective supplemental openings 3011a, 3011a' while each of the horizontal surfaces (see cognate surface 3010b in FIG. 30E) exerts a downward contact force against interior bottom surface 301a of base inner cup 300. However, the first vertical surfaces 3012a will only be in resting contact against the end wall surfaces 3009 of the openings of shell 202 and base inner cup 300. Of course, if shells 206 and 208 are required, the clips from those shells would find their respective first horizontal surfaces of their first overhangs similarly contacting the interior bottom surface 301a of base inner cup 300 and their respective first vertical surfaces in resting contact against the end wall surfaces 3009 of each opening through which they extend.

To fully release a shell from the base inner cup, say shell 202, the attachment arms 3004a, 3004a' of clips 3000a, 3000a' must again be compressed towards the base arms 3002a, 3002a', to the point where the first horizontal surfaces (see cognate surface 3010b in FIG. 30E) of each first overhang 3008a, 3008a' no longer contact the bottom wall surface 301a of the base inner cup so that the compressed clips can then be pushed down and out of all of the clip receiving openings 3005a, 3005a' until the shell is free. The compression of attachment arms 3004a, 3004a' may be accomplished by inserting an instrument into the supplementary openings 3011a, 3011a' once all of the other shells 204-208 have been detached from base cup 300 and removed, the instrument coming into contact with second vertical surfaces 3018a, 3018a' and then pushing the legs of the instrument towards axis X until attachment arms 3004a, 3004a' compress and then release the first overhangs from contact with the inside surface 301a.

From viewing FIG. 30D, it should be understood that the bottom wall 301 of cup 300 is only provided with dedicated pairs of clip receiving holes to accommodate the various pairs of clips from each of the shells 208-202, and since the clips vary do not vary in horizontal width or length while in a resting state, each pair of clip receiving holes will be the same size, but angularly displaced from the other pairs. As mentioned above, if the various clip pairs do have different widths from shell to shell, then the widths of the clip receiving holes will differ too.

FIGS. 30, 30B and 30C also illustrate that the base inner cup 300 can be provided with a weight, such as cylindrical weight 3043, which is secured within the interior of base inner cup 300, at interior bottom surface 301a. The weight 3043 gives the nested shells 202-208 and base inner cup 300, or just the base inner cup 300 by itself, a feeling of substantiality, and lowers the center of gravity for countering the weight of a cell phone that will be attached to the cell phone mounting bracket 214. This is especially true if the cell phone is mounted to a bracket that incorporates an extension bar, embodiments of which are described elsewhere herein. It should be understood that the weight and its securement means can be incorporated into any of the shell affixing embodiments presented herein and that such incorporation is not necessary to the performance of the various means for affixing the shells together. Preferably the weight 3043 is positioned on axis X for the best stability of the structure.

In this illustrated embodiment, the weight 3043 is held in position by a weight securement means that is comprised of a set of opposed and upright retention posts 3047a, 3047b that cooperate with a pair of spaced, curved retainer wall segments 3045a, 3045b. The anchoring posts 3047a and 3047b are positioned between the retainer wall segments 3045a and 3045b and the posts and wall segments preferably are integrally formed with bottom wall 301 of cup 300. Each post 3047a and 3047b is spaced from the retainer wall segments 3045a and 3045b so that they will radially outwardly flex independently of the wall segments 3045a and 3045b.

Post 3047a terminates at its upper end with a retention flange 3049a while post 3047b terminates at its upper end with a retention flange 3049b. The retention flanges each have a radially inwardly extending horizontal surface that will capture the top surface of the weight 3043. Each retention flange also has an upwardly and outwardly sloped camming surface located above its horizontal surface.

The weight may be initially secured within the securement means by abutting the lower surface of the weight 3043 on the camming surfaces of the retention flanges 3049a and 3049b. Pressing the weight 3043 down will cause the posts 3047a, 3047b to outwardly flex, permitting further downward displacement of the weight 3043 along axis X, until the bottom surface of the weight 3043 is supported by base cup top surface 301a. At a time at or before this happens, the retention flanges 3049a, 3049b will snap radially inwardly over the top surface of the weight 3043, thereby retaining the weight 3043.

The radial spacing of each wall segment 3045a, 3045b from axis X is predetermined so that when the weight 3043 is inserted within the wall segments, the outside cylindrical wall of the weight is tightly secured between the segments 3045a, 3045b, to prevent horizontal movement of the weight 3043. As best seen in FIG. 30C, each post 3047a, 3047b contacts the outside wall of the weight 3043 to further assist the wall segments in preventing the weight from horizontal movements.

Figure 31:
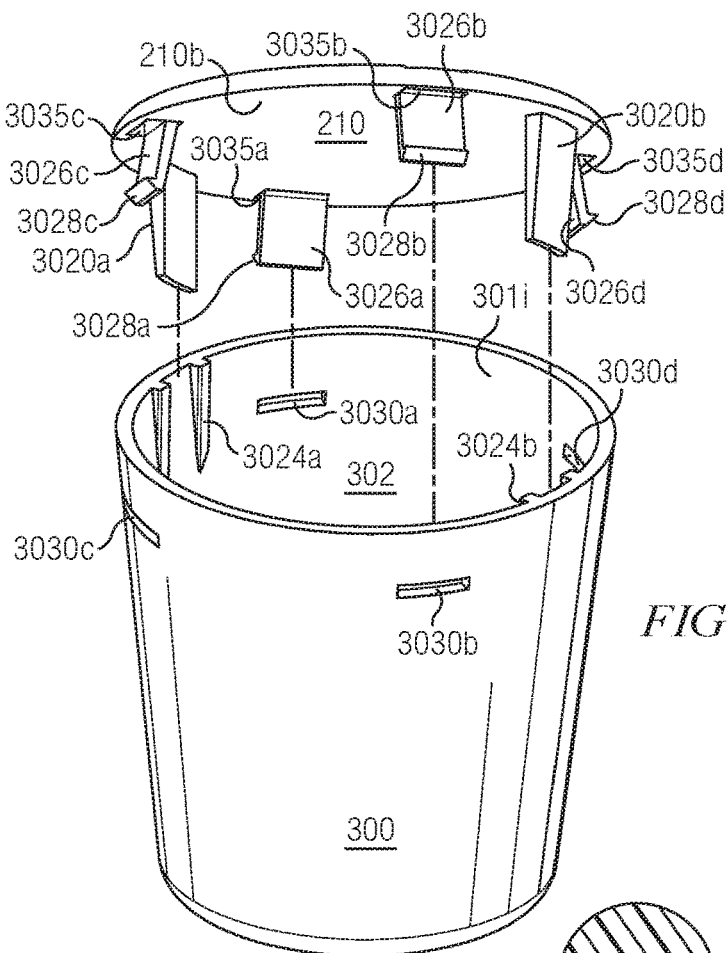
FIG. 31 is an exploded perspective view of the base inner cup and a base lid showing a guide system and a clip arrangement for semi-permanently securing the lid to the base inner cup.
Figure 31A:
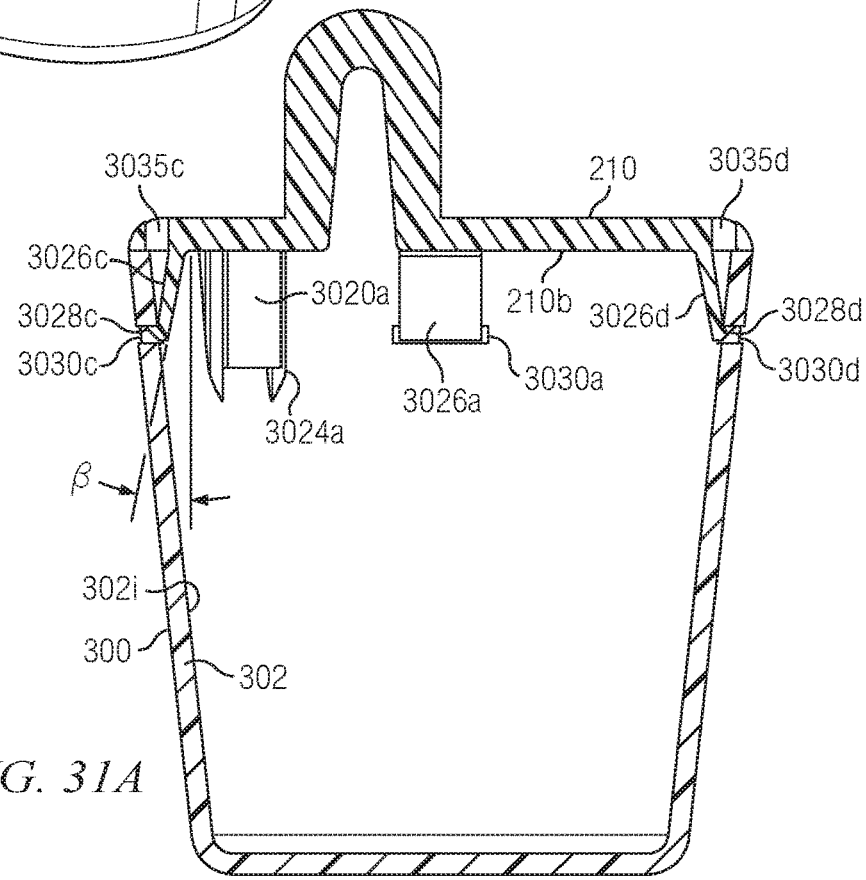
FIG. 31A is an axial sectional view through the base inner cup and lid of FIG. 31, as assembled.

In the embodiment shown in FIGS. 31 and 31A, the lid 210 is provided with diametrically opposed, identical guides 3020a and 3020b that extend downwardly from lid bottom surface 210b. The guides are mated with and received within diametrically opposed, identical guide rail pairs 3024a and 3024b that are integrally formed at the upper end of the sidewall 302 interior of the base inner cup 300. The bottom surface 210b of lid 210 is also provided with a plurality of pairs (two shown) of diametrically opposed attaching legs 3026a, 3026b and 3026c, 3026d. The base inner cup sidewall 302 is further provided with two pairs of diametrically opposed sidewall openings 3030a, 3030b and 3030c, 3030d, also formed at the upper end of the interior of the base inner cup 300.

The guides and guide rails are angularly spaced from the attaching legs and the sidewall openings. For example, guide 3020a is disposed between and spaced from attaching leg 3026a and 3026c, while guide rail pair 3024a is disposed between and angularly spaced from sidewall openings 3030a and 3030c. The vertical length of the guides 3020a, 3020b is greater than the vertical length of the attaching legs 3026a-3026d so that a lowering of the guides 3020a and 3020b into the guide rail pairs 3024a and 3024b will automatically align all of the attaching legs 3026a-3026d and their respective bottom feet 3028a-3028d in registry with respective sidewall openings 3030a-3030d.

As best seen in FIG. 31A, each of the attaching legs extends downwardly and radially outwardly from the planar bottom surface 210b at an acute angle 3 relative to the vertical. As FIG. 31A also shows, the sidewall 302 slopes downwardly and inwardly from the top end of the cup 300 to its bottom, so that as the guides 3020*a*, 3020*b* descend, the radially outwardly extending feet 3028*a*-3028*d* will initially contact the interior surface of the cup sidewall 302 at a position above openings 3030*a-d*. Further downward progression of the guides will cause the feet 3028*a*-3028*d* to progressively push against the cup sidewall 302, such that each attaching leg progressively deflects inwardly towards the axis of the cup. As each respective attaching leg 3026*a*-3026*d* is progressively deflected inward, the angle 3 decreases, thereby creating a progressively greater spring-like tension in each attaching leg. At the point where the bottom surface 210*b* of lid 210 comes into full resting contact against the top planar edge surface 326 of base inner cup 300, all of the feet 3028*a*-3028*d* will be fully aligned with the sidewall openings 3030*a*-3030*d*, whereby each of the attaching legs 3026*a*-3026*d* will release the stored spring tension within each foot and simultaneously spring into a respective opening as each attaching leg resumes its natural resting state position.

FIG. 31A only shows three of the attaching legs 3026*a*, 3026*c* and 3026*d* and their mating sidewall openings 3030*a*, 3030*c* and 3030*d*. The disposition of leg 3026*b* and opening 3030*b* is similar. Once the lid 210 is attached as described, it will be very difficult to remove without destroying it. The reason is that after attachment, the only way to detach the lid 210 from cup 300 would be to simultaneously depress each of the attaching legs 3026*a*-3026*d* towards the interior of the base inner cup 300 to the point where each foot 3028*a*-3028*d* no longer occupies its respective opening 3030*a*-3030*d*. This may be done by inserting legs of an appropriate tool (not shown) through release openings 3035*a, b, c, d* in the top of lid 21- to simultaneously and radially inwardly depress the attaching legs 3026*a-d*.

Figure 32:
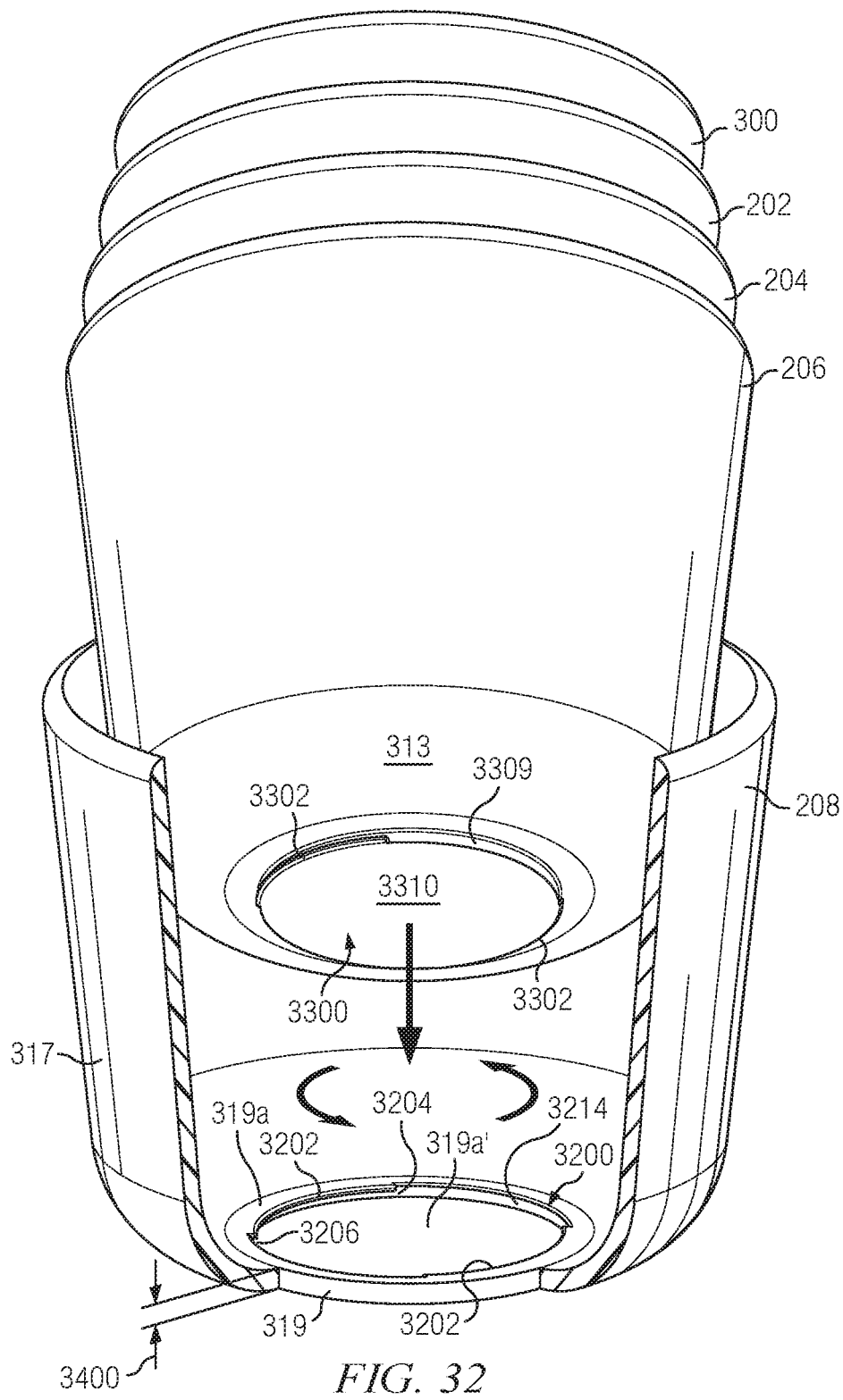
FIG. 32 is a partially exploded perspective view with the outermost shell being partially cut away showing another embodiment of a bottom-based attachment means in the form of male and female twist-locking components for attaching the shells and base inner cup.
Figure 32A:
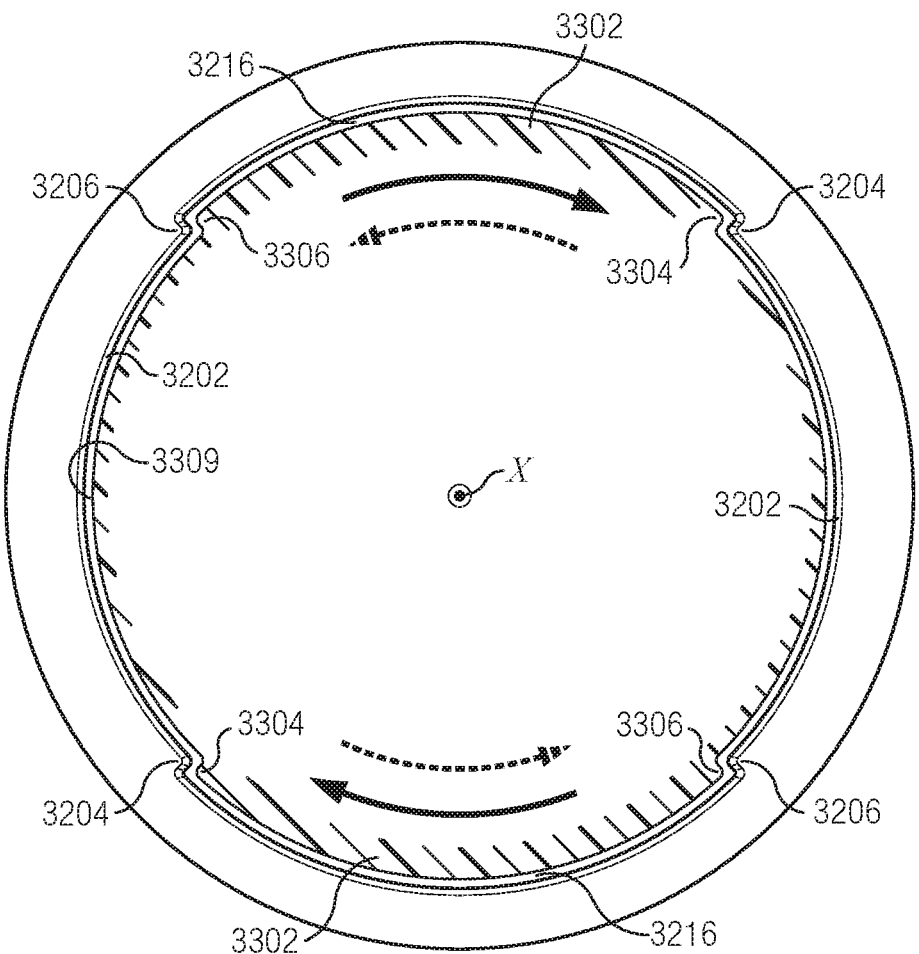
FIG. 32A is top view of the two shells shown in FIG. 32 in a pre-attached condition, illustrating that attachment of the shells requires a relative twisting motion.
Figure 32B:
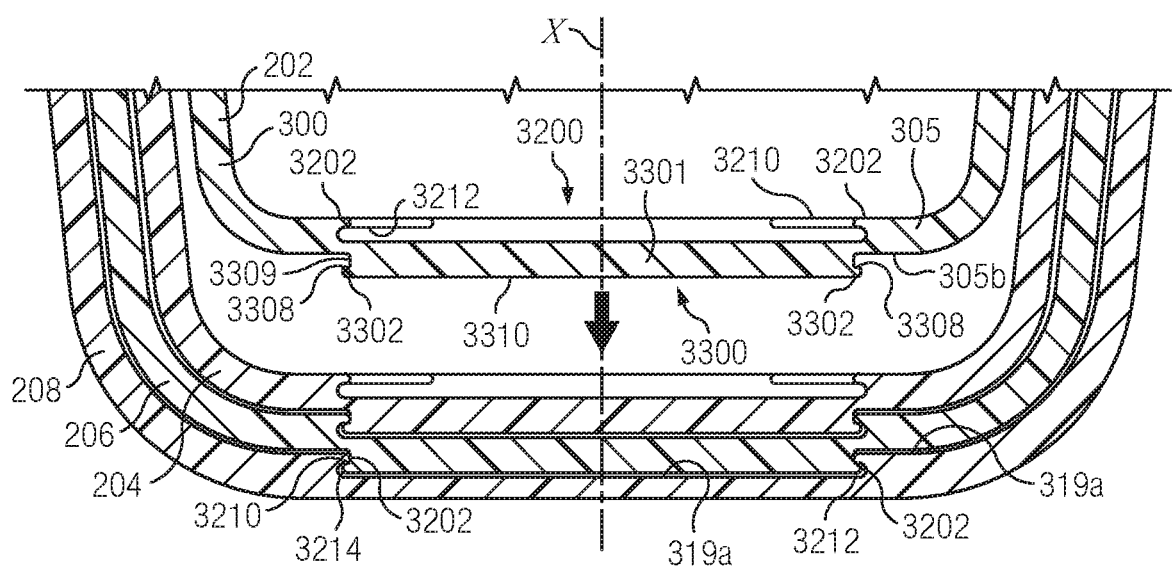
FIG. 32B is a partial and exploded axial sectional view of the three innermost shells and the base inner cup, showing more structural detail of the attachment means presented in FIG. 32.

Another means for attaching the shells and base inner cup through their respective bottom walls is shown in FIGS. 32-32B. This retention concept generally involves a male locking component 3300 and a complementary female receiving component 3200, the two components adapted such that an axial twisting of the shells 208-202 will affix them to each other or to the base inner cup 300. The attachment is initiated by pushing a shell or base inner cup in a downward direction as shown by the heavy arrow in FIGS. 32 and 32B, whereby a male projection is received within a female depression. An axial twisting of the shell or base inner cup in the direction represented by the two heavy arrows in FIG. 32 relative to the next outer shell will affix the projection within the depression. After the shells and shell and base inner cup are attached, a twisting motion in the opposite direction (dotted arrows; see FIG. 32A) will detach the shells from each other or from the base inner cup 300.

In FIGS. 32 and 32B, the interlocking concept will be described with respect to the outermost shell 208 and shell 206, where it is seen that the bottom wall 319 of shell 208 has a general inner surface 319*a* and that a substantial portion of the interior surface has been formed as a circular depression that is centrally located within the interior of the shell and not fully radially extending to curved part of the shell sidewall 317. The depression has a top sub-surface 319*a*' which is on a plane that is parallel to and below the general interior bottom wall surface 319*a*. The depression extends downwardly to about the midpoint of the thickness 3400 (FIG. 32) of the bottom wall 319 of shell 208, defining a depression sidewall 3214. The depression sidewall 3214 has been provided with an undercut near the bottom of the depression sidewall 3214. In the illustrated embodiment, the undercut into depression sidewall 3214 is a discontinuous one that does not extend around the entire circumference of sidewall 3214, such that two diametrically opposed, angularly spaced apart and identical shelves or flanges 3202 are formed, each being integral with and a part of the depression sidewall 3214. Each of the shelves or flanges 3202 projects radially inwardly towards axis X and overhangs the subsurface 319*a*'.

The overhanging flanges 3202, in cooperation with the depression sidewall 3214 and the subsurface 319*a*' which lies below each of the overhanging flanges 3202, make up the female receiving components of the retention means. As alternatives to providing two overhanging flanges, more than two flanges could be provided or a single such flange could be provided. In any case, the female flanges must be angularly spaced apart from each other (or the discontinuity in a single flange must be large enough) by spaced 3216 sufficiently to admit the male flange or flanges, as described below.

As best seen in FIG. 32A, each overhanging flange 3202 extends between a first, inlet end 3204 and a second, stop end 3206 angularly spaced from the first end 3204. As best shown in FIGS. 32 and 32B, each overhanging flange 3202 includes a top surface 3210, coplanar with the top surface 319*a* of shell bottom wall 319, and a bottom surface 3212. The bottom surface 3212 of each shelf has a taper which initiates at the inlet end 3204 and which gradually tapers in a downward manner towards the depression surface 319*a*', finishing at the stop end 3206. At the stop end 3206, the bottom surface 3212 is disposed above subsurface 319*a*' by an extent that is either equal to or slightly less than the height of the engaging flange of the male locking component 3300, which will be further explained below but can been seen in FIG. 32B.

Since shell 208 is the outermost shell when shells 208-202 and base inner cup 300 are attached together, it is only provided with the female receiving component 3200. All of the other shells 206-202 will have both a male and a female receiving component, while the base inner cup 300 will only be provided with a male locking component 3300. FIG. 32B also illustrates how the bottoms of shells 206-202 have been identically structured to have both a female receiving component 3200 and a male locking component 3300. As illustrated, all female receiving components 3200 provided in shells 206-202 are located and constructed on the inside surface of the respective bottom wall of each shell exactly as provided and explained above with respect to shell 208, therefore, they will not be explained in greater detail. The structural features of the female receiving component and the male locking component are best understood by viewing shell 202, shown in FIG. 32B in a pre-attached position.

The features of the male locking component 3300 are best explained with respect to viewing the innermost shell 202 in FIG. 32B. Shell 202 has a bottom wall 305 that has a general exterior bottom surface 305*b*. A central projection 3301 extends downwardly from bottom surface 305*b*. The downward projection 3301 is delimited by a projection sidewall 3309 and a projection bottom surface 3310. The sidewall 3309 has been provided with an undercut near the bottom surface 3310 that forms a male flange segment 3302 that is on a plane which is parallel to and spaced below the exterior surface 305*b* of the bottom wall 305. Male flange segments 3302 extend radially outwardly from the male projection sidewall 3309. If the female receiving component 3200 is formed to include a single overhanging flange, the angular gap between its ends should be large enough to accept a single male flange component. Alternatively and as illustrated in FIGS. 32 and 32A, if two female overhanging flanges 3202 are provided, then the angular spacing between an inlet end 3204 of one flange 3202 and a stop end 3206 of the other flange 3202 should be large enough to accept a respective one of two male flange components 3302 prior to these being twisted underneath respective female flanges 3202. Flange components 3302 angularly extend between first ends 3304 and second ends 3306.

As FIG. 32A illustrates, when a pair of shells or a shell and the inner cup 300 are to be attached together, the male projection 3301 of the inner shell of cup is seated in the female depression 3200 of the shell exterior to it, such that the male flange segments 3302 are positioned in respective openings 3216 of female depression 3200 so as to be adjacent to the overhanging female flanges 3202. In this position, the first ends 3304 of the male flange segments 3302 are disposed next to the inlet ends 3204 of the overhanging female flange segments 3202. Then, when a shell (or cup) is twisted relative to the shell next external to it in the direction of the solid, heavy arrows, the first ends 3304 of each of the male flange segments 3302 begin to slide underneath respective ones of the overhanging female flange segments 3202.

As twisting progresses, the top surface 3308 of each male flange segment 3302 will encounter a gradually tapering bottom surface 3212 of a respective female flange segment 3202, while the bottom surface 3310 of the male flange segment will slide along subsurface 319$a'$. As twisting further progresses, the top and bottom surfaces 3308, 3310 of each male flange segment 3302 will more aggressively encounter the underside 3212 of each overhanging flange 3202 such that the top and bottom surfaces of each male flange segment 3302 will eventually be frictionally captured between female flange bottom surface 3212, subsurface 319$a'$ and the female depression sidewall 3214 by the time each male flange segment reaches a respective stop end 3206 of each overhanging female flange 3202. When each male flange segment 3302 reaches a respective stop end 3206, the male downward projection 3301 will have has been fully attached to the female depression 3200 such that the shells are interlocked and attached to each other or to the inner cup, as the case may be.

To detach the shells from each other or from the inner cup, the outermost shell is twisted in a reverse direction, represented by the dashed arrows shown in FIG. 32A, until the male locking component is no longer captured by the female receiving component. Since the base inner cup 300 does not attach to any other component other than shell 202, it will only be provided with male locking components for engagement with the female receiving components.

The attachment means illustrated in FIGS. 32-32B also permit, e.g., a shell 208 to be directly attached to base cup 300, without intervening shells 202-206. This might be useful where more spring-loaded compression is wanted between the outer surface of a shell sidewall and the vehicle cup holder.

Figure 24:
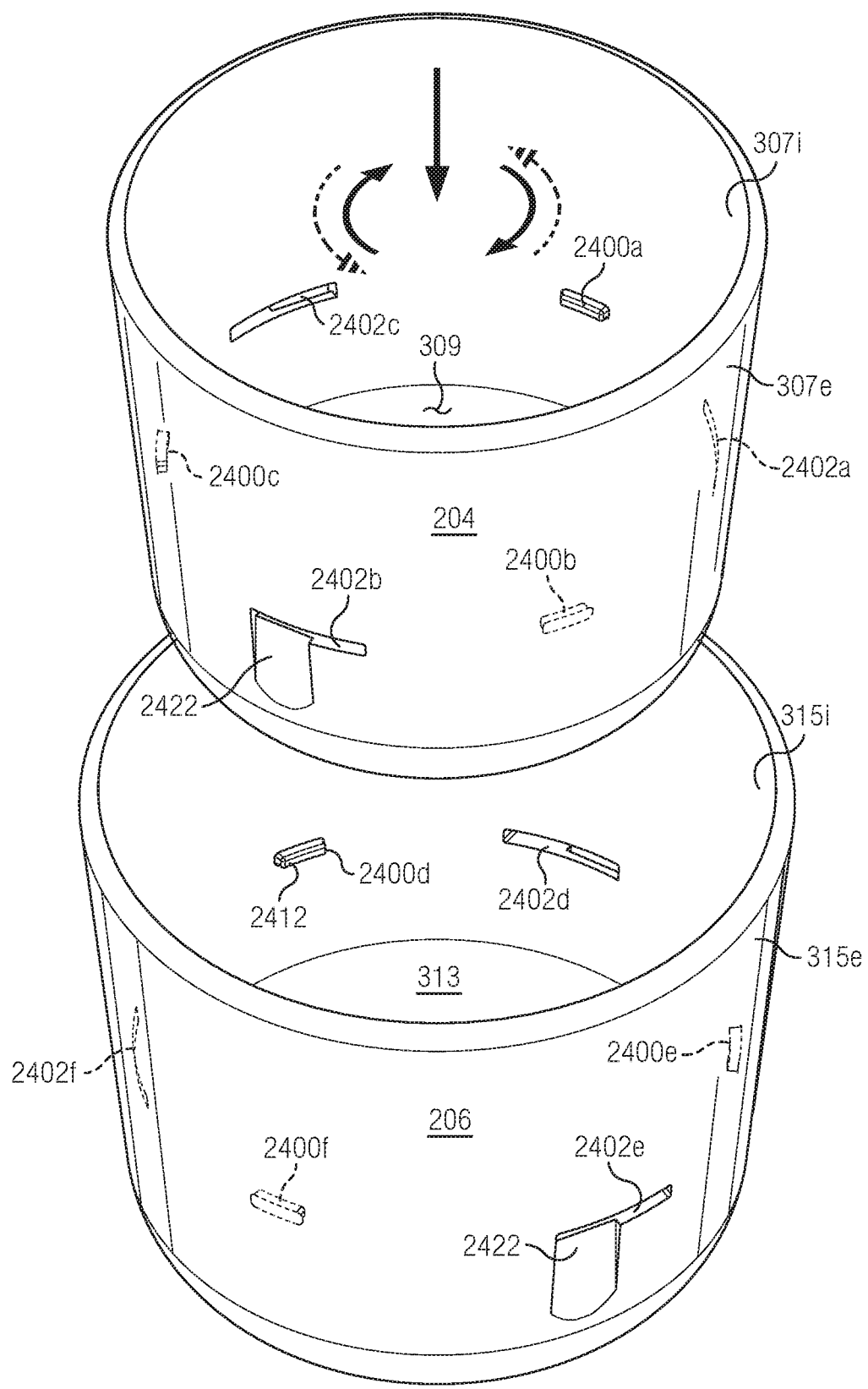
FIG. 24 is an exploded perspective view of another embodiment of an attachment means in the form of projections radially inwardly extending from a first shell sidewall inner surface that frictionally fasten to projection-receiving openings in the sidewall outer surface of the shell or base disposed inwardly from the first shell.
Figure 24A:
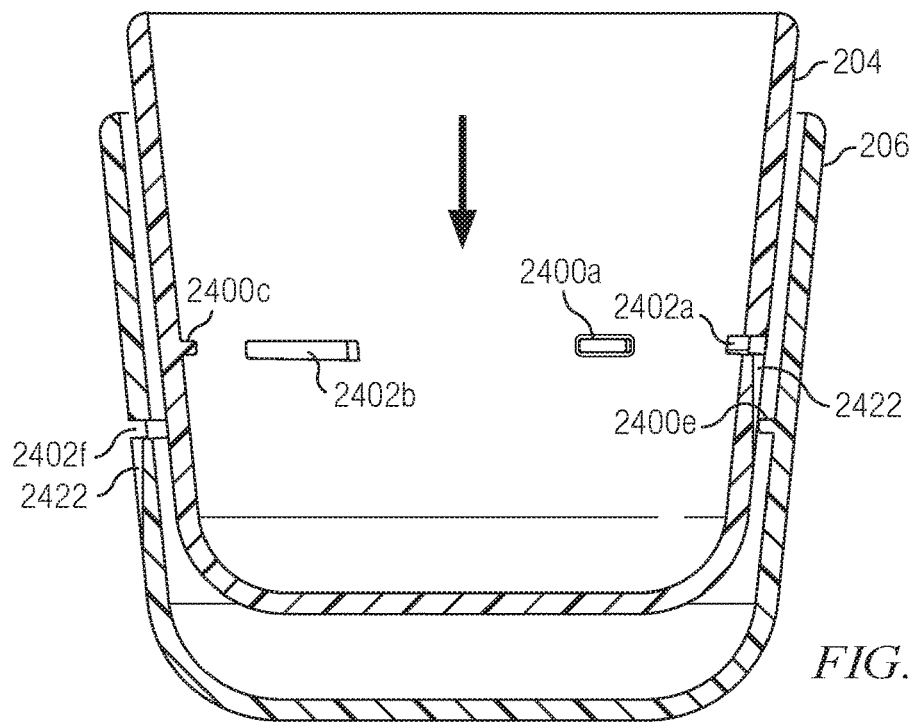
FIG. 24A is an axial sectional view of two shells in a pre-attachment position using the attachment means presented in FIG. 24.
Figure 24B:
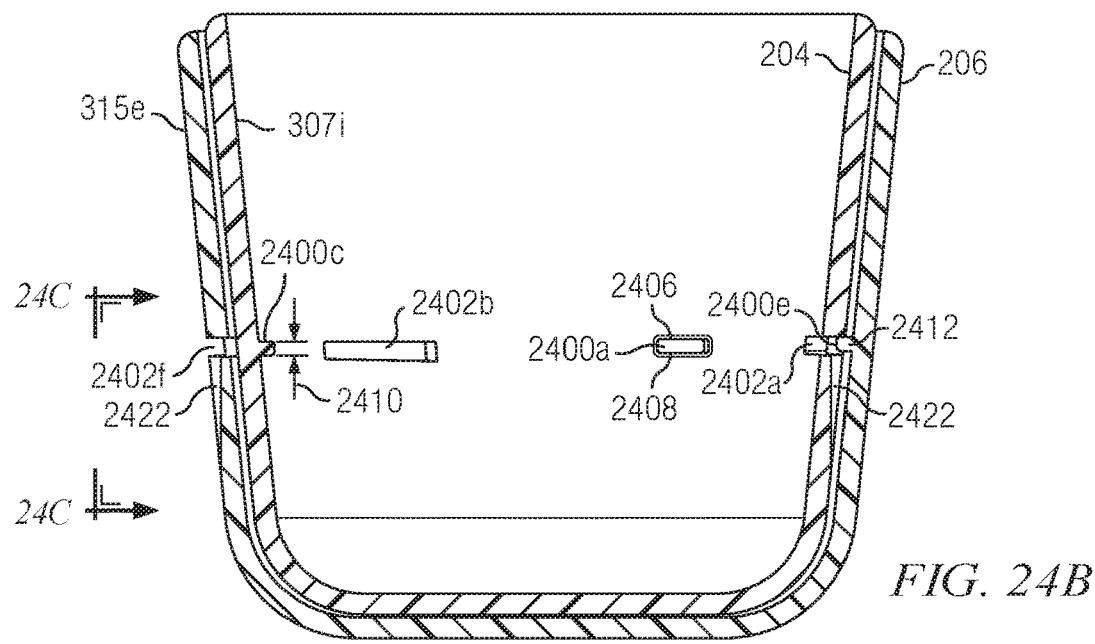
FIG. 24B is an axial sectional view of the two shells shown in FIG. 24A in an attached position using the sidewall-based attachment means presented in FIG. 24.
Figure 24C:
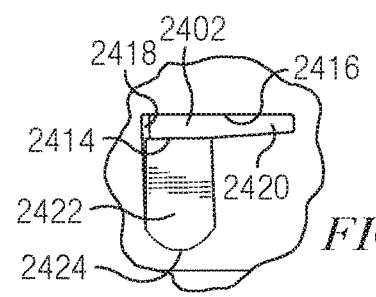
FIG. 24C is a detail view of the projection-receiving opening in the sidewall of the outer shell shown in FIG. 24B, taken along line 24C-24C thereof.

Another embodiment of an attachment means which is a hybrid of the internal and external attachment means is presented in FIGS. 24-24C, being comprised of two sets of interacting components: a set of flanges or elongate inner projections that extend radially inwardly from the inner surface of the shell sidewall, and a like set of flange- or projection-receiving openings in the sidewall of the shell interior to it. With this embodiment, and as between two adjacent shells, at least one flange and flange-receiving opening, and preferably two or more, should be provided in order to create an effective fastening means. Although only shells 204 and 206 are illustrated for clarity, the structural features of this embodiment are to be applied to shells 208, 202 (not shown) and to the base inner cup 300 (not shown).

The embodiment shown in FIG. 24 has three angularly spaced apart projections 2400$a$, 2400$b$ and 2400$c$ radially inwardly extending into the interior of shell 204 from shell sidewall surface 307$i$. Likewise, three angularly spaced apart projections 2400$d$, 2400$e$ and 2400$f$ radially inwardly extend from shell inner surface 315$i$ of shell 206. Each of the projections 2400$a$-2400$f$ has a uniform thickness 2410 in the axial direction across their respective arcs. It is preferred that the projections 2400$a$-2400$c$ and projections 2400$d$-2400$f$ be equally angularly spaced around their respective shell sidewall interior surfaces, as shown.

In the illustrated embodiment, each projection 2400$a$-2400$f$ radially inwardly extends by a similar amount from a respective shell sidewall interior surface 307$i$ or 315$i$. The projection angular locations on one shell should be offset from the angular locations of the projections on the next adjacent shell(s). Since this embodiment provides three projections on each shell, a projection on one shell could be offset by 60 degrees from the projections on adjacent shells. The base inner cup 300 (not shown) is not provided with projections since it does not attach to another shell interior to it.

Each of the projections 2400$a$-$f$ have a generally rectangular shape in axial section. Each projection 2400$a$-$f$ has a top surface 2406 that conforms to a plane orthogonal to axis X, and a bottom surface 2408 that conforms to another plane orthogonal to axis X. The radial depth of each projection is selected such that an inner radial end 2412 of the projection will be disposed only a small distance away from an inner surface 307$i$ or 315$i$ of a respective sidewall 307, 315.

In addition to the provision of projections 2400$a$-$f$, shells 206 and 204 have identical projection receiving openings 2402$a$-$f$. In the illustrated embodiment, openings 2402$a$-$c$ reside in a single plane orthogonal to axis X, while openings 2402$d$-$f$ reside in a single plane orthogonal to axis X. These two planes do not have to be coplanar when shells 204, 206 are assembled together, but in the illustrated embodiment, they are. What is minimally necessary is that when assembled, a projection on one shell should reside in the same plane orthogonal to axis X as the plane containing an opening on the shell interior to it. Hence, when shells 204 and 206 are assembled, and as shown in FIG. 24B, projection 2400$e$ is coplanar with opening 2402. In like fashion, and when the shells are assembled, projection 2400$d$ will be coplanar with opening 2402$c$ and projection 2400$f$ will be coplanar with opening 2402$b$. Projections 2400$a$-$c$ connect to openings in shell 202 (not shown), while openings 2402$d$-$f$ connect to projections in shell 208 (not shown).

FIG. 24C is a detail of a representative opening 2402 as seen from a shell exterior. In the illustrated embodiment, openings 2402$a$-$f$ are identical to the structure described here. The opening 2402 has a bottom wall 2414, a top wall 2416, and front and rear end walls 2418, 2420. Relative to the axis, the front and rear end walls are angularly separated by a distance that is greater than the arc subtended by each of the projections 2400$a$-$f$. In the illustrated embodiment, the top wall 2416 has a downward taper from front wall 2418 to end wall 2420, while bottom wall 2414 resides in a plane orthogonal to the shell axis.

Disposed immediately below and adjacent the bottom wall 2414 of opening 2402 is a vertically oriented throat 2422. The throat 2422 is formed in the outer surface of the sidewall of the shell, such as in outer surfaces 307$e$ and 315$e$. The throat 2422 can be fashioned as a cylindrical facet disposed in parallel to the axis X and at a constant radial distance to it. Since the shell sidewall preferably is formed as a frustoconical surface, the surface of the throat 2422 gradually departs from the shell outer surface as the throat 2422 extends upwardly from its lower end 2424 to opening bottom wall 2414. The throat 2422 is necessary for providing each projection 2400*a-f* the clearance from an outer sidewall surface of the shell they will engage within so that when a shell is pushed downward in the direction of the heavy arrow for attachment purposes (FIG. 24A), the projection will actually reach the opening 2402. Otherwise, the taper of the shell sidewall outer surface could lead to the projection becoming frictionally lodged against the shell sidewall prior to reaching and entering the opening 2402.

Where the throat 2422 meets the bottom wall 2414, top wall 2416 is at its vertically farthest distance away from bottom wall 2414 and this distance is greater than the height or thickness 2410 of projections 2400*a-f*. At end wall 2420, the top wall 2416 is at its closest distance to bottom wall 2414 and this distance is less than the thickness 2410 of the projection 2400*a-f*. The vertical gap between wall 2416 and wall 2414 gradually decreases as one proceeds from front wall 2418 to end wall 2420, so that when a projection 2400*a-f* is inserted into opening 2402, and shell 206 is twisted relative to shell 204 in the direction of the curved heavy arrows (FIG. 24), the projection 2400*a-f* will move towards end wall 2420, and the projection top and bottom surfaces 2406 and 2408 will encounter increased friction as they slide against tapering top wall 2416 and bottom wall 2414, such that when the angular edge of the projection abuts end wall 2420, the projection will be frictionally wedged into a locked position within opening 2402. To unlock the projections from the openings, the outer shell is rotated around axis X in the opposite direction.

By viewing FIGS. 24A and 24B, it should be understood that when a shell is to be attached to the base inner cup or to another shell interior to it, the smaller shell or cup is pushed downward in the direction of the heavy arrow in order for the projections 2400*a-f* on the interior wall surfaces of the larger shell to first encounter the external throats 2422 of the smaller shell, thereby permitting the projection to eventually be seated within a respective opening 2402.

In the axial sectional view of FIG. 24B, shell 206 is shown in an attached position relative to shell 204 where projection 2400*e* is seen being captured within projection receiving opening 2402*a*, but projection inner end 2412 does not extend beyond the inner surface 307*i* of shell 204. It is preferred that the radial extent of each projection 2400*a-f* be limited, taking into consideration the sidewall taper of the shells and their location from the bottom wall so that when two shells are attached, the radial inner end 2412 of each projection 2400*a-f* will either be flush with or radially outwardly recessed from a respective inside shell surface, in this case 307*i* or 315*i*. There are two reasons for this. First, if the projections were radially longer and projected beyond the inner sidewall surface of the next interior shell, and depending upon their vertical locations on the shell, other, more interior shells may not be able to attach even with the help of throat facets. Second, a radially longer projection is more susceptible to breaking.

In this illustrated embodiment, the projections 2400*a-f* are formed roughly as rectangles, being small angular segments of an annulus and having a constant thickness in the axial direction. The projections could take other shapes instead, such as circular or elliptical nubs, and the openings could be modified concomitantly so as to frictionally capture them.

FIGS. 28 and 28A-28C show another type of projection or flange retention means, this one being structured to attach the shells and base inner cup through the bottom walls. This projection retention means is again comprised of two interacting components, a projection 2800 and a projection receiving opening 2802. All of the respective projections 2800 and projection receiving openings 2802 that will be described can be identical and it should be understood that because of the structure, the projections disposed on a particular shell are only intended to interlock within the projection receiving openings of the shell or cup that is interior to it such that when a projection is secured within a respective opening, no part of the projection will extend above the inside surface of the bottom wall of the shell or base inner cup that is interior to it.

Figure 28:
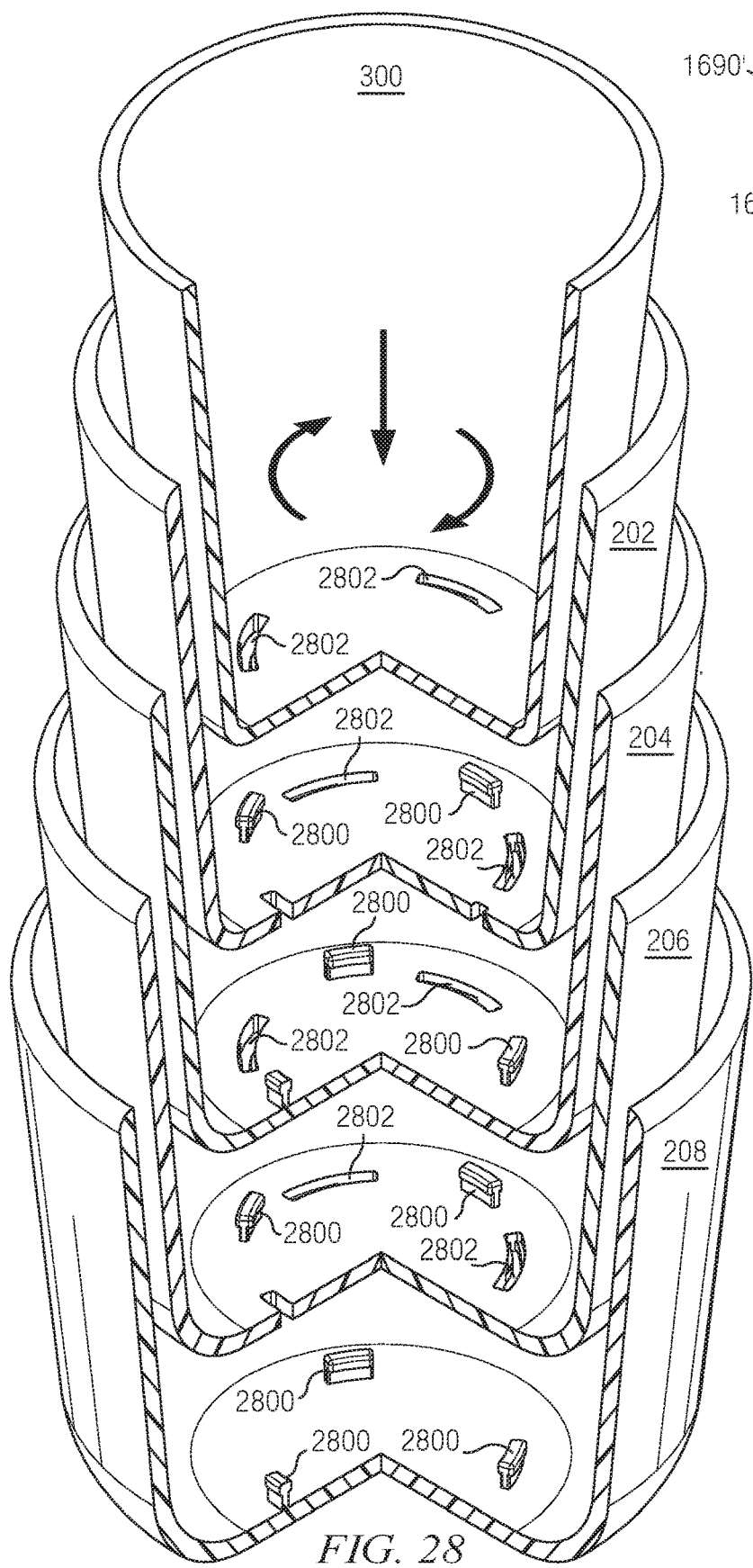
FIG. 28 is an exploded perspective view partially cut away showing another embodiment of an attachment means in the form of a bottom-based projections that frictionally fasten within bottom-based projection-receiving openings for attaching the shells to each other and to the base inner cup at their respective bottom walls.

FIG. 28 shows the order of attachment of the base inner cup 300 and shells 202-208, where the base inner cup 300 is downwardly pushed towards shell 202 in the direction of the heavy arrow and then rotated in the direction indicated by the curved, heavy arrows. Attachment of the other shells 204-208 would proceed in the same fashion until shell 208 is attached to shell 206. FIG. 28 also illustrates that shells 206-202 are the only ones provided with both projections 2800 and projection-receiving openings 2802, while outermost shell 208 is only provided with projections 2800 and base inner cup 300 is only provided with projection-receiving openings 2802. All shells should be provided with at least two upstanding projections and preferably with three or four such projections in order to create a secure attachment. Of course, the number of projection receiving openings provided on a shell or the base inner cup should match the number of projections and this embodiment will be shown and described using three projections and three projection receiving openings.

Figure 28A:
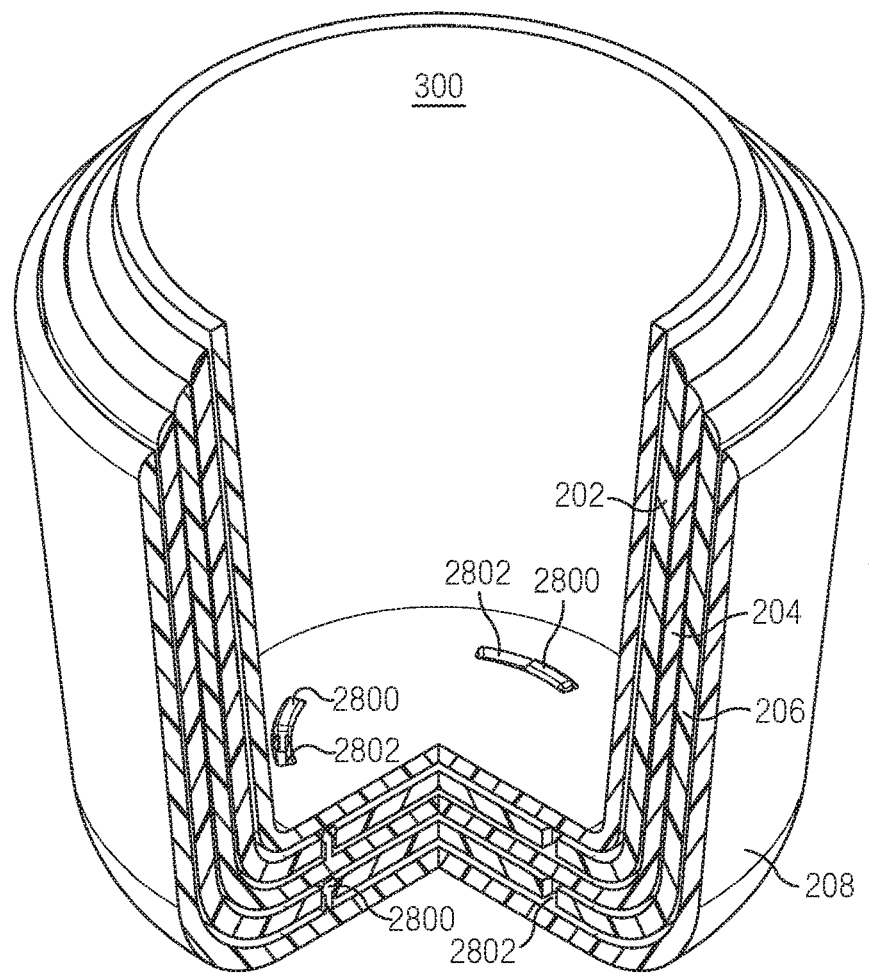
FIG. 28A is a perspective view partially cut away showing the shells and base inner cup in an attached state using the attachment means illustrated in FIG. 28.
Figure 28C:
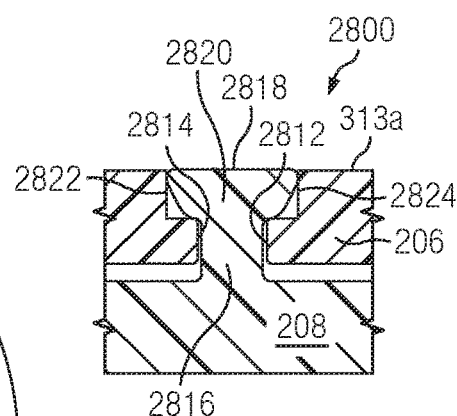
FIG. 28C is a sectional detail of a projection and projection-receiving opening shown in FIGS. 28, 28A and 28B.
Figure 28B:
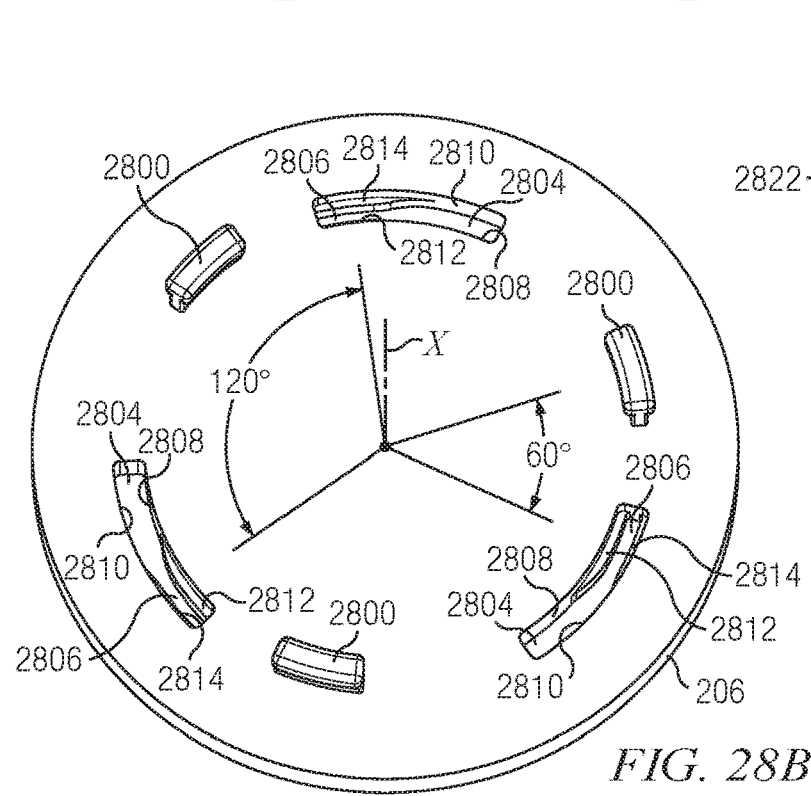
FIG. 28B is a top perspective view of the bottom wall of the base inner cup illustrating the arrangement of projections and the tapering walls of the projection-receiving openings.

FIG. 28B depicts the bottom wall 313 of shell 206, which is provided with three identical and equally spaced projections 2800 and three identical and equally spaced projection receiving openings 2802. The sidewall 315 of shell 206 has been omitted for clarity. All of the projections will upwardly extend into the interior of the shell. The three projections 2800 will fasten to projection-receiving openings 2802 formed in the bottom wall of shell 204 and the projection-receiving openings 2802 will accept the projections 2800 of shell 208. The projection openings 2802 on shell 206 are spaced 120 degrees apart from each other around axis X and they will be in vertical registry with the projections 2800 from shell 208, which necessarily are also spaced 120 degrees apart from each other (see FIG. 28). Since the shell 206 also is provided with three projections 2800 for mating within the openings 2802 on shell 204, those projections should be equally spaced from the openings 2802 which will receive the projections from shell 208, which means that each of the projections 2800 on shell 206 will be spaced 60 degrees away from any of the three projection receiving openings 2802 that receive the projections from shell 208. This same spacing pattern will be continued for the projection and projection openings in shells 204 and 202 so that the attachment from shell-to-shell is balanced.

As FIGS. 28B and 28C best show, each receiving opening 2802 is identically comprised of two sections, a receiving section 2804 and an adjacent locking section 2806. The receiving section has uniformly spaced inner and outer walls 2808 and 2810, while the locking section 2806 has inner and outer walls 2812 and 2814 that taper towards each other, as best seen in FIG. 28B. When the projections 2800 from a shell are to be attached to a shell or to the base inner cup that is interior to that shell, the upstanding projections 2800 on that shell initially enter the receiving sections 2804 of the receiving openings 2802. Then, as an inner one of the concentrically positioned shells is twisted in the direction of the curved heavy arrows relative to an outer shell (FIG. 28), the projections 2800 move from the receiving sections 2804 into the locking sections 2806, such that the projections 2800 are progressively squeezed between the tapering walls 2812 and 2814 of the locking sections. When fully twisted home, the projections are frictionally locked into place within the openings and the shells are attached to each other in that state. A similar attachment process would be used to attach the projections of any of the shells within the registered projection receiving openings of a shell or the base inner cup 300 which is interior to it. The vertical extent or height of each projection is such that the projections do not project beyond the interior bottom surface of the shell or base inner cup immediately above it, so that all of the shells and the base inner cup can concentrically stack together in "Russian Doll" fashion, as shown in FIG. 28A.

Referring to FIG. 28C, a representative projection 2800 from shell 208 is shown secured within a projection receiving opening 2802 on shell 206. The projection 2800 has a somewhat T-shaped configuration, comprised of a vertical post 2816 and a top bar 2818. As mentioned above, since all projections and projection receiving openings are identical, all will have the same T-shaped structure and all will be securable within a projection receiving opening 2802 the same way. When the projections are aligned with the projection receiving openings, the spaced walls 2808, 2810 in the receiving sections 2804 of each of the projection receiving openings are wide enough for the posts 2816 and the bars 2818 to freely enter. As a shell is further pushed downwardly and then twisted, the posts 2816 become frictionally entrapped between the tapering walls 2812, 2814 in the locking sections 2806. FIG. 28C shows that the post 2816 is slightly spaced from walls 2812 and 2814 of the locking section 2806. This is accurate as a cross-section taken through receiving opening 2804 but not as a cross-section taken through a locking section 2806. Inside of locking section 2806, the walls of post 2816 will actually be in tight, frictional contact with tapering walls 2812 and 2814.

A top portion 2820 of the locking section 2806 is formed as a widened recess so as to accommodate the radially inner and outer vertical walls 2822 and 2824 of the bar 2818. The top portion 2820 may be dimensioned so as to frictionally engage with the bar vertical walls 2822 and 2824, enhancing frictional resistance. The shape of the projections employed in this embodiment are not limited to those presented in the figures, but can have any desired shape as long as the projection receiving holes are of a complimentary shape and will have a first area for initially receiving the projection and a second area that is reduced so that it will frictionally capture the selected profile of the projection.

Since the outer surfaces of the illustrated inner cup 300 and shells 202-208 have a similar profile (in the illustrated embodiment, they are all linear in axial section), and are all at least generally downwardly and radially inwardly tapered, each of the shells 202-208 will fit to any of a respective predetermined range of cup holder sizes. For example, as seen in FIG. 13, the radius of outer surface 303e of shell 202 linearly decreases as a function of its separation from top edge 324. In the scenario shown in FIG. 13, only the first shell 202 has been assembled to the base 200, and this shell 202 has been found to best fit to the topmost radius of cup holder 102. A radius 1300 from the point on surface 303e abutting the corner or inner wall 1302 of the cup holder 102, to the axis X, is larger than a radius 1304 taken farther down on surface 303e. Therefore, as using this shell 202, the assembly will fit cup holders having a side wall radius anywhere inside of this range. Similarly, and as seen in FIG. 11, second shell outer surface 307e has a radius 1100 at a first depth from its upper edge 324, and a second, smaller radius 1102 at a second depth from its upper edge that is larger than the first depth. This means that an assembly in which second shell 204 is the outermost shell will fit to any cup holder having a side wall radius within a predetermined range of such radii including radii 1100 and 1102. In assemblies in which all four shells are employed, the outer surface 317e of fourth shell 208 will be the surface that abuts the inner cylindrical wall of the cup holder. This surface 317e likewise offers a range of radii, including radius 1104 at one locus on surface 318, and a smaller radius 1106 at a locus on surface 317e that is farther away from top edge 324 of the shell 208. The outer surface 315e of third shell 206 offers a similar range of radii, one of which may optimally fit a particular cup holder.

The ranges in radii from the vertical axis to points on outer surfaces 302e, 303e, 307e, 315e and 317e have a certain overlap from one outer surface to the next. In use, the user preferably selects the base 200, or one of the shells 202-208, which has a fitting radius highest up on the shell/base outer surface, for optimum stability.

Referring particularly to FIG. 13, a vertical height $h_s$ of the base and shell outer surfaces 302e, 303e, 307e, 315e and 317e (only shell outer surface 303e is shown in this figure), and minimum and maximum diameters $d_{s2}$ and $d_{s1}$, are chosen such that a bottom wall 301 of the base 200, and a bottom 1310 of any of the shells 202-208, won't touch a bottom 1312 of the vehicle cup holder 102. (A height $h_s$, and a minimum and maximum diameter $d_{s1}$ and $d_{s2}$, of any one of the base 200 or the shells 202-208 will differ from the heights or diameters of any of the remaining shells only by one or more thicknesses of the base cup or shell walls.) This is to insure that the cell phone mount 108 and the cell phone C will be entirely supported by the cup holder side wall 1302. A frictional or interference engagement of the selected outer surface 302e, 303e, 307e, 315e or 317e with cup holder side wall 1302 will keep the cell phone mount 108 tightly in place and will mitigate against the cell phone mount 108 from coming loose and rattling around in or even bouncing out of the cup holder 102.

In the illustrated embodiments, the cell phone mount 108 is meant to fit a range of cup holders that covers almost all of the cup holders now found in vehicles. The cup holder diameter $d_c$ measured between opposed interior side walls 1302 of the cup holder 102 or between any inwardly extending cup-holding fingers or projections of such a cup holder, has been found to be in the range of about 2.8 to about 3.75 inches. The cup holder depth $h_c$, vertically measured from cup holder top surface 1308 to the bottom surface 1312 of the cup holder 102, has been found to be in the range of about 1.5 to about 3.5 inches. Given these dimensional ranges, the outer surface vertical height $h_s$ of the base and shell outer surfaces should be chosen from the range of about 2 to about 3½ inches. The smallest diameter $d_{s2}$ of outer surface 302e of base 200 should be chosen to be in the range of about 2.39 to about 2.5 inches. The largest diameter $d_{s1}$, taken at the topmost end of the outer shell surface 317e (in FIG. 13, a largest diameter $d_{s1}$ for outer surface 303e of first shell 202 is shown) of the fourth shell 208 should be about 3.93 inches. This permits the cell phone mount to fit any cup holder having an internal diameter of up to about 3.875 inches.

With reference to FIGS. 4-9 and 14, the cell phone mounting bracket 214 has a stationary jaw 400 and a movable jaw 402 that moves relative to jaw 400 in either of two directions parallel to horizontal axis 216. Jaw 400 has a U-shaped (in section) channel 404 that includes an upper segment 406 and a horizontally disposed lower segment 408. Segments 406 and 408 are joined by a curved transition 410. Segment 408 is horizontally disposed and terminates in an inner-facing end 412. Jaw 402 has a U-shaped (in section) channel 414 that includes an upper segment 416 and a lower segment 418. Segment 418 is horizontally disposed and terminates in an inner-facing end 420. Segment 418 is joined to segment 416 by a curved transition 422. The upper segment 416 of jaw 402 is parallel to and spaced from upper segment 406 of jaw 400. The spacing between upper segments 406 and 416 is user-selectable such that bracket 214 can accommodate cell phones of different widths.

Figure 4:
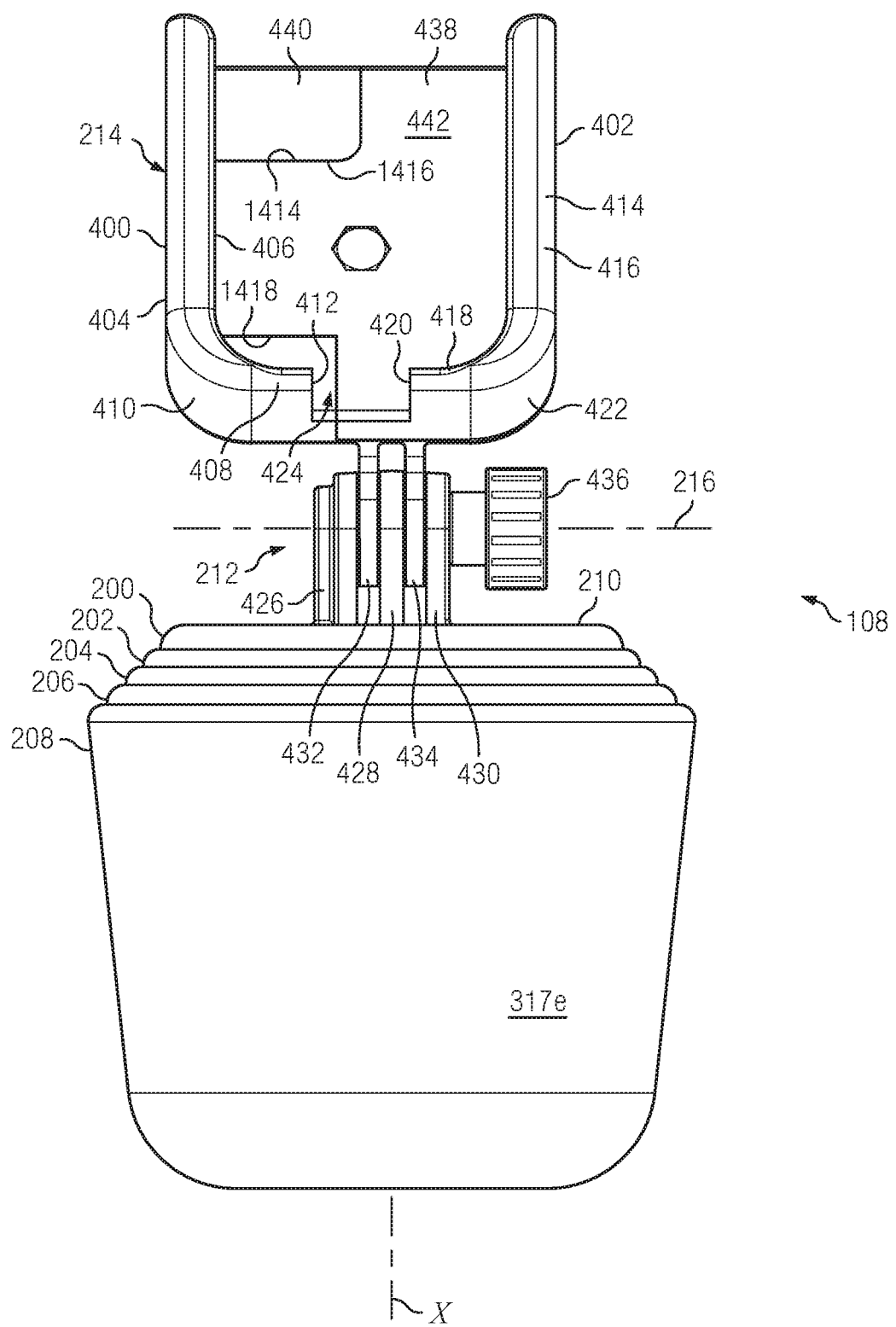
FIG. 4 is a front view of the mount as assembled using all of its shells, and showing cell phone holding jaws in a smallest-width position.
Figure 5:
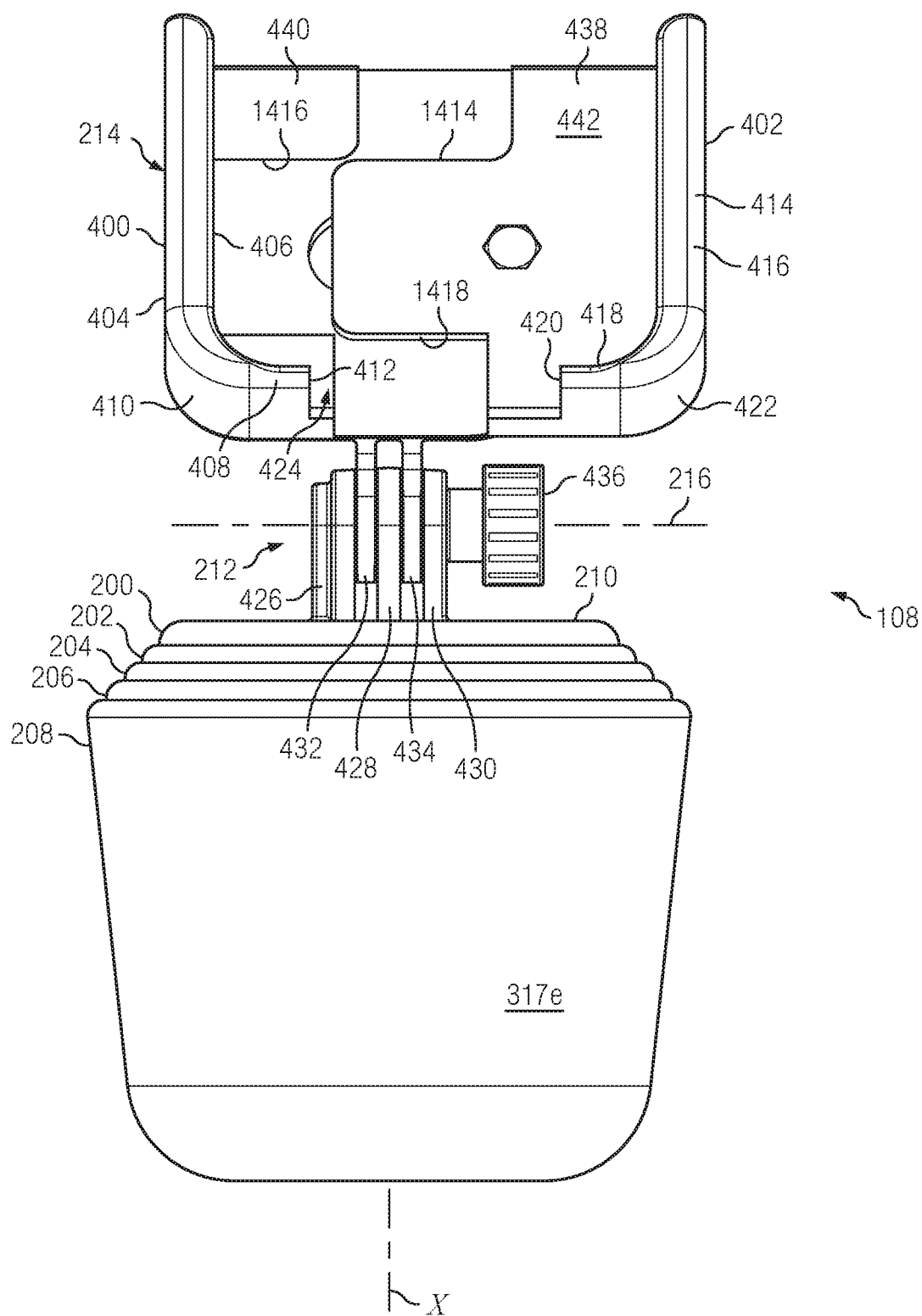
FIG. 5 is a view similar to that shown in FIG. 4, but with the cell phone holding jaws in a largest-width position.
Figure 6:
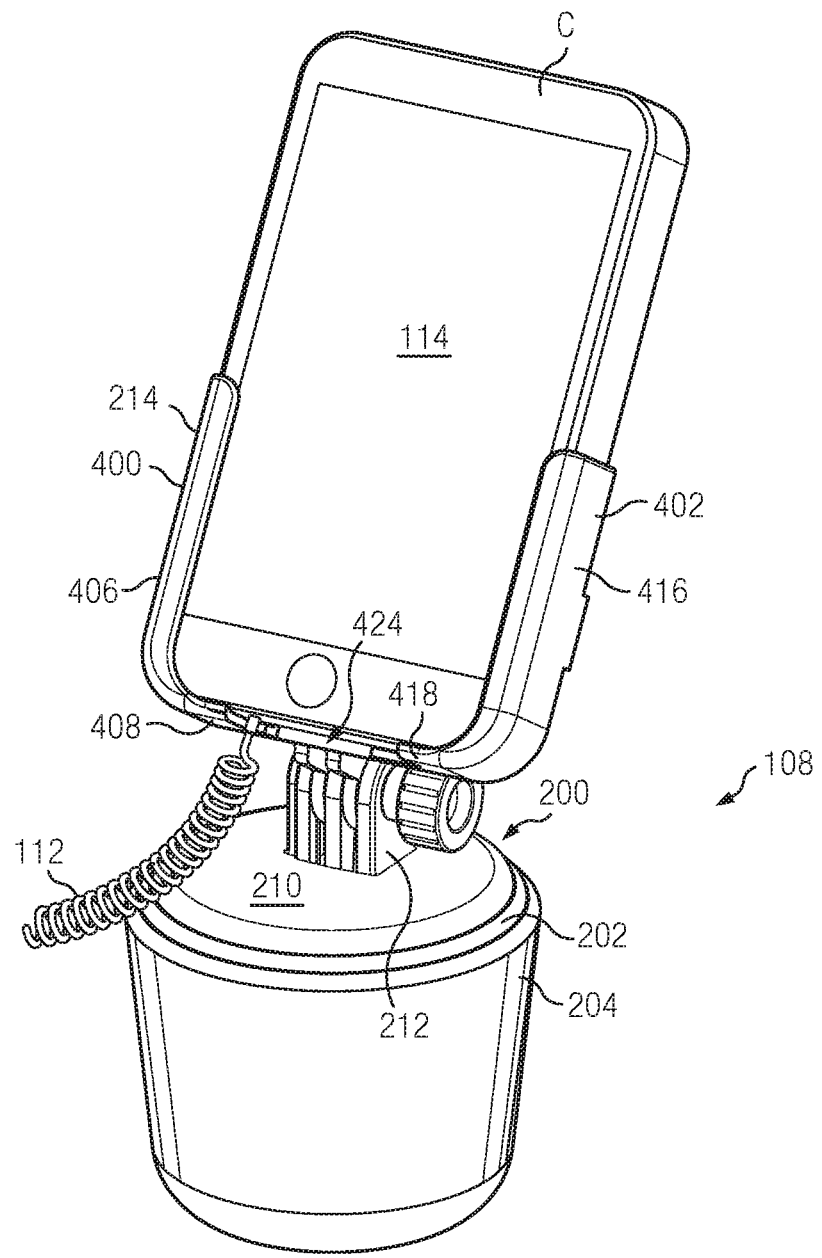
FIG. 6 is a perspective view showing the mount holding a cell phone with a power cord, and as assembled using only two shells.

In FIG. 4, and in FIGS. 7, 9, 10, 12 and 13, the movable jaw 402 is shown in a minimum-width position in which upper segment 416 is closest to upper segment 406, and in which lower segment inner end 420 is closest to lower segment inner end 412. This closed or minimum-width position accommodates cell phones of a small width. Even in this closed position, horizontal channel segment ends 412 and 420 leave a hole or opening 424 for the insertion of a cell phone power and communication cable 112 (see FIG. 6), such as a firewire cable, into a port in the bottom of cell phone C. FIG. 5 is a view similar to FIG. 4, but showing movable jaw 402 at a second or maximum-width position at which its channel upper segment 416 is spaced farthest away from channel upper segment 406. This second position accommodates cell phones of a relatively large width.

Figure 13A:
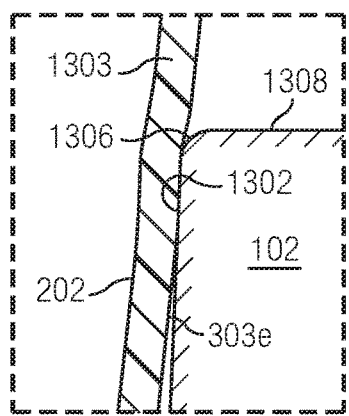
FIG. 13A is an enlarged detail of FIG. 13.
Figure 14:
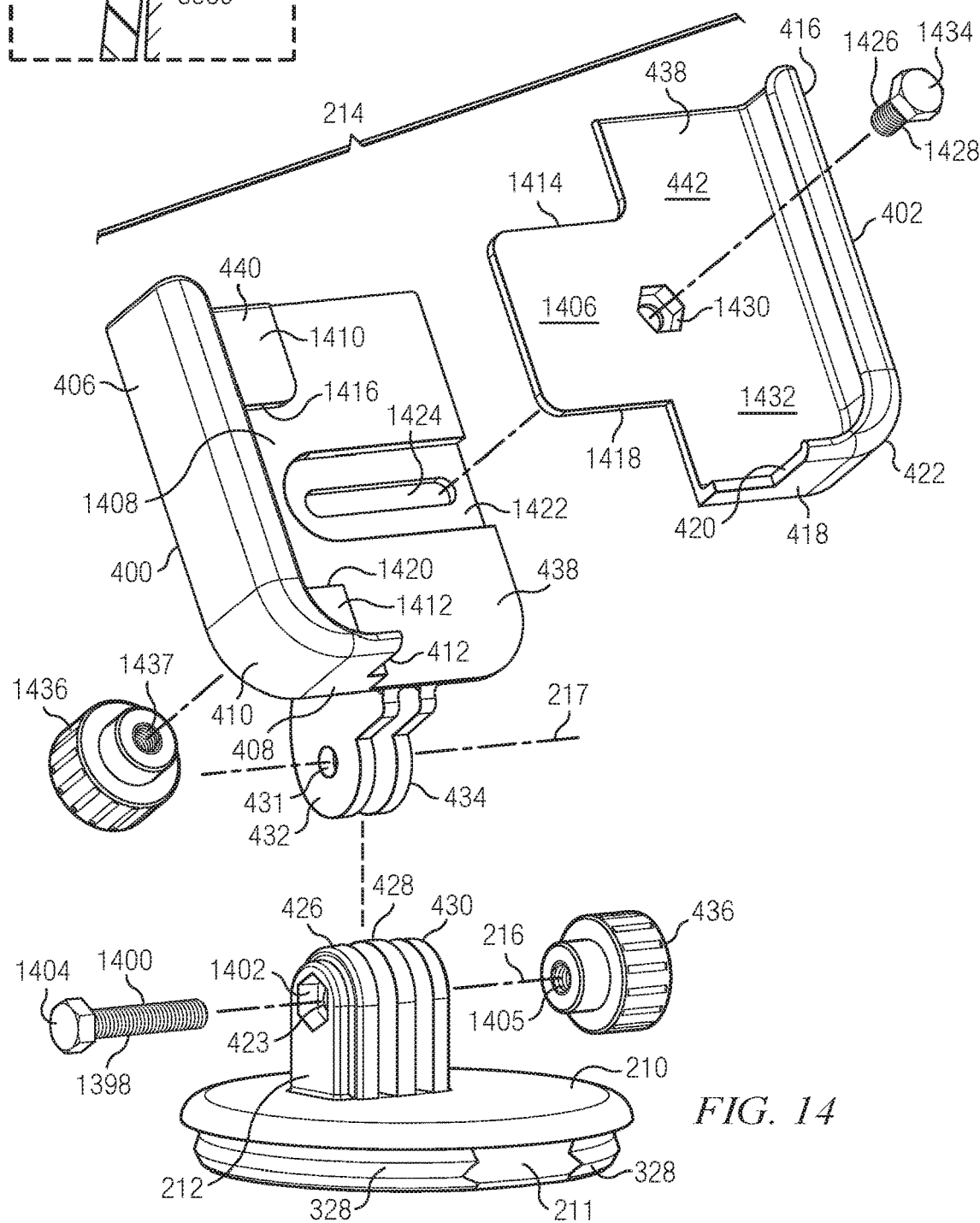
FIG. 14 is an exploded view of the cell phone mount's lid, pier and mounting bracket.
Figure 15:
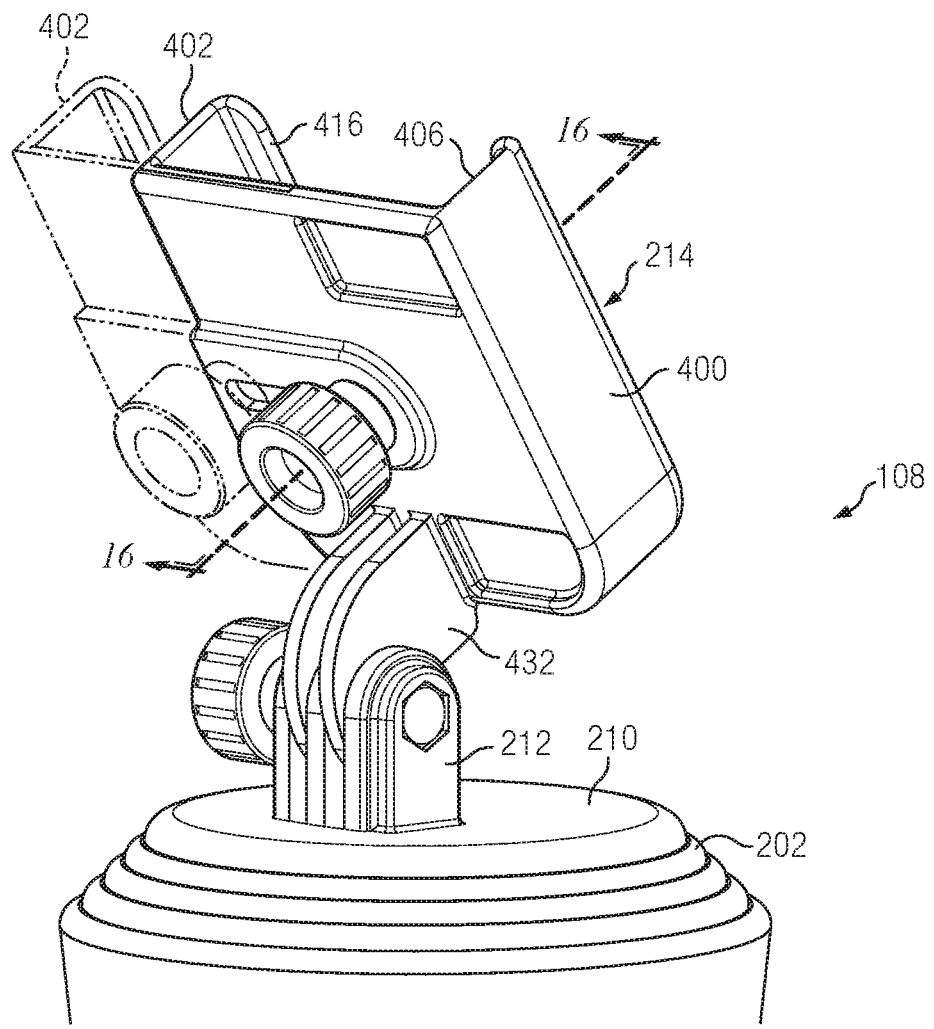
FIG. 15 is a rear perspective view of the cell phone mounting bracket, in which the movable jaw at a smallest-width position is shown in solid line and in which the movable jaw at a greatest-width position is shown in phantom.
Figure 16:
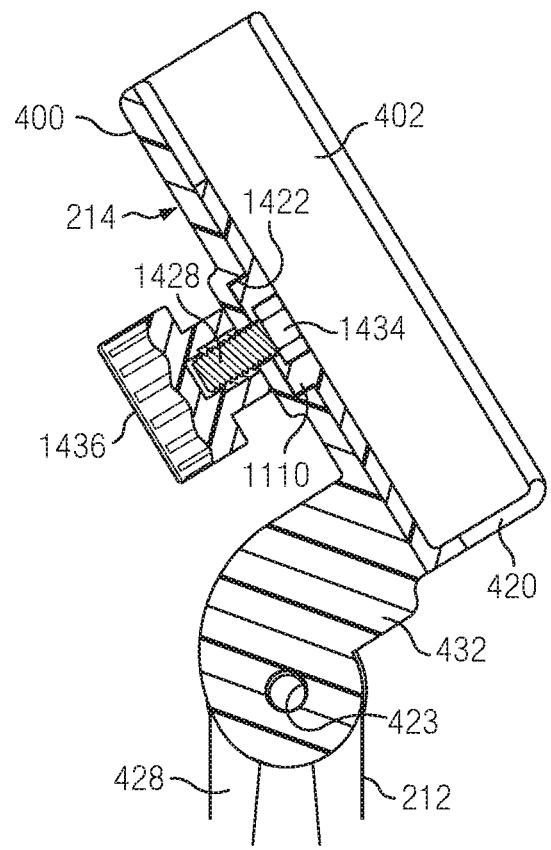
FIG. 16 is a cross-sectional view taken substantially along Line 16-16 of FIG. 15.

In the illustrated embodiment, and as best seen in FIGS. 4, 5, 6, 7, 12, 13, 14 and 15, the pier 212 is made up of three spaced-apart upstanding parallel plates: a left plate 426, a central plate 428 and a right plate 430. These plates are adapted to accept therebetween a downwardly depending left support plate 432 and a downwardly depending right support plate 434 of the cell phone mounting bracket 214. As best seen in FIG. 14, the cell phone support plates 432 and 434 are spaced apart and parallel to each other and are adapted to slidably and closely fit within the spaces between pier plates 426, 428 and 430, which likewise are spaced apart and parallel to each other. In this illustrated embodiment the pier plates 426, 428 and 430 stand up from and are integrally molded with the base top 210. In the illustrated embodiment the support plates 432 and 434 are integrally molded as a part of stationary jaw 400. All of plates 426, 432, 434 and 430 have a bore 431 therethrough that is aligned to axis 216 and which admits a shaft 1398 of a cap screw 1400.

The pier plate 426 has been thickened so as to define a hexagonally shaped opening 1402 that closely receives hex head 1404 of the screw 1400, thereby preventing the threaded shaft 1398 from turning. A fluted knob 436, which may be fabricated with nylon and which may have a threaded metal insert 1405, is threaded onto threaded shaft 1398. Tightening knob 436 will compress plates 432 and 434 against pier plates 426, 428 and 430, fixing in place a mounting bracket back plate 438 relative to axis 216 and controlling one axis of adjustment of the cell phone screen relative to the user. A pin may be substituted for helically threaded clamping screw 1400 and knob 436, and a different compression means may be used to compress together the plates 426, 432, 428, 434 and 430.

As best understood when viewing FIGS. 11 and 14, the rounded bottom ends of the support plates 432, 434 provide cell phone mounting bracket 214 with the ability to rotate around axis 216 in a range between two extreme positions: a far position defined by the contact of the tightening knob 436 against top lid 210, and a near position defined by the contact of the stationary and movable jaws 400, 402 with top lid 210.

As best seen in FIG. 11, the central upstanding pier plate 428 does not have a bore therethrough but rather an inverted v-shaped slot 1108. The ceiling of this slot is shaped and sized to receive the shaft 1398 of the cap screw 1400. Alternatively, the v-shaped slot 1108 may be replaced with a bore that accepts screw shaft 1398.

As seen in FIG. 4, the cell phone bracket back plate 438 is composed of a stationary jaw back plate portion 440 and a movable jaw back plate portion 442. As best seen in FIG. 14, movable portion 442 includes a relatively thin, leftward extending tongue 1406 that reciprocates within a shallow and wide slot 1408 defined by stationary back plate shoulder portions 1410 and 1412. An upper edge 1414 of tongue 1406 is parallel to axis 216 and linear, and slides along a lower edge 1416 of upper shoulder 1410. Lower edge 1416 of stationary back plate shoulder portion 1410 is linear and is aligned with axis 216. A lower edge 1418 of tongue 1406 is parallel to axis 216 and linear, and slides along upper edge 1420 of stationary back plate shoulder portion 1412, which also is linear and is parallel to axis 216.

Figure 7:
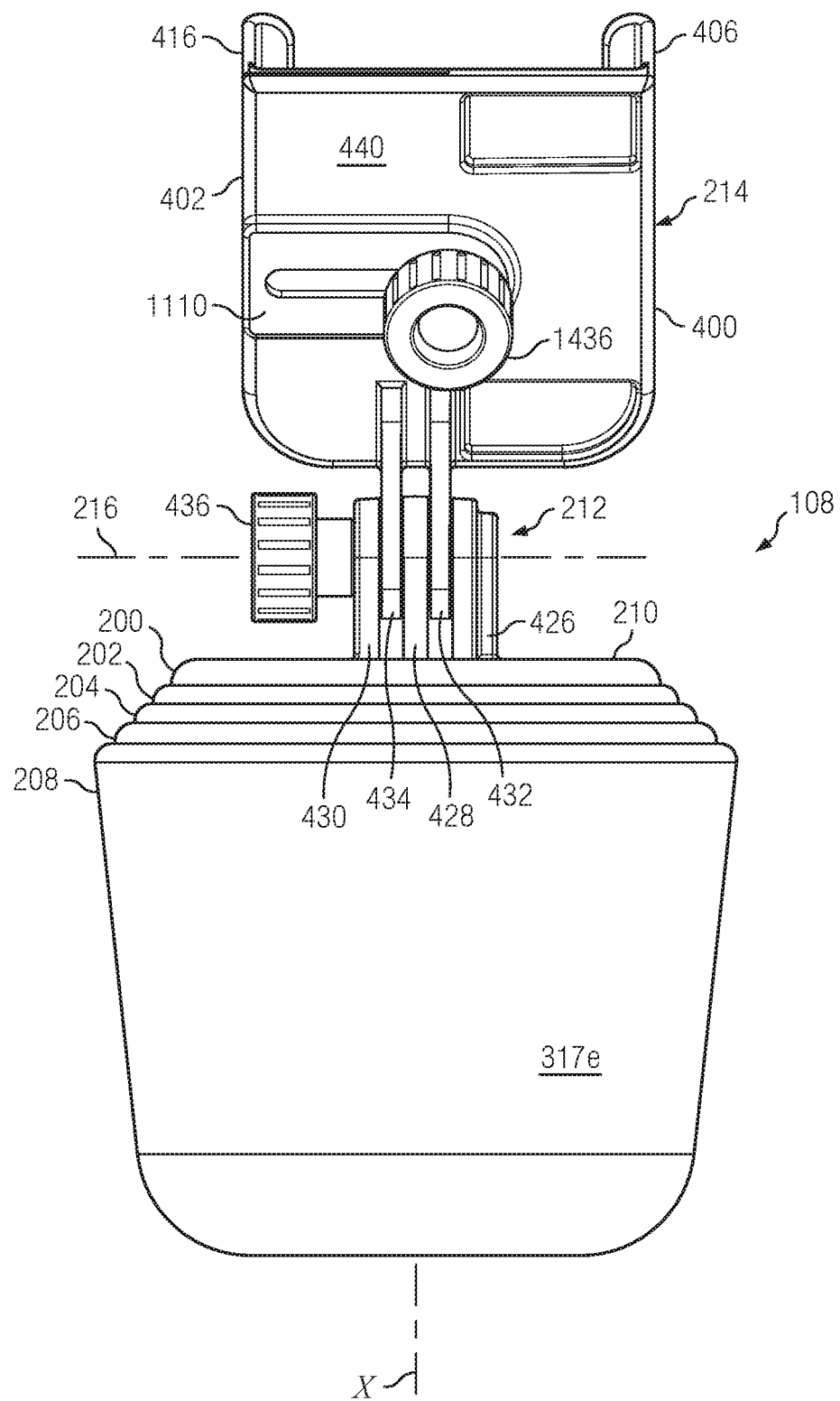
FIG. 7 is a rear view of the embodiment shown in FIGS. 4-6, with all shells assembled.
Figure 8:
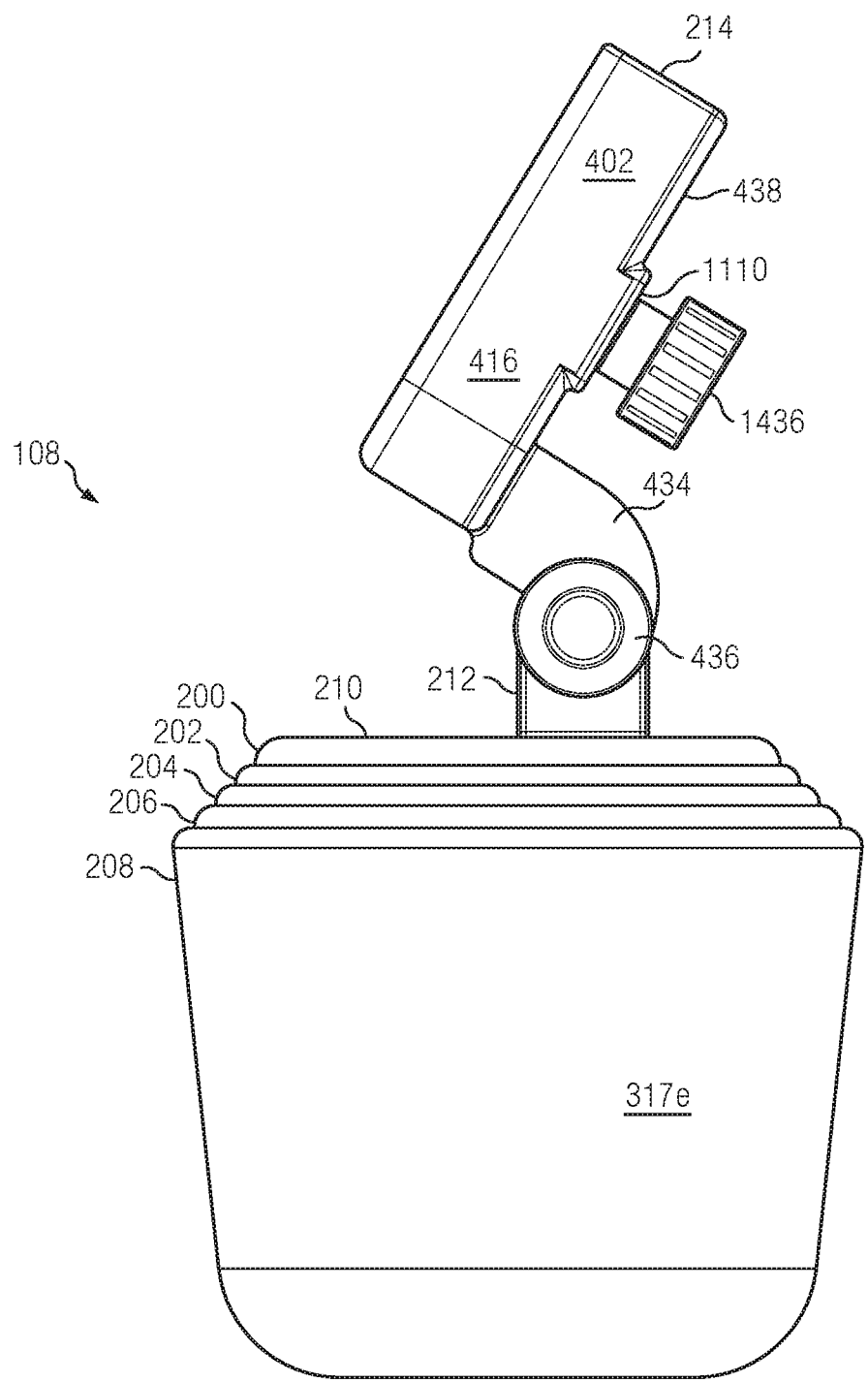
FIG. 8 is a right side view of the embodiment shown in FIGS. 4-7, with all shells assembled.
Figure 9:
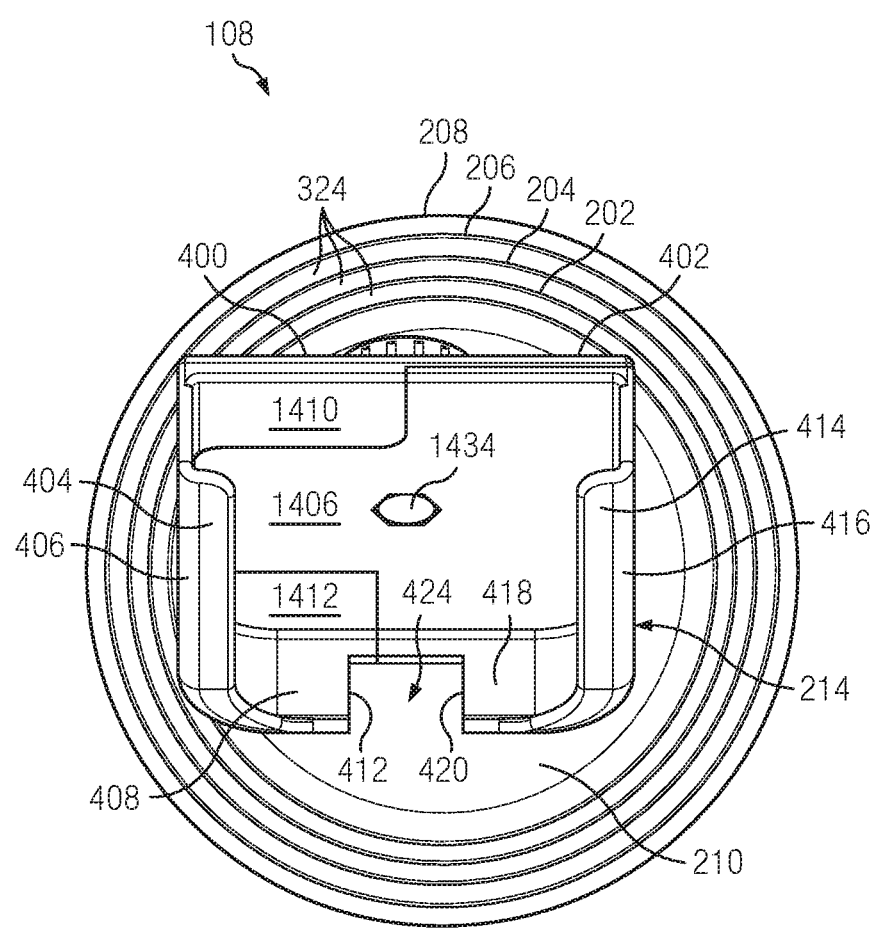
FIG. 9 is a top view of the embodiment shown in FIGS. 4-8, with all shells assembled.

As seen in FIGS. 7, 11 and 14, the movable jaw 402 has a thickened boss 1110 with horizontal and parallel sides that slide within a depression 1422 (FIG. 14) in the stationary jaw 400. Centered within this depression 1422 is a slot 1424, elongate in a horizontal direction, which slidably receives a shaft 1426 of a cap screw 1428. A hexagonally shaped cavity 1430 is formed in a forward surface 1432 of the movable jaw back plate portion 442, which closely receives a hex head 1434 of the cap screw 1428. This prevents cap screw 1428 from turning. A jaw width adjusting knob 1436 may be formed of nylon with a threaded metal insert 1437 and is threaded onto the shaft 1426. In use, the user slides the movable jaw 402 leftward or rightward relative to stationary jaw 400 to best fit a width of the user's cell phone, then tightens the knob 436 on threaded shaft 1426 of screw 1428, thereby clamping movable jaw 402 to stationary jaw 400.

Figures 25, 25A:
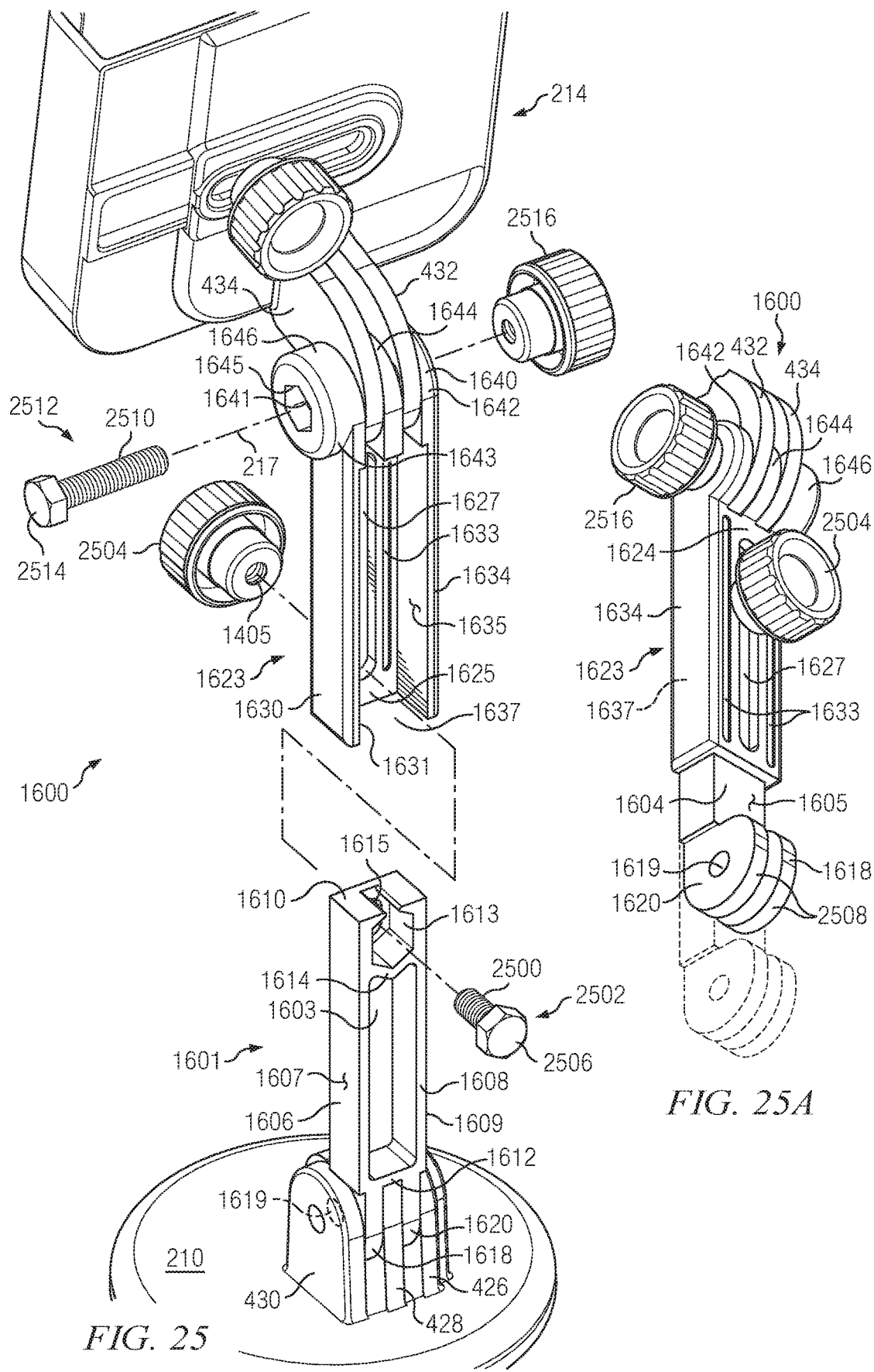
FIG. 25 is a rear exploded perspective view of a cell phone cup mount using a two-piece extension bar that mounts between the cell phone mounting bracket and the cell phone mounting pier.
FIG. 25A is a front perspective view of the two-piece extension bar of FIG. 25 shown assembled and highlighting its capacity for lengthwise adjustment, an extended position being shown in dotted line.

To improve the visibility of the screen of the cell phone or other electronic device, an extension bar may be introduced between the cell phone mounting bracket 214 and the cell phone mount 108. Turning attention to FIGS. 25 and 25A, a two-piece extension bar 1600 is illustrated, comprising a lower male section 1601 that is slidably received within an upper female section 1623. The lower male section is comprised of a top wall 1610 and bottom wall 1612, a front wall 1604 having an outside surface 1605, a right side wall 1606 having an outside surface 1607, and a left side wall 1608 having an outside surface 1609. The lower male section 1601 does not include a rear wall and because all of the other walls of the section 1601 are integrally molded as a single component, an open compartment 1603 is formed. The open compartment 1603 is provided with V-shaped wall 1614 that cooperates with the top wall 1610 to form an extended, hexagonally shaped cavity 1613 that includes a passageway hole 1615 that extends through front wall 1604. The passageway hole 1615 receives a threaded shaft 2500 of a cap screw 2502 and shaft 2500 extends beyond front wall surface 1605 in order to be coupled with a fluted knob 2504. Because the hexagonally shaped head 2506 of cap screw 2502 is closely received by the cavity 1613, it will be prevented from turning when knob 2504 is tightened to adjust the extended length of the extension bar, as will be explained below.

The bottom wall 1612 includes a pair of identical attachment ears 1618, 1620 that are integrally molded and downwardly depending from the bottom wall 1612, slightly inward from respective male section sidewall outside surfaces 1607 and 1609. The attachment ears 1618, 1620 are parallel to and spaced apart from each other and they have a rounded part 2508 which extends frontwardly beyond the outside surface 1605 of front wall 1604. The thickness of each attachment ear 1618, 1620 is matched to that of each sidewall, which is slightly smaller than the spacing between each of the three spaced-apart upstanding parallel plates 426, 428 and 430 that are integrally molded into the lid 210 of base 200, so that the ears 1616, 1618 are permitted to slidably and closely fit between the plates 426, 428, 430.

Each ear 1618, 1620 is provided with a respective central bore 1619 that is aligned with the horizontal axis 216 and the throughbores 423 which are formed in each of the parallel pier plates 426, 428, 430 (see FIG. 14). The generally rounded profile and the inwardly offset position of each ear 1618, 1620 provides the clearances necessary to allow them to freely rotate axially around axis 216. Once the attachment ears 1618, 1620 have been positioned between the pier plates 426, 428, 430, the threaded cap screw shaft 1398, previously described in conjunction with FIG. 14, is threaded through each of the aligned bores and will extend beyond the right pier plate 430. The hex head 1404 of the cap screw 1400 will be tightly received within the hexagonally shaped opening 1402 in the left pier plate 426 and will be prevented from turning when the internal metal threads 1405 of fluted knob 436 are mated to the exposed end of threaded shaft 1398. A tightening of knob 436 will compress pier plates 426, 428 and 430 against attachment ears 1618, 1620, to fix the bottom end of the lower male section 1602 to the top cap 210 relative to axis 216, thereby controlling one axis of adjustment of the cell phone screen relative to the user.

The front wall outside surface 1605 and the side wall outside surfaces 1607 and 1609 will be in intimate, sliding contact with corresponding inside surfaces 1625, 1631 and 1635 of the upper female section 1623 when the two sections of the extension bar are manipulated to either extend or retract the sections 1601, 1623 to a desired combined length. Fluted knob 2504 is then tightened.

FIGS. 25 and 25A illustrate that upper female section 1623 has a front wall 1624, a pair of parallel, spaced side walls 1630 and 1634, and a top wall 1640. All of the walls are integrally molded as a single component. The front and side walls 1624, 1630, 1634 have respective inside surfaces 1625, 1631 and 1635 that collectively define a receiving end channel 1637 that slidingly accepts therein the lower male section 1601. The front wall 1624 is provided with an adjustment slot 1627 that substantially extends the length of the front wall 1624, both parallel with and centered between the side walls 1630, 1634. The threaded shaft 2500 that extends through the passageway hole 1615 in the lower male section 1601 will also extend through the adjustment slot 1627 when the upper and lower sections are connected together.

Front wall 1624 is also provided with identical lateral slots 1633 extending in parallel on each side of adjustment slot 1639. These slots are slightly longer than the adjustment slot 1639 but are not as wide as they are intended to permit a small amount of bending in the front wall 1624 so it tightly abuts against the front wall surface 1605 of lower male section when knob 2504 is further and further tightened onto shaft 2500.

The top wall 1640 has three spaced-apart, parallel securement lobes: a left lobe 1642 (appearing on the right in the rear view shown in FIG. 25), a central lobe 1644 and a right lobe 1646 that are integrally molded into the top wall. The lobes extend upwardly away from top wall 1640 and are adapted to receive therebetween the downwardly depending left and right support plates 432, 434 on cell phone mounting bracket 214, which are also spaced apart and parallel to each other. (See FIGS. 13 and 14.) The spaces between securement lobes 1642, 1644 and 1646 are slightly larger than the spaces between support plates 432, 434 so they can slidably and closely fit within the spaces between each lobe. The lobes are provided with identical throughbores 1641 which are aligned with and identical in diameter to the throughbores 431 in support plates 432, 434.

All bores are aligned with an upper horizontal axis 217 and each bore admits a shaft 2510 of a cap screw 2512. The rightmost lobe 1646 has a thickened boss 1643 that is provided with a hexagonally shaped cavity 1645 for closely receiving the hex head 2514 of the cap screw 2512 to prevent the cap screw 2512 from turning when the adjusting knob 2516 is threaded onto the shaft 2510. Like the other adjusting knobs previously described herein, this knob 2516 is provided with a metallic threaded insert (not shown) that mates with the threads of shaft 2510. Tightening knob 2516 will compress lobes 1642, 1644 and 1646 against support plates 432 and 434, fixing cell phone mount 214 relative to axis 217 and controlling another axis of adjustment of the cell phone screen relative to the user.

In FIG. 25A, the male section 1601 is seen inserted within the receiving end channel 1637 of female section 1623. If a user desires to lengthen the extension bar, the male section would be pulled away from the female section to a lower position, such as the position shown in dashed lines and then knob 2504 would be tightened. In a position that provides the most-extended and longest extension bar, shaft 2500 would contact the top curved surface of adjustment slot 1627. In a most-collapsed position, the shaft 2500 would contact the bottom curved surface of adjustment slot 1627. Advantageously, any position in between can be obtained by loosening the tightening knob 2504 and then sliding the male section either into or out of the female section.

Figure 26B:
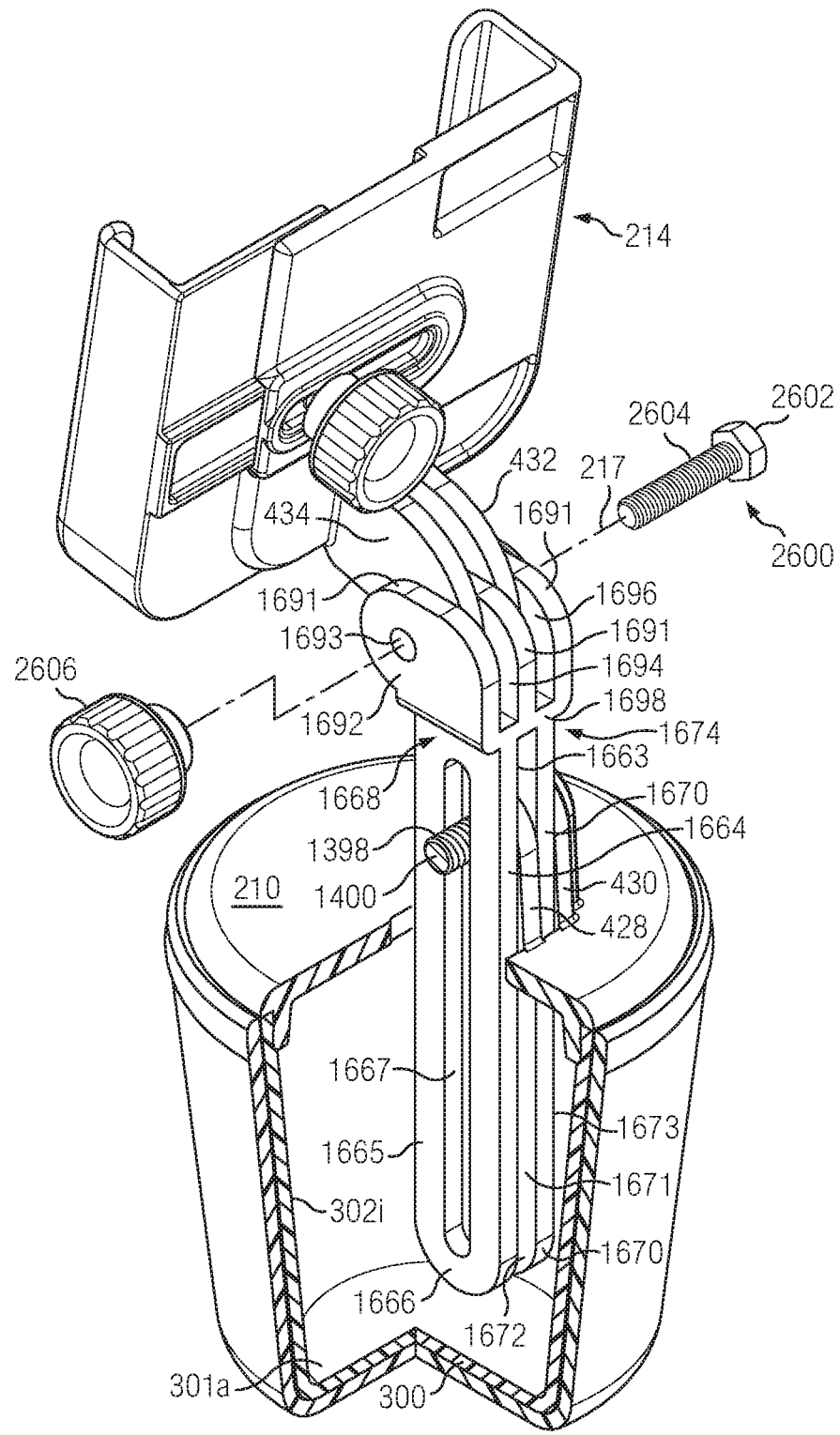
FIG. 26B is a perspective view in partial cutaway that exemplifies the capacity of the one piece extension bar to be lowered into the interior of the inner base inner cup as a means to adjust the vertical height of the cell phone mounting bracket.
Figure 26C:
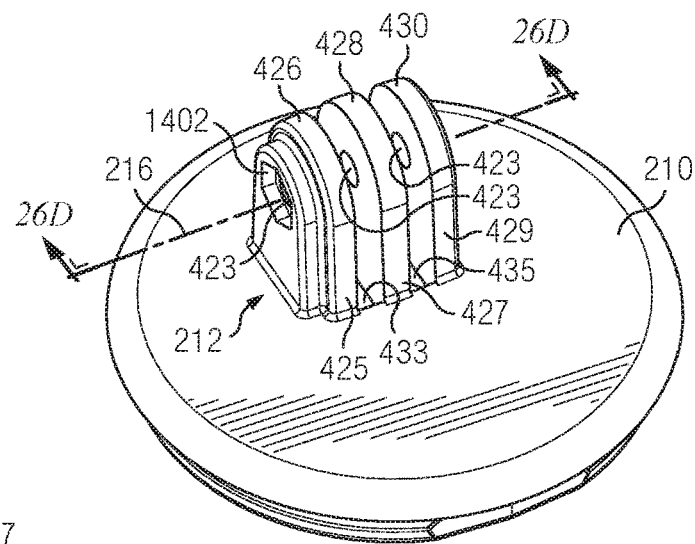
FIG. 26C is a top perspective view of a base lid showing extension bar-receiving openings.
Figure 26D:
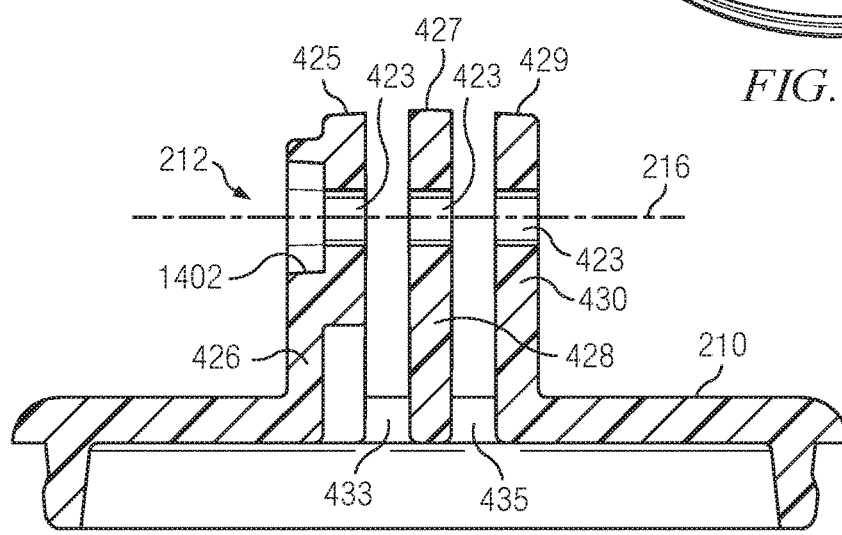
FIG. 26D is a sectional view taken along the line 26D-26D in FIG. 26C.

While FIGS. 25 and 25A illustrate a two-piece extension bar 1600, FIGS. 26-26D depict a one-piece extension bar 1660 that accomplishes the same objective. In this illustrated embodiment, extension bar 1660 has identical, right and left extension bar components 1664 and 1670 that are parallel to and spaced from each other. However, a related embodiment could also effectively function with only a single extension bar component.

As seen particularly in FIG. 26B, the first or right bar component 1664 (as viewed from the front of the cell phone) has a top end 1668, a rounded bottom end 1666 and a length between the top end and the bottom end. The first bar component 1664 also has an inner surface 1663, an outer surface 1665 and an adjustment slot 1667 extending upwardly from near the bottom end 1666 towards the top end 1668. In the illustrated embodiment, slot 1667 extends for most of the length of bar component 1664, and itself has an upper end and a lower end. Likewise, the second or left bar component 1670 has a top end 1674, a rounded bottom end 1672 and a length between the top end and the bottom end. The second bar component 1670 also has an inner surface 1671, an outer surface 1673 and an adjustment slot 1675 (FIG. 26A) extending upwardly from near the bottom end 1672 towards the top end 1674. In the illustrated embodiment, slot 1675 extends for most of the length of bar component 1670 and has upper and lower ends. The upper and lower ends of first and second slots 1667 and 1675 define an affixation range of a plurality of positions, at each of which the extension bar may be clamped to the bae mounting pier. In embodiments having only one component, such as component 1664, the upper and lower ends of slot 1667 define this affixation range. Each slot 1667, 1675 is identical in height and width and each is centered on its respective bar component 1664, 1670 such that the slots are parallel to each other and are aligned with each other in a direction that is perpendicular to either outer surface 1665 or 1673, and in a direction perpendicular to axes 216 and 217. The rounded bottom ends 1666, 1672 of the respective bar components are free ends, meaning they are not structurally a part of nor attach to any other component except through the top ends of the bar components. Each bar component has a continuous outside forward and rearward facing edge surface 1669, 1677 extending around the entire perimeter of each bar component, thereby delimiting a horizontal extent of each bar component.

The respective top ends 1668, 1674 of the bar components 1664, 1670 are joined together and are preferably integrally molded with a receiver cradle 1690 that may be centered above the respective top ends 1668, 1674 of the bar components 1664, 1670, along a length axis of the extension bar. Alternatively, if only a single bar component is provided, then the receiver cradle would be integrally molded with and may be centered about the top end of the single bar component, along a length axis of the single bar component. The receiver cradle 1690 functions to connect the cell phone mounting bracket 214 to either the first and second bar components 1664, 1670 or to a single bar component when only a single bar component is provided.

When two bar components are provided, cradle 1690 preferably is comprised of three identical upstanding plates: a right cradle plate 1692, a central cradle plate 1694 and a left cradle plate 1696. When a single bar component is provided the cradle may either be provided with the same three plates or it may be constructed to have two upstanding plates. Whether the cradle has three or two plates, it is preferred that all plates be identical and each cradle plate will be parallel to and equally spaced from the other and each will have an outside edge surface 1691 that delimits the upper and horizontal limits of each plate.

Commonly connecting the bottom ends of each cradle plate is a floor 1698. The thickness of floor 1698 is preferably the same as the thickness of each cradle plate. In this embodiment, cradle plate floor 1698 does not extend laterally beyond the cradle plates 1692-1696. Further, it is preferred that the cradle plate floor 1698 have a width, taken in a direction orthogonal to axis 217, that does not extend beyond the edge surfaces 1691 of the cradle plates.

As FIGS. 26 and 26B illustrate, the top ends 1668, 1674 of the first and second bar components 1664, 1670 are integrally molded with the cradle plate floor 1698 such that each bar component is in vertical alignment with the spaces that exist between the cradle plates. If only a single bar component is provided, the top end of the bar component may or may be in vertical alignment with the spaces between each cradle plate when it is molded with the bottom of floor 1698.

FIGS. 26-26B also illustrate that the spaces between the cradle plates are adapted to accept the downwardly depending left and right support plates 432, 434 of the cell phone mounting bracket 214 such that when the top end of the extension bar 1660 is connected to the mounting bracket 214, the mounting bracket is pivotable relative to the extension bar. The rounded ends of the left and right support plates 432, 434 (See FIG. 14) slidably and closely fit within the cradle plate spaces. The support plates 432, 434 are pivotably connected to the cradle 1690 along the cradle axis 217, which is formed at an angle (preferably ninety degrees) to the vertical axis X of the base cup 300 and shells 202-208 (see, e.g., FIG. 7). The rounded ends on each support plate give the cell phone mounting bracket 214 the same degree of rotational freedom within the cradle as that described earlier when the support plates were directly mounted to the pier plates on lid 210.

In this illustrated embodiment, all of the cradle plates 1692, 1694, 1696 of the receiver cradle have identically sized throughbores 1693 extending therethrough which are matched in size to the throughbores 431 in support plates 432 and 434 and are disposed along the mounting bracket axis 217 that extends through the support plates. In the illustrated embodiment, axes 216 and 217 are parallel to each other. Throughbores 1693 will be in alignment with axis 217 when the support plates 432 and 434 are received between the cradle plates.

Each of the throughbores 1693 and 431 receives a common cradle clamp that is disposed on axis 217 for clamping the top of the extension bar to the mounting bracket 214. In a preferred form, the cradle clamp is comprised of a cap screw 2600 having a hex head 2602 and an elongated threaded shaft 2604 extending from the head. The cap screw threadingly receives an internally threaded adjustment knob 2606. Alternatively, the clamp may take the form of a pin and compression means other than helical screw threads may be provided to compress together the cradle plates and the support plates.

At least one of the cradle plates is provided with a thickened boss 1695 (FIG. 26A). In this embodiment, boss 1695 is mounted on the leftmost cradle plate 1696. The boss 1695 has a hexagonally shaped cavity 1697 for closely receiving the hex head 2602 of the cap screw 2600 after the threaded shaft 2604 is inserted through all of the aligned bores 1693 and 431 of the cradle and support plates. The hexagonally shaped cavity 1697 will prevent the cap screw 2600 from turning when the adjusting knob 2606 is threaded onto the shaft 2604.

The user may decide to use extension bar 1660 or not. Cap screw 1400 and adjustment knob 436 are either used for mounting the bottom end of the extension bar 1660 to the pier mount 210, or for connecting the mounting bracket 214 directly to the mounting pier 210, as depicted in FIG. 14. Where the extension bar 1660 is used, tightening knob 2606 on shaft 2604 will compress cradle plates 1692, 1694 and 1696 against support plates 432, 434, to clamp the top end of the extension bar 1660 to the cell phone mounting bracket 214 relative to axis 217, thereby controlling another axis of adjustment of the cell phone screen relative to the user.

Similarly, the bottom end of the extension bar 1660 is connected to the mounting pier 212 using a pier clamp that is inserted through each of the pier plate throughbores 423 and through slots 1667 and 1675 of the bar components 1664 and 1670. When the bottom end of the extension bar 1660 is connected to the mounting pier 212, the throughbores 423, slots 1667 and 1675 and the pier clamp will all be disposed on the mounting pier axis 216 (FIG. 26D). In a preferred form, the pier clamp is comprised of a cap screw 1400 having a hex head 1404 and an elongated threaded shaft 1398 extending from the head, as seen in FIG. 14. Alternatively, a pin may be threaded through throughbores 423 and slots 1667 and 1675, and compressive means other than helical screw threads may be used to compress together the pier plates and the bar components. The threaded shaft 1398 is received through throughbores 423 and slots 1667, 1675 and the hex head is received within the hexagonally shaped opening 1402 (FIG. 26D) formed in the raised boss of left pier plate 426 of mounting pier 212. Internally threaded adjustment knob 436 is threaded onto the shaft 1398 and allows the extension bar to be clamped to mounting pier 212 at any of a plurality of positions along slots 1667, 1675; the upper and lower ends of slots 1667, 1675 define an affixation range of such positions.

Where the clamping position is at or near the lower ends of slots 1667, 1675, within a lower portion of the affixation range, the extension bar 1660 and therefore the mounting bracket 214 may be clamped at any of a number of positions at an angle to the cup/shell axis. Two such alternative positions are shown in phantom in FIG. 26A. Of course, if only a single bar component is provided, the extension bar would still be capable of obtaining similar coaxial or angular positions along the single slot.

When the extension bar 1660 is pulled out to its highest vertically extendable position, the rounded bottom ends 1666 and 1672 of bar components 1664 and 1670 will be disposed in a position above the openings 433 and 435 in base top 210. This configuration is illustrated in FIGS. 26 and 26A. In this configuration, the threaded shaft 1398 will be touching the respective curved surfaces that define the lower ends or bottoms of the adjustment slots 1667 and 1675. Tightening knob 436 will compress the pier plates 426, 428, 430 against the inner and the outer surfaces 1663, 1665, 1671, 1673 of the bar components 1664, 1670, thereby fixing the bottom of the extension bar 1660 relative to horizontal axis 216 and controlling another axis of adjustment of the cell phone screen relative to the user.

When there is a desire to lower cell phone mount 214 to its lowest possible position or to a position between its lowest and highest position, the extension bar 1660 can be slidingly inserted into the interior of the base inner cup 300 (FIG. 26B). Because the bottom ends 1666, 1672 of each bar component 1664, 1670 are free and not structurally tied together like their top ends 1668, 1674, the bottom ends of bar components 1664 and 1670 can be slidingly inserted through the spaced receiving openings 433, 435 (FIG. 26D) that are formed in base top 210. If only one bar component is provided then only one receiving opening is needed. The openings are generally disposed adjacent to the mounting pier 212 and more specifically there will be a receiving opening disposed between each pair of upstanding pier plates 426, 428; 428, 430 that are provided on the mounting pier 212. As best illustrated in FIGS. 26C and 26D, when two bar components are provided, there will be two receiving openings disposed between the three pier plates, one opening 433 between plates 426 and 428 and the other opening 435 between plates 428 and 430. In the illustrated embodiment, each of the receiving openings 433, 435 has a rectangular shape and each occupies the entire respective area of lid 210 between adjacent pier plates.

If only a single bar component is provided, then the mounting pier 212 on base lid 210 may be formed with only two spaced, parallel pier plates instead of three, with the two plates being structurally identical to the three pier plates just described. In that case, when only two pier plates are provided, then there would only be a need for one receiving opening and it would be disposed between the two plates to receive the single bar component. With a single bar component, the bottom end of the extension bar would be clamped between the two pier plates.

The extension bar of the invention may also be used with any electronic device mount having a hollow base, as long as there are number of openings in the top of the base that equal or exceed the number of extension bar components.

Other bases having hollow interiors may be provided for use with the extension bar, and are not restricted to those adapted to fit within vehicle cup holders.

The widths of each receiving opening are slightly larger than the thickness of the bar components so that the bar components can be readily inserted into and out of the receiving hole. The thicknesses of the two bar components 1664. 1670 that are illustrated are defined by the horizontal extent, in a direction parallel to axis 216, of the edge surfaces 1669, 1677 (FIG. 26).

In the embodiment illustrated in FIG. 26C, the front of each opening 433, 435 does not extend beyond the edge surfaces 425, 427, 429 that delimit the pier plates 426, 428, 430. Although not shown in the Figure, it should be understood that the opposed ends of each opening 433, 435 similarly do not extend beyond the edge surfaces 425, 427, 429 on the back side of each pier plate 426, 428, 430. FIG. 26D shows that each receiving opening 433, 435 extends through the base lid 210 so as to be in communication with the interior of base inner cup 300.

In the embodiment illustrated in FIG. 26C, the lengths of each of the rectangular openings 433, 435 are a little greater than the widths of the extension bar components 1664, 1670. This means that even when the ends 1666, 1672 of the extension bar components 1664, 1670 are positioned to be below the lid openings 433, 435, as would be the case where the user selects a position in the upper portion of the affixation range for clamping the bar to the mounting pier, the extension bar 1660 will still be capable of a range of angular adjustment around axis 216 relative to the vertical, although not as great as the angular range depicted in FIG. 26A.

Figure 26E:
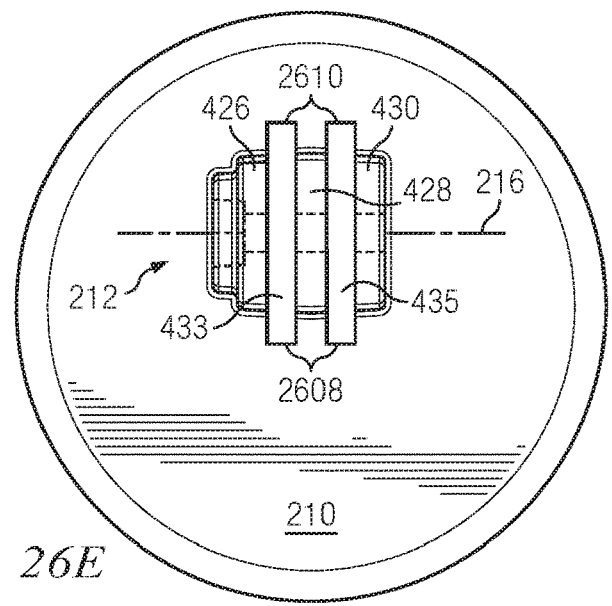
FIG. 26E is a top view of a lid having extended slots for receiving an unused length of the extension bar.

FIG. 26E illustrates an alternative embodiment in which the openings 433, 435 are substantially longer than the widths of the pier plates 426-430. In this embodiment, ends 2608 and 2610 are positioned to be farther away from axis 216. The displacement of ends 2608 from axis 216 does not have to be the same as the displacement of ends 2610 from axis 216, but in this illustrated embodiment the displacement is the same.

As so extended, the ends 2608, 2610 would no longer limit the angular movement of extension bar 1660, even where bar ends 1666, 1672 are positioned to be well below the openings 433, 435. Instead, the only constraint to angular adjustment around axis 216 would be imposed by bar ends 1666, 1672 abutting the interior sidewall 302i of the base cup 300. The lengthened slots 433, 435 increase the range of angular motion of the extension bar 1660.

In one embodiment, when two bar components 1664 and 1670 are provided, they can be downwardly lowered into the interior of base inner cup 300 to the point where their respective bottom ends 1666 and 1672 touch the bottom inside surface 301a of the base inner cup 300, thus defining a lowest possible position the phone mount can realize when an extension bar is used. Alternatively, the lowest position of the extension bar 1660 can be defined by the abutment of the lower surface of cradle floor 1698 with the top ends of pier mounting plates 426, 428, 430. Between this lowest position, however delimited, and the highest extension bar position, the user may freely select any other amount of extension along the vertical axis, within a predetermined affixation range. When a single bar component is provided, the surfaces that touch, as described, will not change.

When a desired vertical position of the extension bar 1660 is determined by the user, the knob 436 is tightened to compress the pier plates 426, 428, 430 against the inner and outer surfaces 1663, 1665, 1671, 1673 of the bar components 1664, 1670 to hold the extension bar in that vertical position.

When the rounded bottom ends 1666 and 1674 are entirely above the upper surface of lid 210 so as to be above openings 433, 435, the bar components 1664, 1670 are free to rotate in a sweep that is slightly larger than 180° relative to axis 216. Within that large range, the user may angularly adjust the extension bar to bring the cell phone screen closer to or farther away from the user.

Figure 27:
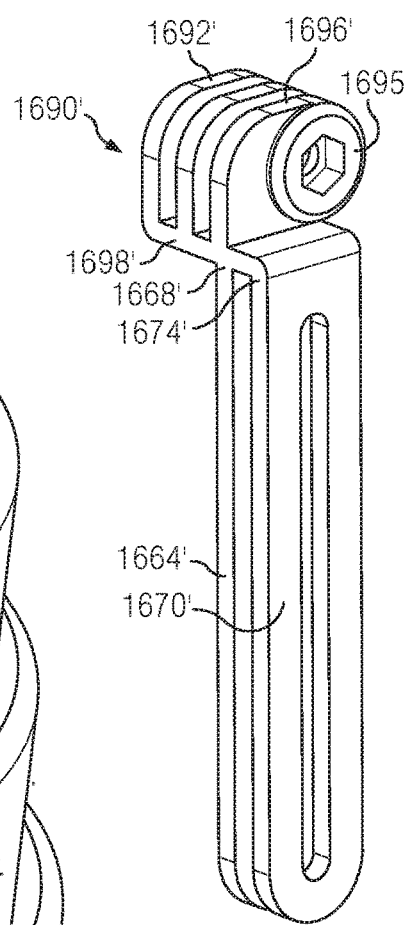
FIG. 27 is a perspective view of another version of the one-piece extension bar.

Turning attention to FIG. 27, an alternative extension bar 1660' has an offset receiver cradle 1690'. The components of cradle 1690' are identical to those of cradle 1690, except for the lateral extent of the floor 1698'. Here, floor 1698' extends from the rightmost (as seen from the front of the cell phone) cradle plate 1692' to just beyond the leftmost cradle plate 1696'. The extended part of the floor 1698' is integrally formed with the top ends 1668', 1674' of bar components 1664', 1670'. However, the cradle 1690' is no longer centered above each bar component. Instead, the cradle 1690' is in a position that is laterally offset relative to the bar components 1664' and 1670', wherein leftmost cradle plate 1696' is now vertically aligned with the rightmost bar component 1664' and the spaces between the cradle plates are no longer in vertical alignment with the bar components 1664, 1670, as they were with the cradle 1690. Thus, all but one of the cradle plates occupies a plane that is offset, along a mounting bracket clamping axis, from the planes containing the respective bar components.

Other than this one difference, the structural aspects of the extension bar 1660' are the same as those of extension bar 1660, including the manner of attachment to the support plates 432, 434. There is a technical advantage to this offset. When the cable 112 (See FIG. 1) is connected to the bottom of a cell phone C, the offset in the cradle will provide the cord with a less congested path to the vehicle's power/communication port. In addition, an offset cradle allows the user a little more lateral versatility in setting the final position of the cell phone screen 114 when compared with that of the standard cradle 1690.

Figure 10:
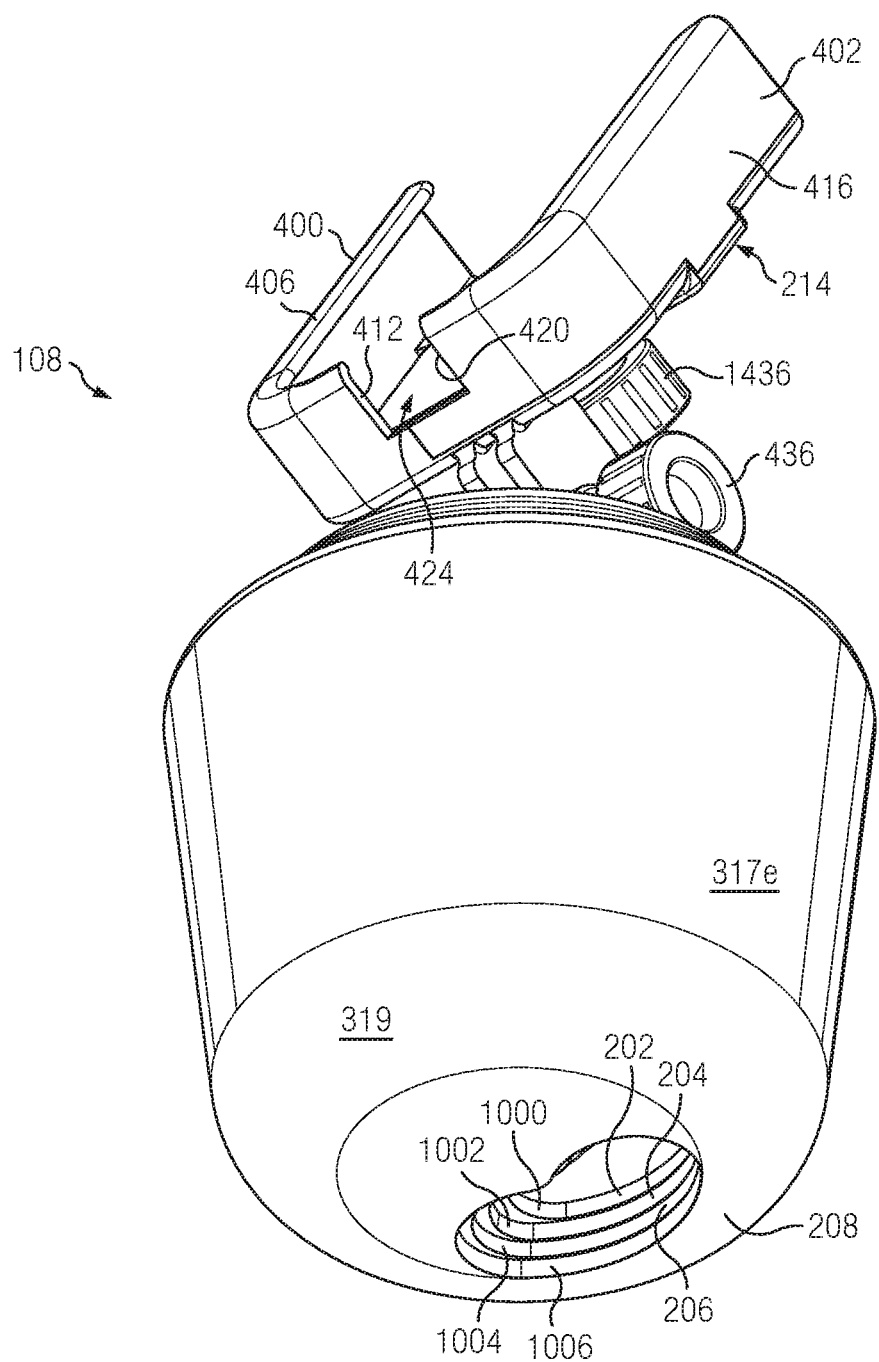
FIG. 10 is a bottom perspective view of the embodiment shown in FIGS. 4-9, with all shells assembled.

Referring to FIG. 10, the bottom of each hollow shell 202, 204, 206 and 208 is molded with a respective opening 1000, 1002, 1004 or 1006, which are preferably similar in shape. These openings are clearance holes to allow the user to push apart the individual shells from each other after they have been snapped together. The user may rotate the shells relative to each other to expose more surface area on the shell bottom of the shell to the immediate interior of the one being accessed by its opening 1000-1006, so that the user may push away a selected number of shells from the cup 300 and one or more shells that are to continue to be used in the assembly.

Figure 11B:
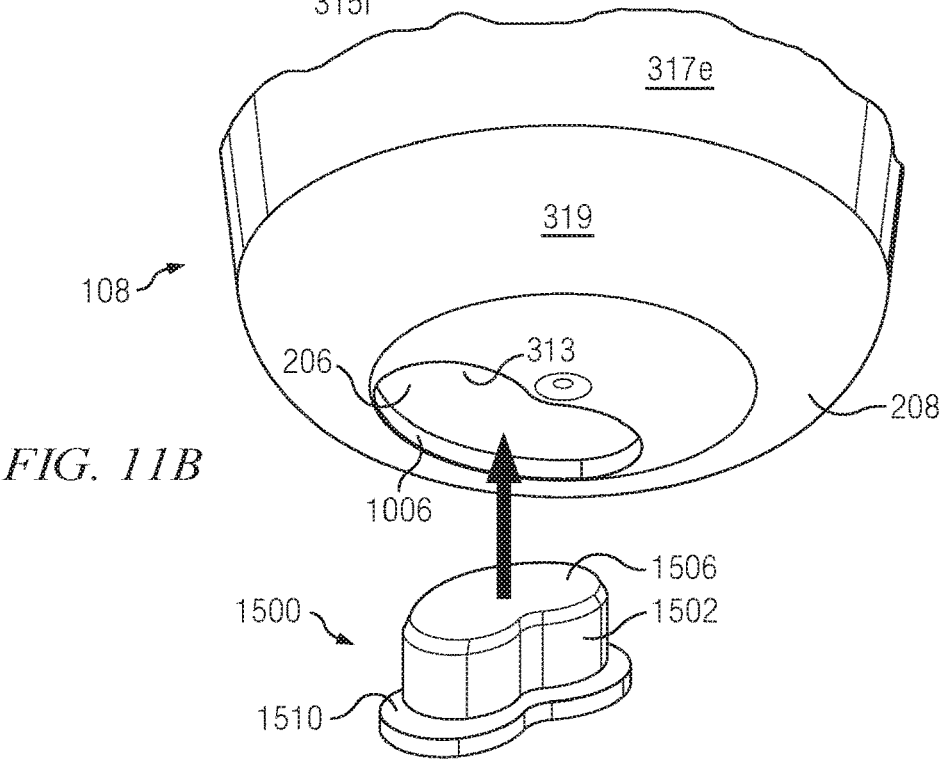
FIG. 11B is a perspective view of a portion of an assembled cell phone mount and a pusher tool used for separating previously attached shells.
Figure 12:
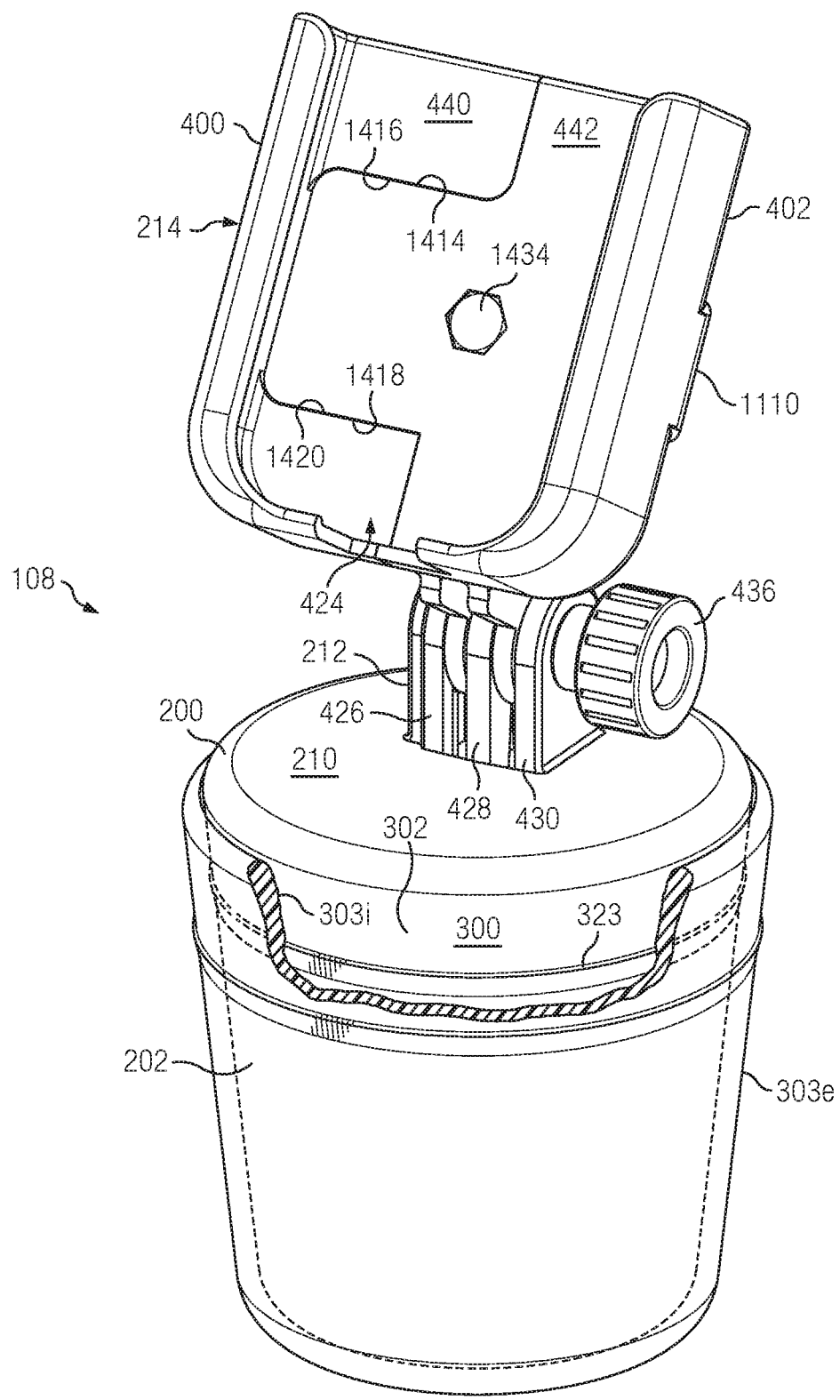
FIG. 12 is a perspective view with parts broken away of a cell phone mount assembly as using only one shell.

To facilitate the detachment of shells, a pusher tool 1500 can be provided like the one shown in FIG. 11B, which is somewhat kidney shaped and which therefore is similar to the shape of openings 1000-1006. Although FIGS. 10 and 11 show all openings in vertical alignment, it should be understood that use of the pusher tool 1500 (or of a finger) will require the openings to be at least partially angularly displaced from each other around the cup/shell axis. The pusher tool shown in FIG. 11B has an upstanding wall 1502 joined at its top end to a solid top wall 1506 and a bottom end joined to a peripheral flange 1510 which is integral with upstanding wall 1502. In an alternative embodiment, the upstanding wall 1502 does not have to include the flange and the pusher tool can be a completely solid member instead of the hollow one that is shown. The exterior profile of upstanding wall 1502 must capable of being inserted within the smallest shell opening, in this case, opening 1000 on shell 202 (see FIG. 11). As long as the tool 1500 will fit within this smallest opening, it will fit within the other shell openings.

In use, pusher tool top wall 1506 is inserted through the opening of the outermost of the shells that have been assembled to the base 200, and pushed into contact against the outside bottom surface of the shell that is interior to it, in the direction of the heavy arrow shown in FIG. 11B. In the case presented in FIG. 11B, this would mean that tool 1500 is to be inserted through opening 1006 of shell 208. If by chance the opening 1006 is aligned with the opening of the shell interior to it (opening 1004 of shell 206, not shown in this figure) then the outermost shell 208 will need to be axially rotated until its opening is no longer aligned as such, whereby top wall 1506 can then make contact against the bottom surface of shell 206.

To detach shell 208 from shell 206, or for that matter, one shell from another shell interior to it, the shell to be removed is grasped and pulled downward over tool sidewall 1502. Top wall 1506 will abut the lower surface of a shell interior to the shell to be removed. This creates an axial tensile force between the attachment means of the interior shell and the attachment means of the shell to be removed, eventually, the downward pulling force will overcome the attaching force and the two shells will separate. After an outermost shell is removed in this manner, the remaining stack of shells can be inserted into the vehicle cup holder to determine if a tight, frictional fit exists or if an additional shell or shells should be removed. A similar shell detachment process is performed until a proper fit is obtained. In some cases, it may be discovered that only the base inner cup 300 will properly fit into a vehicle cup holder, whereby all shells would have been removed as described. The pusher tool 1500 can be stored within the interior cavity of the base inner cup 300 when not in use. Other pusher tool shapes can be employed as long as the tool can fit within the smallest shell opening.

FIG. 11A is a detail of one embodiment of the attachment means, showing how the first shell 202 is releasably secured to inner cup 300 of base 200, how each shell 204, 206 and 208 may be releasably secured to the shell interior to it, and how cap or lid 210 is attached to base inner cup 300. The inner cup 300 has a v-shaped circumferential groove 1112 on its inner surface 302i and near its top end, which is delimited by upper edge 326. The groove 1112 accepts a plurality of spaced, v-shaped wedges 328 (see FIGS. 3 and 14) that are formed on the downwardly depending, circumferential flange 211 of cap 210. The wedges 328 are spaced about an exterior side of the flange, extending radially outward from the flange 211. When viewing the wedges 328 in FIG. 14, it is clear to see that they have a v-shaped profile that is complementary to v-shaped groove 1112, whereby they will frictionally snap into groove 1112 when a considerable downward force is applied to lid 210. Lid 210 may not thereafter be easily removed from base cup 300. Alternatively or in addition, the lid 210 may be joined to the inner cup 300 by gluing, heat-bonding or ultrasonic welding.

As shown in FIG. 11A, on its outer surface 302e, inner cup 300 has a v-shaped circumferential groove 323 that accepts each of the inwardly extending protuberances or bumps 320 of shell 202. Outer surfaces 303e, 307e and 315e similarly have v-shaped circumferential grooves 322 that accept the inwardly extending protuberances or bumps 320 of the shell respectively immediately radially exterior to them. The morphology of the grooves 323 and 322 is similar. Each has a lower wall 1116 and an upper wall 1118. A taper of upper wall 1118 is a little more than the general taper of the outer base/shell surface of which it is a part, and is downward and inward. A taper of lower wall 1116 is more abrupt than the taper of wall 1118, and is downward and outward. This means that a shell will be relatively easily attachable to the shell or base immediately interior to it, but that it will require more axial force to pull off a shell from an assembly of inner cup 300 and shells (if any) radially interior to it. This ensures that the shells 202-208 will not easily separate during use.

FIG. 13A is a detail of FIG. 13, and shows one possible interaction of a base/shell assembly (here, only shell 202 has been added to the assembly also including base 200) and the cup holder side wall 1302. The draft, pitch or degree of taper of shell or base wall 1303 is chosen to be slightly more than the draft of a typical cup holder 102; surface 303e is more inwardly and downwardly tapered, at least in a general way, than inner wall 1302 of the cup holder 102. This means that the interaction or abutment of the shell or base wall 1303 and the inner cup holder wall 1302 will occur at a top cup holder corner 1306, where the inner cup holder wall 1302 meets a substantially horizontal top surface 1308 of cup holder 102. Since preferably the inner cup 300 and each of the shells 202-208 are molded of a resilient plastic, the shell or base wall 1303 will slightly dimple at its point of contact with the cup holder corner 1306, creating a compressive frictional force between the two so that the cell phone mount 108 doesn't simply slide out of holder 102. A similar interaction will obtain between the inner cup 300 and the cup holder wall 1302, or between the wall of another shell 204, 206 or 208 and the cup holder wall 1302, depending on which (if any) shell is chosen to best fit the cup holder 102.

As used with other cup holders, there could be a deformation of the cup holder side wall 1302 in addition to or instead of shell or base wall 1303. In other embodiments, there could be no deformation of either structure, particularly if the base 200, shells 202-208 and cup holder 102 are constructed of more rigid, less elastic materials.

Figure 17:
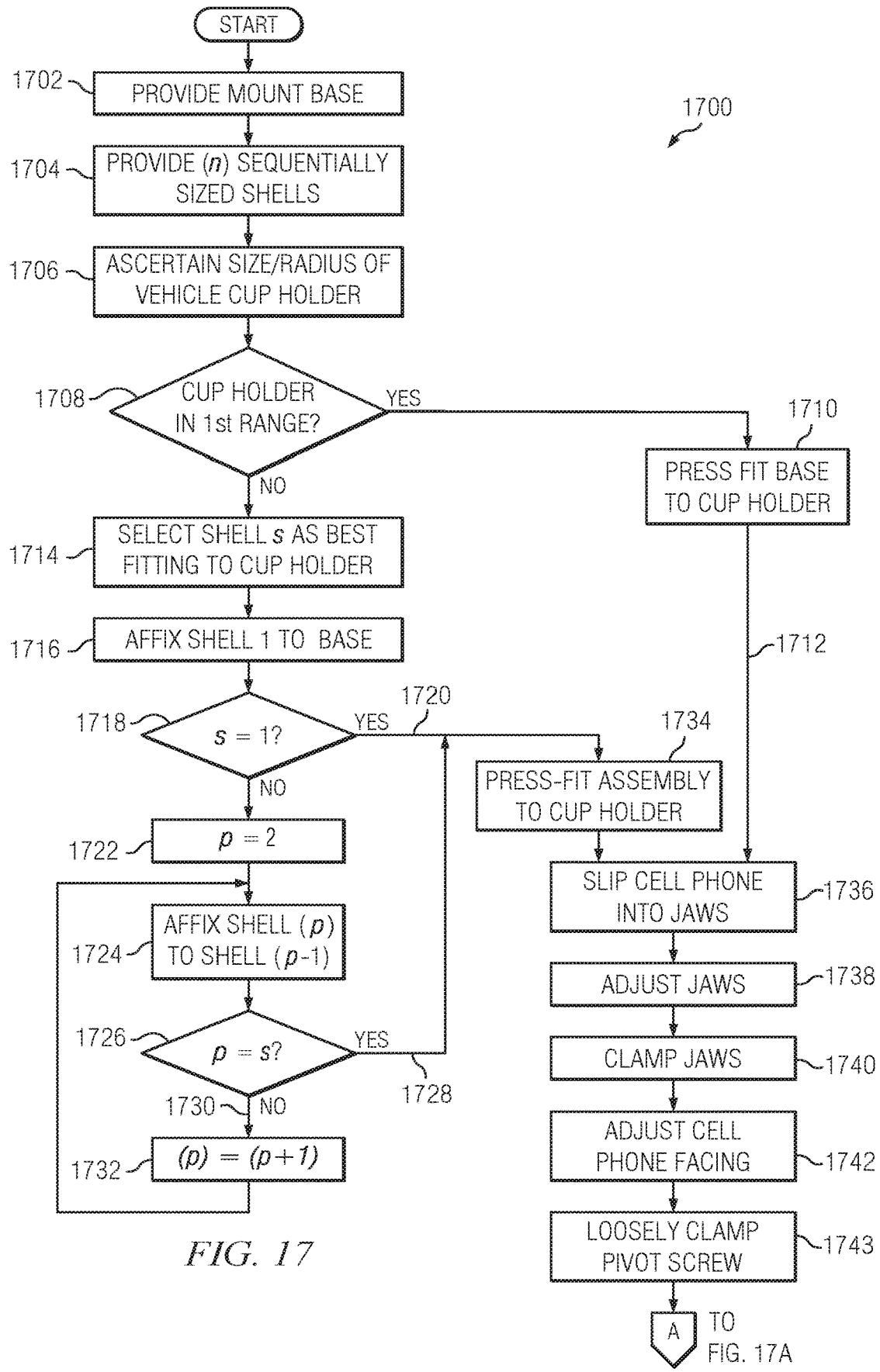
FIG. 17 is a block diagram illustrating a method of using the cell phone mount of the invention.

FIG. 17 depicts a process 1700 for the use of the cell phone mount 108. At beginning step 1702, a cell phone mount base 200 is provided. At step 1704, n sequentially sized shells, each of a different radial size, are provided. While in the illustrated embodiment (n)=4, (n) can be chosen to be smaller or larger than this.

At step 1706, the user ascertains the size or radius of the vehicle cup holder. At step 1708, it may be the case that the cup holder 102 has a relatively small radius within a first range and that no shells will be used in mounting the phone C to the cup holder 102. In that case, at 1710, the user press-fits the base 200 to the cup holder 102, and the process proceeds by path 1712 to step 1736. If the cup holder 102 is of a moderate or large size, the process instead branches to step 1714, at which the user selects a shell s as best fitting to the vehicle cup holder inner wall. This may be performed, for example, by a test fitting. Several shells may fit to the cup holder inner wall, but the user should select the shell s that engages the cup holder wall at the highest point on its outer surface.

Next, and at step 1716, the user affixes the first shell 202 to the base 200. At decision step 1718, it is determined whether the first shell 202 is the same as the best-fitting shell s, meaning that only the first shell will be used in the resulting inner cup/shell assembly. If this is the case, the process proceeds by path 1720 to step 1734.

If even more shells are necessary to best fit the apparatus to the cup holder 102, then at step 1722 (and in the pseudocode language used in FIG. 17) a variable p is set to 2. Nest, at step 1724, shell p is removably affixed to the shell immediately interior to it, which will be shell (p−1). For example, and in the first iteration, shell 2, or the second shell 204, will get affixed to shell 1, or the first shell 202.

At step 1726, variable p (identifying the shell presently being handled by the user) is compared with variable s (identifying the shell that best fits the cup holder 102). If these are now the same, the assembly is complete and the process proceeds by path 1728 to step 1734. If shell s has not yet been added to the assembly, then the process branches at step 1730 and p is incremented by 1 at step 1732. The process then loops back to step 1724, at which another shell is added to the assembly. This loop iterates until the current shell p is the same as the best-fitting shell s.

At step 1734, the user has built an assembly that will include base 200 and one or more of the shells 202-208 (or more, in embodiments providing more than four shells). This assembly is then press-fit into the cup holder, to assume a disposition as shown in FIGS. 11 and 11A.

At step 1736, a cell phone C, possibly with a power/communications cord 112 attached to it (see FIG. 6), is slipped into the open top end of the cell phone mounting bracket 214. Then, at step 1738, the user adjusts the horizontal position of movable jaw 402 until jaw 402 and jaw 400 closely hold the vertical sides of cell phone C. Once the position of jaw 402 has been optimally adjusted, at step 1740 the user twists knob 1436 to clamp jaw 402 to jaw 400.

At step 1742, the user adjusts the facing of the screen of the cell phone so that it is pointed in an optimum direction. To adjust the plane of the cell phone screen relative to vertical axis X, the user simply twists the cell phone mount/assembly 108 around axis X in the cup holder in which it has been installed (e.g. cup holder 102). To adjust the plane of the cell phone screen relative to the horizontal, the user pivots bracket support plates 432 and 434 around axis 216 relative to pier 212. Once the desired position has been achieved, the user loosely tightens the pivot screw knob to the hex head screw at 1743.

Figure 17A:
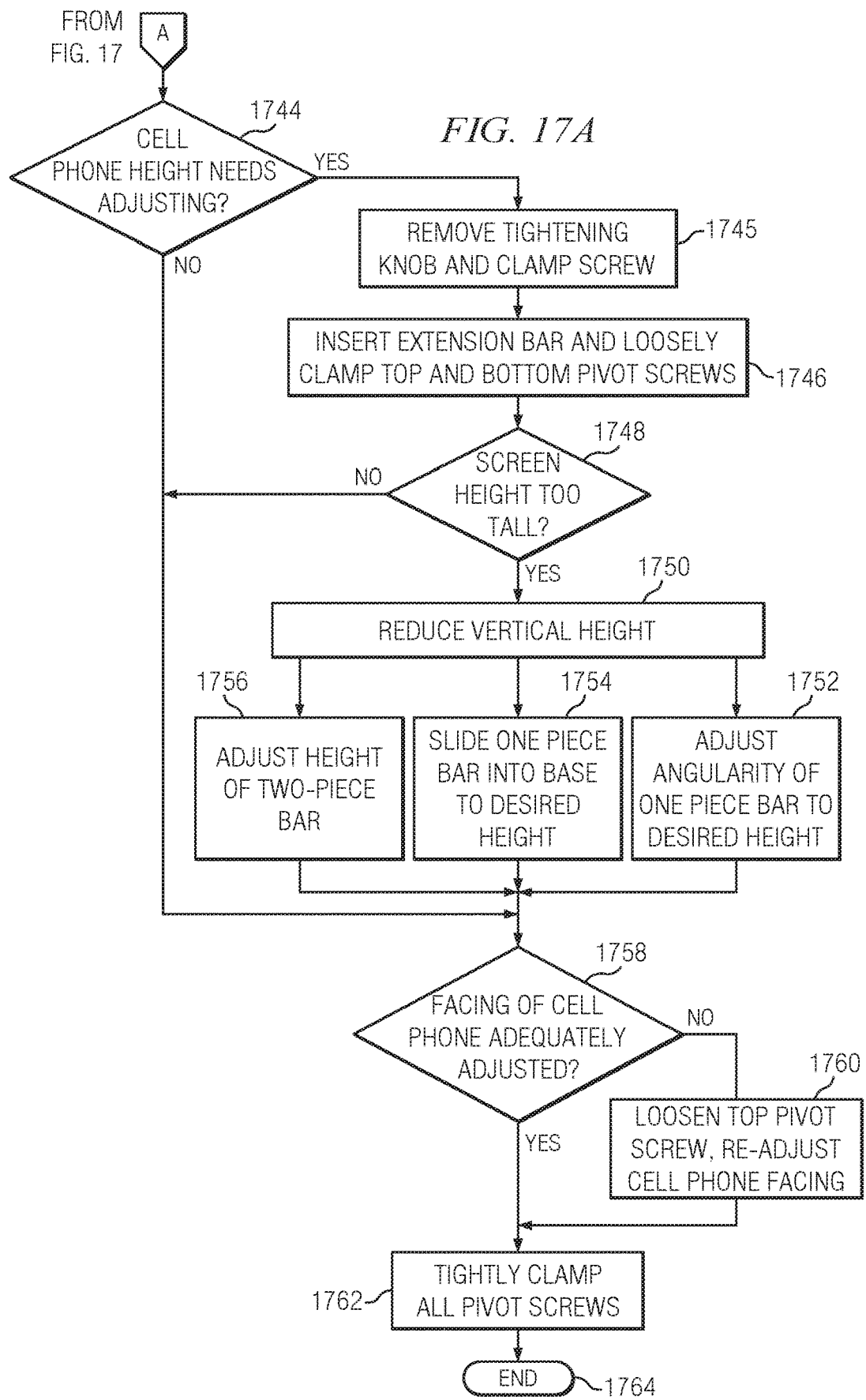
FIG. 17A is a block diagram illustrating a method of using an extension bar of the invention to adjust the viewing height and transverse position of the cell phone.

However, the user might decide that even though the screen is pointing in an optimum direction, the cell phone itself is too low and the cell phone screen would be more readily viewed if the entire phone was at a vertically higher position. FIG. 17A depicts an additional, optional process for adjusting the vertical position of the cell phone and its screen by either using the single piece or the two-piece extension bar, respectively 1660 or 1600, that has been described earlier herein. At step 1744, the user decides if the vertical height of the cell phone requires an adjustment to further improve the visibility of the cell phone screen. If the screen is found to be too low, at step 1745 the user first removes the clamp pivot screw 1400 and tightening knob 436 that was connecting the phone mount 108 to the pier 214, and then at step 1746, the user inserts either a one piece or a two piece extension bar between the support plates 432, 434 of cell phone mounting bracket 214 and the pier plates 426, 428, 430 of pier 212. Both extension bars are provided with an additional, second pivot screw knob and threaded cap screw for attachment of their respective top ends to the support plates 432,434 of the mounting bracket 214. The first pivot screw knob and threaded cap screw that was previously provided for attaching the plates 426,428,430 of pier 212 to the support plates 432,434 of the cell phone mounting bracket is re-used to attach the bottom ends of either of the extension bars 1600, or 1660 to the pier plates 426, 428, 430. As part of this step, the extension bar would be loosely secured by loosely clamping the top and bottom pivot screws.

At step 1748, the user then ascertains the optimum vertical height that the extension bar should assume in order to optimize the vertical location of the cell phone screen. If the addition of the extension bar leaves the height of the cell phone at a satisfactory vertical height, then the user would proceed to step 1758 to make sure that the screen facing direction hasn't changed and is still optimal. If the screen position is again found to be satisfactory, then the user would tightly clamp all pivot screws at step 1762, and the process ends at 1764.

In some cases, insertion of an extension bar may leave the vertical height of the cell phone screen unworkable for the user for some reason. If that is determined to be the case, the next step (1750) is for the user to decide what methodology to take in order to reduce the vertical height of the extension bar. The two piece extension bar 1600 is provided with an additional, third pivot screw knob and threaded cap screw which allows a slidable adjustment to either shorten or extend its length. At step 1756, the length of the two piece extension bar requires an adjustment to shorten its length, which is accomplished by compressing the male section 1601 into the female section 1623 and then tightening the third pivot screw once a desired length is achieved.

The one piece extension bar 1660 has a predetermined length, but nevertheless the vertical height that the one piece bar presents can be adjusted one of two ways. A first way is through step 1754, where the user slides the bottom end of the extension bar 1660 into the interior space of the base inner cup 300. The openings 433 and 435 between the pier plates 426,428 and 430 on the base 200 are configured to receive the two bar components 1664 and 1670 of the one piece extension bar 1660 so that they can be lowered into the interior of the cup until a desired vertical screen height is achieved. FIG. 26B shows an example of this first method. If the user determines the height is fine but the facing of the cell phone screen will need a re-adjustment, then the process branches to a step 1760 where the user loosens the top, second pivot screw and adjusts the angularity of the cell phone mount to his or her satisfaction. At that point, the user would then proceed to step 1762 and tighten all of the pivot screws very tightly, whereby the process ends at 1764.

A second way to adjust the vertical height of the one piece extension bar is through step 1752, where the orientation of the bar is changed from a substantially vertical position to one having a forward leaning or a rearward leaning angular position. The angular position will also accomplish lowering the vertical height of the cell phone mounting bracket, as seen in FIGS. 26 and 26A. However, when an angular position is introduced, the facing of the cell phone screen might have changed and at step 1758, the user must determine if the facing position is adequate or if it needs an adjustment. If it is adequate, the user would proceed to step 1762 to tightly clamp all pivot screws and the process ends at 1764. If the user determines the facing of the cell phone screen will need a re-adjustment, then a step 1760 is introduced where the user loosens the top, second pivot screw and adjusts the angularity of the cell phone mount to his satisfaction. At that point, the user would then proceed to step 1762 and tighten all of the pivot screws very tightly, and the process ends at 1764.

Once the cell phone mount 108 has been installed in a cup holder, adjusted for a particular cell phone and adjusted to optimize the height and direction in which the cell phone screen faces, it can be left in this condition. The user may at any time slip his or her cell phone into mount 108, and then later easily remove the cell phone from mount 108 through the open top of bracket 214. The U-shaped cord opening 424, since it is open at its top as well, permits the cell phone and cord to be extracted and installed as a unit without disconnecting the power/communications cord 112. The insertion of a one piece or two piece extension bar, 1660 or 1600, does not interfere with this installation, but in some situations, the offset cradle 1690' of the one piece extension bar 1660 might better facilitate this installation.

In summary, a new vehicle cup holder cell phone mount has been illustrated and described. The mount is provided as a kit with a plurality of shells, which are built up "Russian doll" fashion on a base until a fit to a given vehicle cup holder is achieved. The base and shells of the mount provide a set of downwardly and inwardly tapered surfaces, one of which will optimally and frictionally engage with an inner side wall of the vehicle cup holder into which the mount is to be installed. A movable jaw allows easy adjustment to a particular cell phone width and the open tops of the cell phone bracket and the cord channel permit easy insertion and extraction of the cell phone and power cord as a unit. An extension bar provides two methods of adjusting the height of the cell phone above the cup holder.

While illustrated embodiments of the present invention have been described and illustrated in the appended drawings, the present invention is not limited thereto but only by the scope and spirit of the appended claims.

We claim:

1. Apparatus for mounting a cell phone to a vehicle cup holder, the apparatus comprising:
   a base disposed on a vertical axis, a sidewall of the base having a top end and a bottom end vertically spaced below the top end, the sidewall bounding a base interior;
   a base top joined to the top end of the base sidewall and having a top surface, the top extending over the base interior and including a mounting pier upwardly extending from the top surface and having a mounting pier axis that is at an angle to the vertical axis;
   a cell phone mounting bracket;
   an elongate extension bar with a first component having a top end, a bottom end and a length between the top end and the bottom end, the cell phone mounting bracket pivotally connected to the top end of the first component, the first component defining a first height adjustment slot having an upper end and a lower end, the mounting pier adapted to be clamped to the first component at any of a plurality of positions ranging from the upper end of the first height adjustment slot to the lower end of the first height adjustment slot;
   a first opening formed through the base top and disposed to be adjacent to the mounting pier, the first opening adapted to slidably receive therethrough the bottom end of the first component, a portion of the length of the first component capable of being housed in the base interior, the mounting pier axis passing through the first height adjustment slot, a pier clamp disposed on the mounting pier axis for clamping the first component to the mounting pier at any of the plurality of positions, wherein the distance of the bottom end of the first component from the top is a function of the distance between a clamped position on the first height adjustment slot and the lower end of the first height adjustment slot.

2. The apparatus of claim 1, wherein the pier clamp is a threaded screw.

3. The apparatus of claim 1, wherein the mounting pier is comprised of first and second spaced, upstanding, parallel plates, the first opening disposed between the first and second plates, the first component clamped between the first and second plates.

4. The apparatus of claim 1, wherein the extension bar comprises first and second parallel components, a second height adjustment slot formed in the second component to be parallel to the first height adjustment slot, the first and second components having respective free bottom ends, the mounting pier axis passing through the first height adjustment slot and through the second height adjustment slot; and
  a second opening formed through the base top and disposed to be spaced from the first opening and to be adjacent to the mounting pier, the second opening adapted to slidably receive therethrough the free bottom end of the second component.

5. The apparatus of claim 4, wherein the mounting pier is comprised of first and second upstanding, spaced apart plates, a clamp throughbore formed along the mounting pier axis and through each of the first and second plates, the first opening disposed to be adjacent the first plate, and the second opening disposed to be adjacent the second plate.

6. The apparatus of claim 5, wherein the mounting pier further comprises a third plate standing up from the top surface of the base top and spaced from the first and second plates, a clamp throughbore of the third plate formed to be disposed on the mounting pier axis, the first component clamped between the first and second plates, the second component clamped between the second and third plates.

7. The apparatus of claim 4, wherein the first and second components are joined at their respective top ends.

8. The apparatus of claim 1, wherein the extension bar has a top end, the extension bar further including a cradle formed on the top end of the extension bar, the cradle including first and second spaced, parallel cradle plates, a cell phone bracket mounting axis formed at an angle to the vertical axis, each cradle plate having a throughbore disposed on the cell phone bracket mounting axis;
  the cell phone mounting bracket further including a first support plate, the first support plate having a throughbore disposed on the cell phone mounting axis, the first support plate pivotable about the cell phone bracket mounting axis relative to the cradle plates; and
  a cell phone bracket mounting clamp disposed on the cell phone bracket mounting axis and adapted to clamp the first support plate of the cell phone bracket to the first and second cradle plates of the extension bar.

9. The apparatus of claim 8, wherein the cradle further includes a third cradle plate formed to be spaced from and in parallel to the first and second cradle plates, the cell phone mounting bracket further including a second support plate spaced from and in parallel to the first support plate, the second support plate pivotable about the cell phone mounting axis relative to the cradle plates, the third cradle plate and the second support plate having throughbores disposed on the cell phone bracket mounting axis, the cell phone bracket mounting clamp clamping the second support plate between the second and third cradle plates.

10. Apparatus for mounting a cell phone to a vehicle cup holder, the apparatus comprising:
  a base having a sidewall with an upper end of the base outer surface and a lower end;
  a top of the base formed to be adjacent to the upper end of the sidewall, the sidewall defining a hollow base interior, the top extending over the base interior, a pier upwardly extending from the top of the base, the pier comprising a first pier plate and a second pier plate spaced from the first pier plate, a first opening formed through the top of the base and communicating with the hollow base interior, the first opening disposed between the first pier plate and the second pier plate;
  a cell phone mounting bracket adapted to receive a cell phone; and
  an elongate extension bar, a first component of the extension bar having a bottom free end and a top end, the top end of the first component coupled to the cell phone mounting bracket, a pier clamp operable to clamp the first component between the first pier plate and the second pier plate at a user-selected one of any of a plurality of positions between the top end of the first component and the bottom free end of the first component;
  the bottom free end of the first component slidable through the first opening and into the hollow interior of the base, the bottom free end of the first component disposed in the hollow base interior when a user selects any of a first subset of the plurality of positions that are disposed above the bottom free end of the first component for clamping between the first and second pier plates using the pier clamp, the bottom free end of the first component disposed above the hollow base interior when the user selects any of a second subset of the plurality of positions that are disposed above the bottom free end of the first component for clamping between the first and second pier plates using the pier clamp.

11. The apparatus of claim 10, wherein the pier further comprises a third pier plate spaced from the second pier plate, a second opening formed through the top of the base and communicating with the hollow base interior, the second opening disposed between the second pier plate and the third pier plate;
  the extension bar further comprising a second component disposed in parallel to the first component, the second component having a top end and a bottom free end, the second component joined to the first component only at the top ends of the first and second components, the second component coupled to the cell phone mounting bracket;
  the pier clamp operable to clamp the second component between the second and third pier plates at a user-selected one of a second plurality of positions on the second component corresponding to respective ones of the plurality of positions on the first component, the second plurality of positions disposed between the top end of the second component and the bottom free end of the second component;
  the bottom free end of the second component slidable through the second opening of the top of the base, the bottom free end of the second component disposed in the hollow base interior when the user selects any of a subset of the plurality of second positions above the bottom free end of the second component for clamping between the second and third pier plates using the pier clamp.

12. The apparatus of claim 10, wherein an elongate slot is formed in the first component from a lower end of the slot disposed near the lower free end of the first component to an upper end of the slot disposed near the upper end of the first bar component, the first and second pier plates having passages therethrough, the pier clamp comprising a shaft, the shaft extending through the slot and the passages.

13. The apparatus of claim 10, wherein the top end of the first component is rotatably coupled to the cell phone mounting bracket.

14. The apparatus of claim 10, wherein an elongate first height adjustment slot is formed in the first component from a lower end of the first adjustment slot disposed near the lower free end of the first component to an upper end of the first adjustment slot disposed near the upper end of the first component, the first component having a predetermined width that is uniform along the length of the first height adjustment slot, the first opening in the top of the base having a predetermined length that is greater than the predetermined width, the pier clamp clamping the extension bar to the pier at a pier clamping axis disposed above the first opening in the top of the base, a difference between the predetermined length of the first opening and the predetermined width of the first component permitting an increased range of angular motion of the extension bar around the pier clamping axis.

15. A mount for an electronic device comprising:
- a base having a bottom and a top disposed above the bottom, the base disposed on a vertical axis, at least one sidewall of the base extending from the bottom to the top, the bottom, top and the at least one sidewall defining a hollow base interior, the top extending over the hollow base interior and having an opening of a predetermined width orthogonal to the vertical axis and a predetermined depth orthogonal to the vertical axis and the predetermined width;
- an electronic device mounting bracket;
- an extension bar having an elongate first component, an upper end of the first component spaced from a lower end of the first component by a length of the first component, the upper end joined to the electronic device mounting bracket, the first component having a maximum width orthogonal to the length and maximum depth orthogonal to the maximum width and the length, the maximum width being less than the width of the opening and the maximum depth being less than the depth of the opening;
- an affixation range of the first component occupying a portion of the length of the first component, the affixation range having an upper portion and a lower portion; and
- a clamp joined to the top of the base, the clamp adapted to clamp to the first component at any of a plurality of positions on the first component along the affixation range, the lower end of the first component disposed within the hollow interior of the base when the clamp clamps to any of those positions which are disposed along the upper portion of the affixation range, the lower end of the first component disposed above the hollow interior of the base when the clamp clamps to any of said positions which are disposed along the lower portion of the affixation range.

16. The mount of claim 15, wherein the electronic device mounting bracket is pivotally connected to the upper end of the first component.

17. The mount of claim 15, wherein the first component has formed therein a slot having an upper end and a lower end, the plurality of positions within the affixation range ranging from the upper end of the slot to the lower end of the slot.

18. The mount of claim 15, further comprising a mounting pier extending upwardly from the top of the base, a mounting pier axis disposed to be orthogonal to the vertical axis, the first component of the extension bar adapted to clamped to the mounting pier by the clamp at any of the plurality of positions within the affixation range.

19. Apparatus for mounting an electronic device to a vehicle cup holder, the apparatus comprising:
- a base disposed on a vertical axis, a sidewall of the base having a top end and a bottom end vertically spaced below the top end, the sidewall bounding a hollow base interior;
- a base top joined to the top end of the base sidewall and having a top surface, the top extending over the base interior and including a mounting pier upwardly extending from the top surface and having a mounting pier axis that is at an angle to the vertical axis;
- an extension bar having first and second bar components, the first bar component having an upper end and a lower end spaced from the upper end in a length direction, the first bar component having formed therein a first adjustment slot extending in the length direction throughout most of the length of the first bar component, the first adjustment slot having a length, an upper end disposed near the upper end of the first bar component and a lower end disposed near the lower end of the first bar component;
- the second bar component having an upper end and a lower end spaced from the upper end in the length direction, the second bar component having formed therein a second adjustment slot extending throughout most of the length of the second bar component, the second adjustment slot having a length, an upper end disposed near the upper end of the second bar component and a lower end disposed near the lower end of the second bar component, the upper end of the first adjustment slot being in registry with the upper end of the second adjustment slot, the lower end of the first adjustment slot being in registry with the lower end of the second adjustment slot;
- a pier clamp adapted to clamp the first bar component and the second bar component to the pier at any of a plurality of positions ranging from the upper end of the first adjustment slot to the lower end of the first adjustment slot; and
- an electronic device mounting bracket, a cradle of the extension bar adapted to be joined to the electronic device mounting bracket, the upper ends of the first bar component and the second bar component being joined to the cradle, the lower ends of the first and second bar components being free from each other;
- wherein the first adjustment slot and the second adjustment slot accept therethrough a shaft of a clamping screw or pin anywhere along the lengths of the first and second adjustment slots, the first and second bar components being uniformly spaced from each other except where they are joined together by the cradle; and wherein
- a first opening is formed through the base top and disposed to be adjacent to the mounting pier, the first opening adapted to slidably receive therethrough the lower end of the first bar component, a second opening formed through the base top, to be adjacent the mounting pier and to be spaced from the first opening, the second opening adapted to slidably receive therethrough the lower end of the second bar component, a distance of the lower ends of the first and second bar components from the top of the base being a function of the distance between the clamped positions of the first and second height adjustment slots and the lower ends of the first and second height adjustment slots.

20. The apparatus of claim 19, wherein a shape of a cross-section of the first bar component is uniform along the length of the first adjustment slot, a shape of a cross section of the second bar component being uniform along the length of the second adjustment slot.

21. The apparatus of claim 20, wherein the shape of the cross section of the first bar component is rectangular and the shape of the cross section of the second bar component is rectangular.

22. The apparatus of claim 19, wherein the lower ends of the first and second bar components are rounded.

23. The apparatus of claim 19, wherein the first and second adjustment slots and are closed at their respective lower ends.

24. The apparatus of claim 19, wherein the extension bar is disposed on a length axis, the cradle comprising a floor that joins together the upper end of the first bar component to the upper end of the second bar component, and a first cradle plate upwardly extending from the floor, a throughbore made through the first cradle plate to accept therethrough a shaft of a mounting bracket clamp along a mounting bracket clamp axis that is disposed at an angle to the length axis.

25. The apparatus of claim 24, wherein the first cradle plate is one of a plurality of cradle plates each joined to the floor of the cradle, each cradle plate upwardly extending from the floor and having a throughbore to accept therethrough the shaft of the mounting bracket clamp, the cradle plates formed to be in parallel to and spaced apart from each other.

26. The apparatus of claim 25, wherein the extension bar is disposed on a length axis and the shaft of the mounting bracket is disposed on a mounting bracket clamping axis orthogonal to the length axis, at least one of the cradle plates displaced along the mounting bracket clamping axis from the first bar component.

27. The apparatus of claim 26, wherein all but one of the cradle plates are displaced along the mounting bracket clamping axis from both the first and second bar components.

* * * * *